(12) United States Patent
Shahar et al.

(10) Patent No.: US 6,628,446 B1
(45) Date of Patent: Sep. 30, 2003

(54) HIGH-RESOLUTION READING AND WRITING USING BEAMS AND LENSES ROTATING AT EQUAL OR DOUBLE SPEED

(76) Inventors: Arie Shahar, 18 Church St., White Plains, NY (US) 10601; Nira Schwartz, 2800 Plaza Del Amo, Unit 187, Torrance, CA (US) 90503-9363

(*) Notice: Subject to any disclaimer, the term of this patent is extended or adjusted under 35 U.S.C. 154(b) by 0 days.

(21) Appl. No.: 10/335,036

(22) Filed: Dec. 31, 2002

Related U.S. Application Data

(62) Division of application No. 09/862,527, filed on May 22, 2001, now Pat. No. 6,522,443, which is a division of application No. 09/506,072, filed on Feb. 17, 2000, now Pat. No. 6,310,710.
(60) Provisional application No. 60/130,868, filed on Apr. 23, 1999.

(51) Int. Cl.[7] .............................................. G02B 26/08
(52) U.S. Cl. ........................ 359/210; 359/212; 359/203; 359/204; 358/493
(58) Field of Search ................................. 359/201, 203, 359/204, 210–212; 358/493; 369/44.17, 44.39; 347/225, 233, 241–244, 256–261

(56) References Cited

U.S. PATENT DOCUMENTS 5,796,511 A * 8/1998 Allen et al. ................. 359/305

* cited by examiner

Primary Examiner—James Phan
(74) Attorney, Agent, or Firm—David Pressman

(57) ABSTRACT

A scan systems include at least one radiation source for directing at least one beam toward a spinning scan device. The scan device reflects these beams as rotating scan beams to track rotating scan lenses without translation between the scan beams and the scan lenses. The rotating scan lenses focus the scan beams into radiation spots and project them onto a scanned surface as moving scan spots. Relative movement between the scanned surface and the scan lenses produces an inner drum area scan. According to another version the system includes at least one radiation source for directing at least one beam toward a spinning scan device. The scan device reflects these beams as rotating scan beam to track rotating reflectors, The reflectors direct the beams to rotating tracking lenses without translation between the beams and the lenses. The lenses focus the scan beams into spots and project these onto a scanned surface as moving spots. Relative movement between the scanned surface and the scan lenses produces a planar area scan. The advantages of each version are the ability to use multiple beams for high-speed scans, to produce a scan with a balanced rotating optical system for producing a high speed-scan, to scan with a high resolution that is diffraction limited, to scan over a large range at a high resolution, to achieve a very accurate scan by reducing the influence of the production tolerances of the scan device, and to produce high-speed scan with very low radiation loss in a rotating confocal microscope.

13 Claims, 32 Drawing Sheets

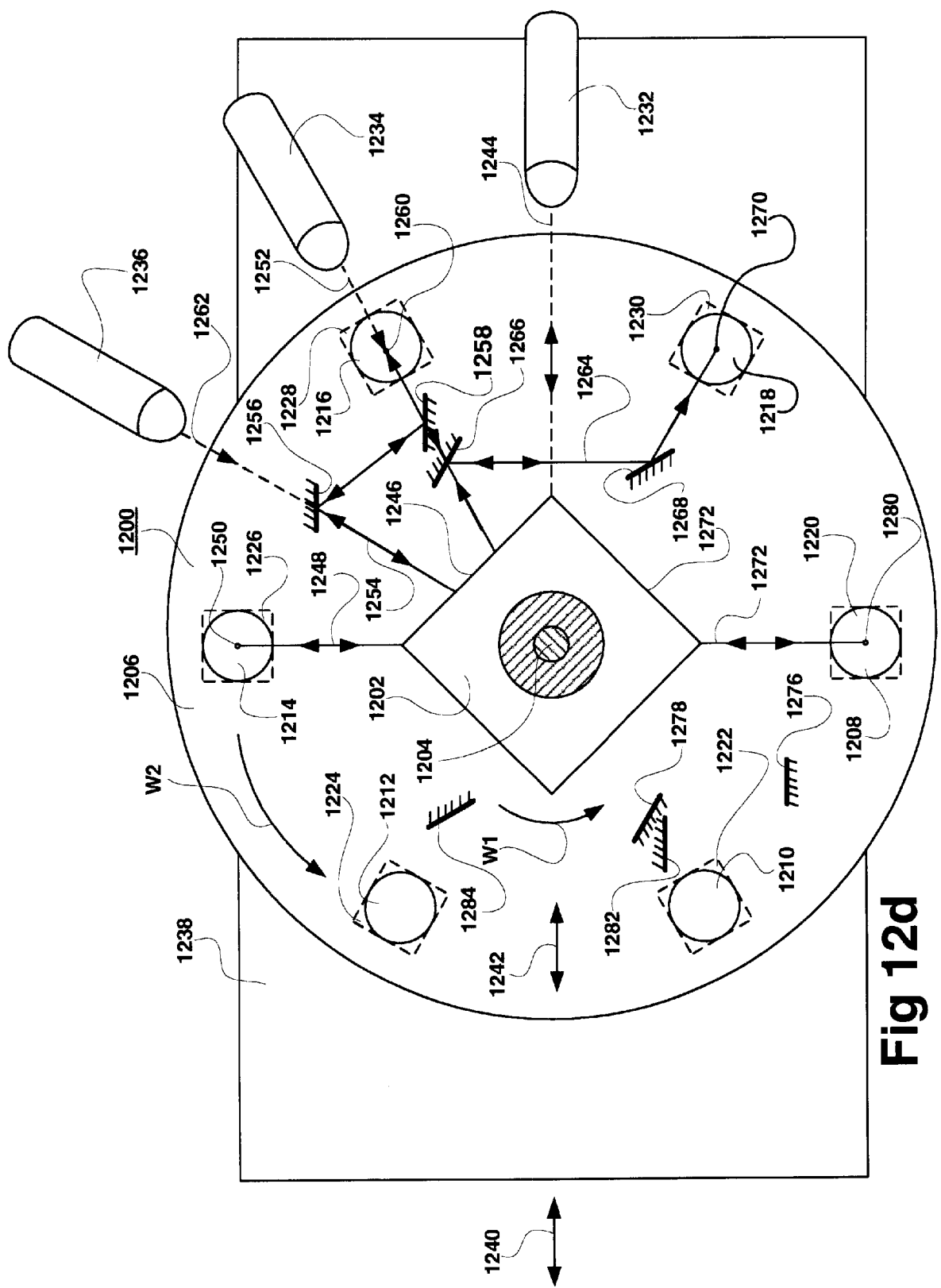

HIGH-RESOLUTION READING AND WRITING USING BEAMS AND LENSES ROTATING AT EQUAL OR DOUBLE SPEED

CROSS-REFERENCE TO RELATED APPLICATIONS

This application claims the benefit of Provisional Patent Application Ser. No. 60/130,868, filed Apr. 23, 1999 by the present inventors. This application is also a division of Ser. No. 09/862,527, filed May 22, 2001, now U.S. Pat. No. 6,522,443, granted Feb. 18, 2003, which is a Division of Ser. No. 09/506,072, filed Feb. 17, 2000, now U.S. Pat. No. 6,310,710, Granted Oct. 30, 2001.

BACKGROUND

1. Field of Invention

The invention relates to the field of reading, writing, inspecting, printing, engraving, plotting, and vision. In the reading aspect it particularly relates to the fields of machine vision and inspection machines, such as those used to read and/or inspect industrial products such as compact disks (CDs), computer disks, video disks, digital video disks (DVDs), Printed Circuit Boards (PCBs) and silicon wafers used in the integrated circuits (IC) industry. In the printing aspect it relates to the field of writing, engraving, and printing machines, such as those used in the industrial fields of digital printing, internal drum scanning, preprinting and pre-press industry, laser beam writing, and photolithography.

2. Prior Art

Conventional scanners which use external drum scanning, such as scanner 1 of FIG. 1, includes a rotating drum 2, which carries a flexible plate 4 on its circumference and a read-write head 6 having a focusing lens 7 that emits and collects multiple beams 8 onto and from plate 4. While drum 2 rotates around its axis 10, head 6 moves parallel to axis 10 and along arrows 12 and 14 and thus the whole area of plate 4 is scanned.

FIG. 2 illustrates an internal drum scanner 19 including a flexible plate 20 bent into cylinder-like shape, a spinning tilted mirror 22, and a head 24 having a focusing lens 25 that emits and collects a single beam 26 onto and from plate 20. The optical path between plate 20 and head 24 includes mirror 22. Mirror 22 spins around its axis 28, along which beam 26 propagates between mirror 22 and head 24. Mirror 22 and head 24 both move along and parallel to axis 28 along a rail 30 and thus scan the whole area of plate 20.

External scanner 1 of FIG. 1 has the advantages of using multiple beams 8 and head 6 with its focusing lens 7 that is close to plate 4. These advantages allow multiple scans at high resolution. The disadvantage is the mechanical instability of its large rotating drum 2 that carries plate 4. This disadvantage forces the use of a low rotational speed.

The advantage of internal scanner 19 of FIG. 2 is the compact size of its spinning mirror 22 that allows it to spin at a very high rotational speed. The disadvantage is the relatively long optical path between its head 24 and its plate 20 via mirror 22. This requires that lens 25 have a long focal length that provides only limited resolution.

The scan speed V of the scanner is proportional to the product of the number N of beams used, times the rotational speed, $\omega$, i.e., $$V \propto N \cdot \omega$$

The typical values of the above parameters for external scanning are N=30 and $\omega$=500 rpm. Thus V is proportional to 15,000. The typical values of the above parameters for internal scanning are N=1 and $\omega$=15,000 rpm. Thus V is also proportional to 15,000.

It can be seen that both scanner 1 and scanner 19 have a similar scan speed V, but scanner 1 is superior to scanner 19 due to its high resolution.

U.S. Pat. No. 5,557,438 to N. Schwartz and A. Shahar, entitled "Scanning And Tracking Using Rotating Polygons", Sep. 17, 1996, discloses a unique scan system using polygonal mirrors. This system teaches how to convert a scanner 19 into an internal scanner that is capable of scanning multiple beams while maintaining the high performance of scanner 19. In this scanner, if the typical number N of beams is 10, then the scan speed V is proportional to 2·10·15,000=300,000, which is 20 times faster than scanner 1. While the scan speed is much faster, its resolution is still similar to the resolution of scanner 19, which is inferior to the resolution of scanner 1.

U.S. Pat. No. 5,828,483 to A. Shahar and N. Schwartz, entitled "Printing And Inspection System Using Rotating Polygon And Optical Fibers", Oct. 27, 1998, teaches how to convert internal scanning into wide planar scanning. In this system radiation is projected and collected onto and from a planar region by the outputs of the optical fibers. This system also suffers from the disadvantage of limited resolution.

OBJECTS AND ADVANTAGES

Accordingly several objects and advantages of the invention are as follows:

(1) To provide an improved scan system.
(2) To provide writing and reading scanners for internal drum scanning which are capable of maintaining all the high performance of the system of the above '438 patent, with the additional advantage of high scan resolution.
(3) To provide writing and reading scanners for planar scanning which maintain all the high performance of the scanner of the above '483 patent, with the additional advantage of high scan resolution.

Other objects and advantages are:

(4) To provide disk drivers using multiple beams for fast reading of CDs, computer disks, video disks and DVDs.
(5) To provide inspection systems using multiple beams for fast inspection of CDs, computer disks, videodisks and DVDs.
(6) To provide writing machines using multiple beams, such as writing machines for fast writing and engraving of CDs, computer disks, videodisks, and DVDs.
(7) To provide writing, laser writing, photolithography, and reading or inspecting systems using multiple beams, especially such systems for reading or inspecting PCBs.
(8) To provide writing, laser writing, photolithography, and reading or inspecting systems using multiple beams, especially for reading or inspecting wafers, such as silicon wafers used in the IC industry.
(9) To provide an internal drum scanner and planar scanner using at least one radiation beam for fast reading and writing with high resolution and for inspection by imaging and laser scattering.
(10) To provide internal drum and planar scanning at angular velocities that are equal to or twice the rotational speed of the scan device.
(11) To provide a rotating confocal microscope for reading, inspecting, and writing by inner drum scanning and planar scanning.

Still further objects and advantages will become apparent from a consideration of the ensuing description and accompanying drawings.

DRAWINGS

FIGS. 3a, 3b, 3c, and 3d illustrate spinning and scan-devices, some of whose optical properties are implemented in the system of the invention.

Figure 4:
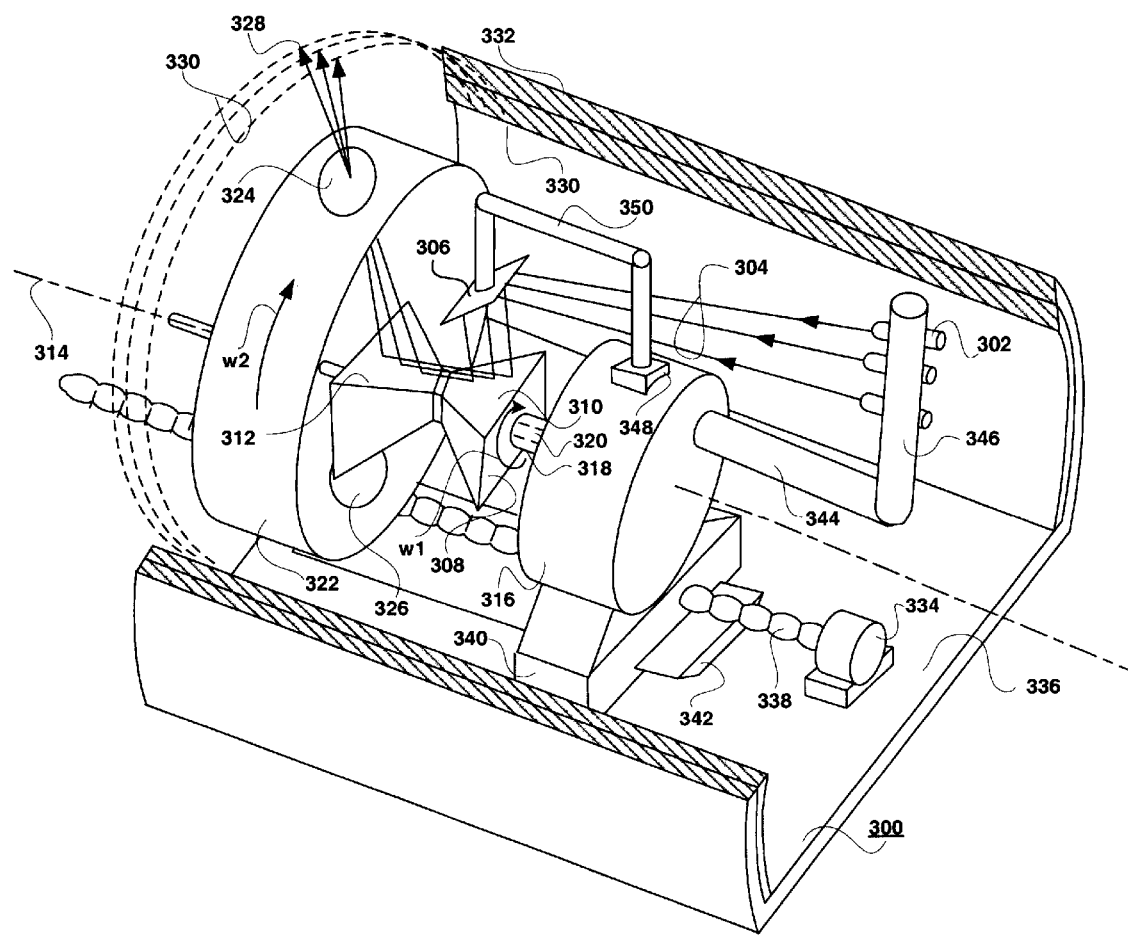

FIG. 4 illustrates a scan system according to the invention.

Figure 5:
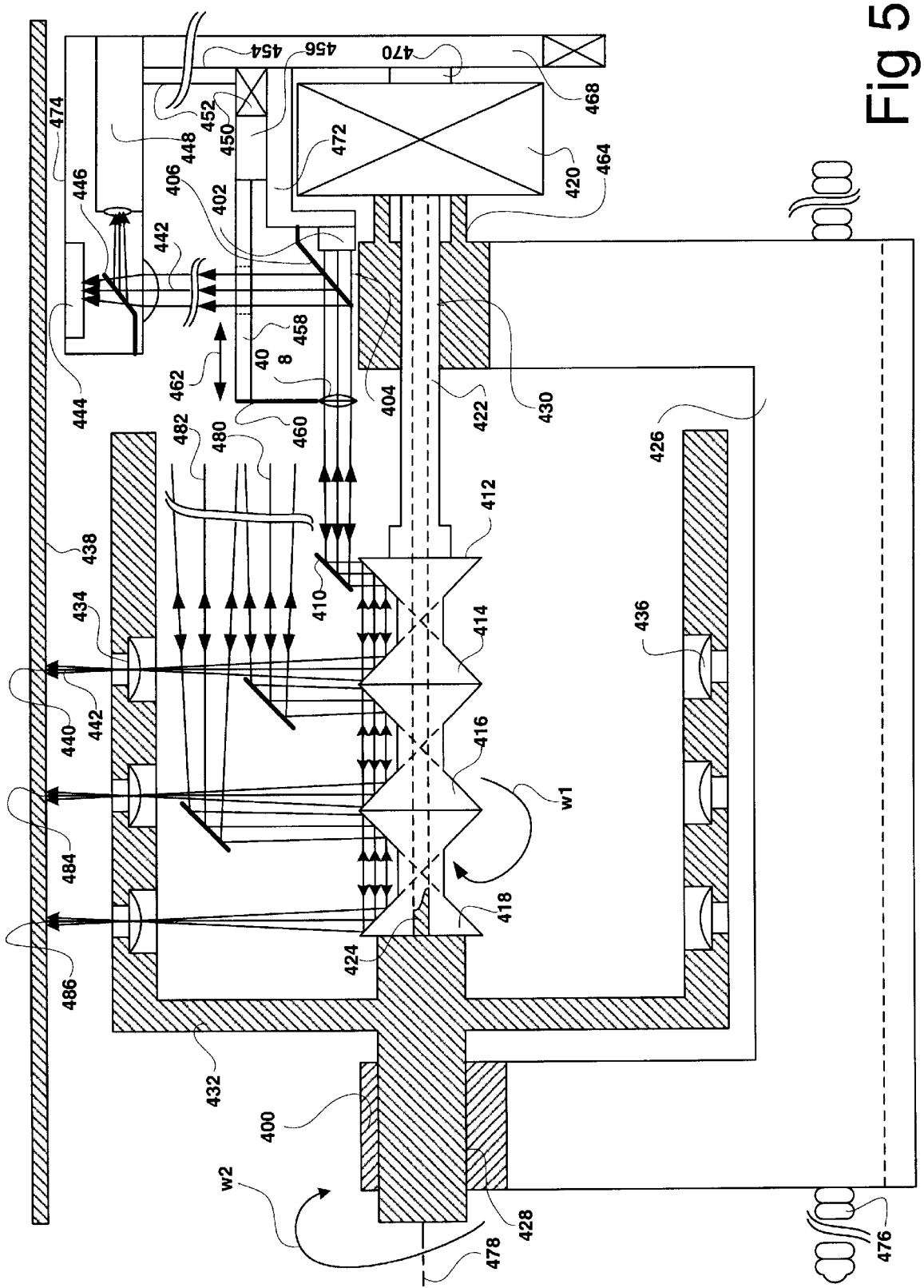

FIG. 5 illustrates reading and writing system according to the invention.

Figure 6:
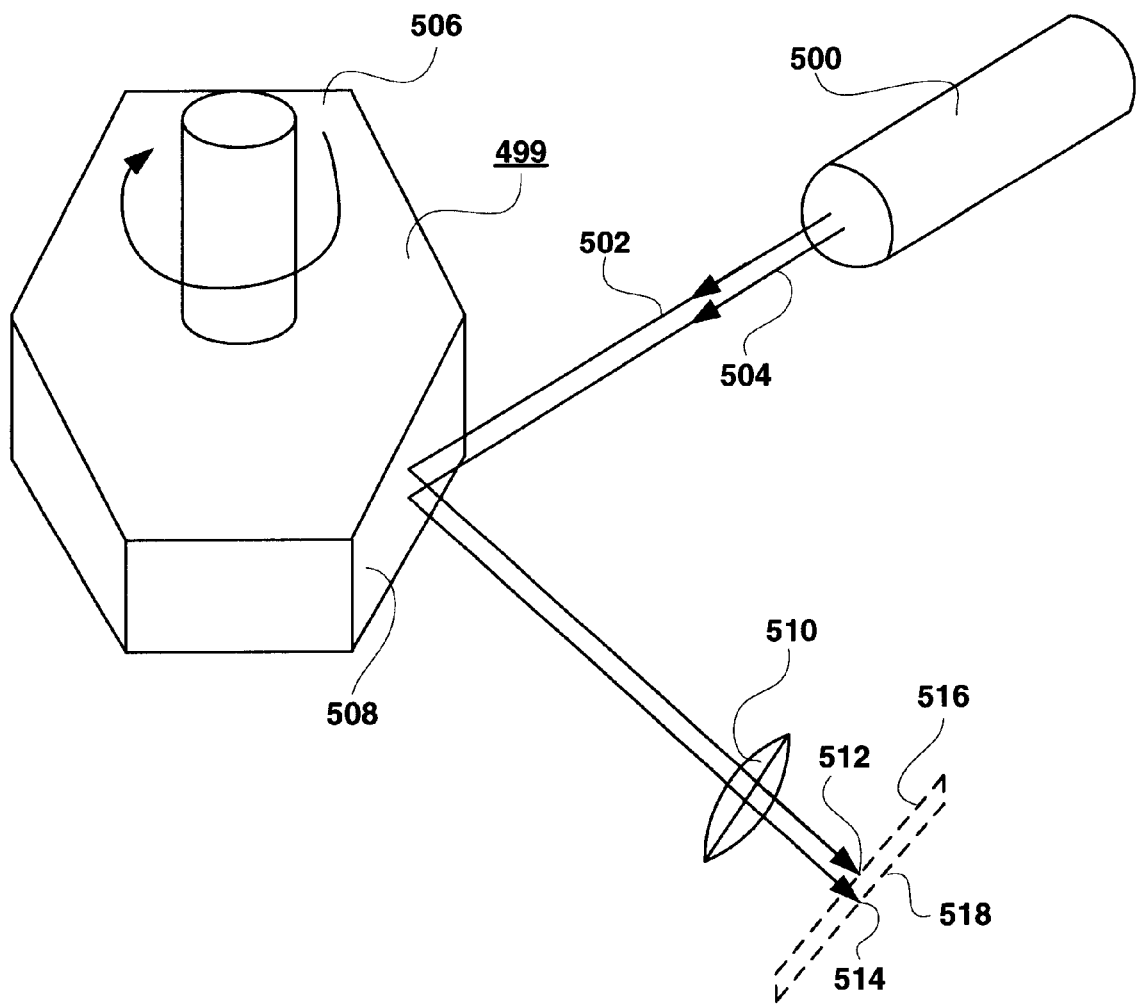

FIG. 6 shows a prior-art system for planar scanning.

Figure 7:
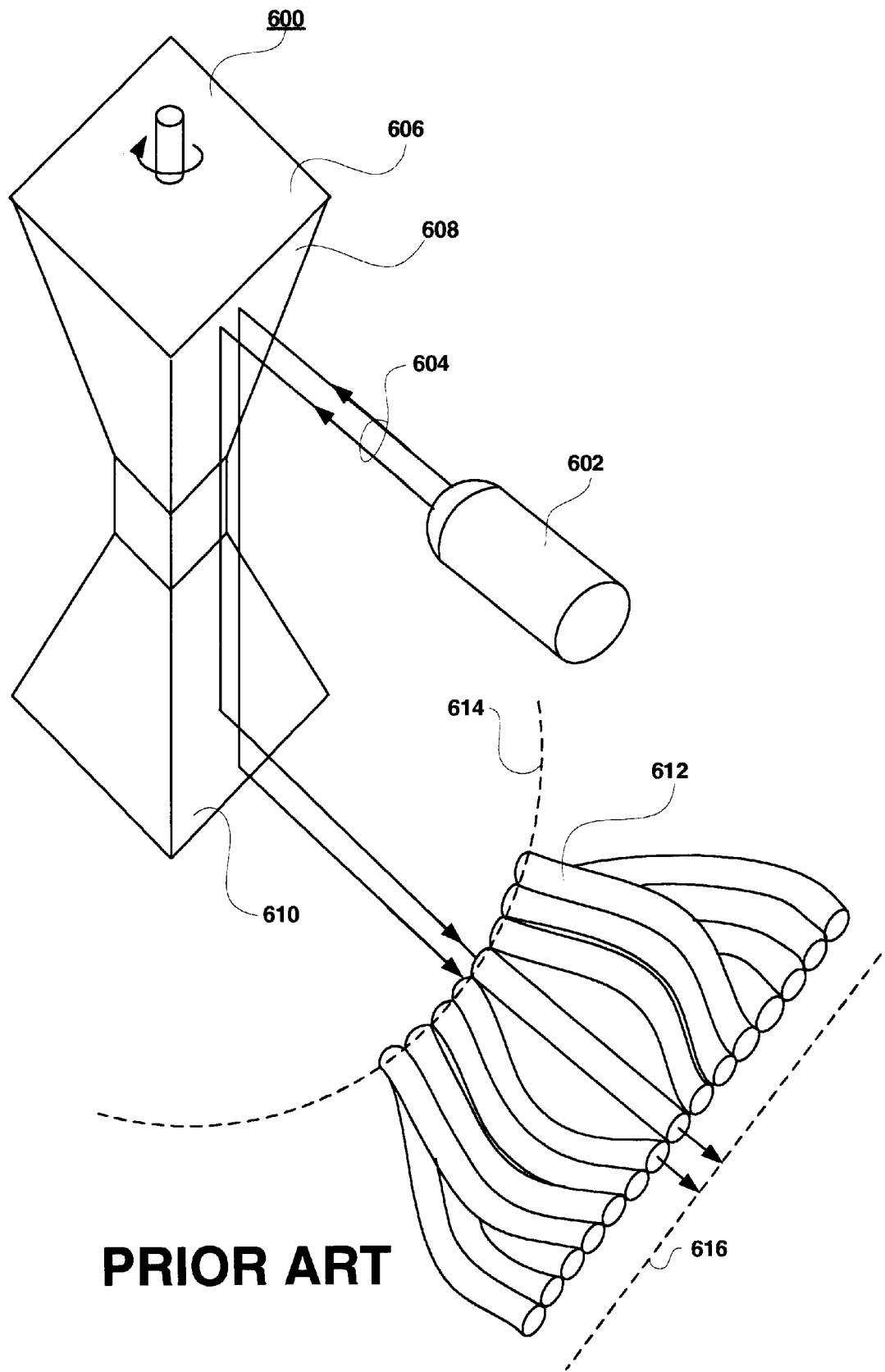

FIG. 7 illustrates another prior-art system for planar scanning.

Figure 8:
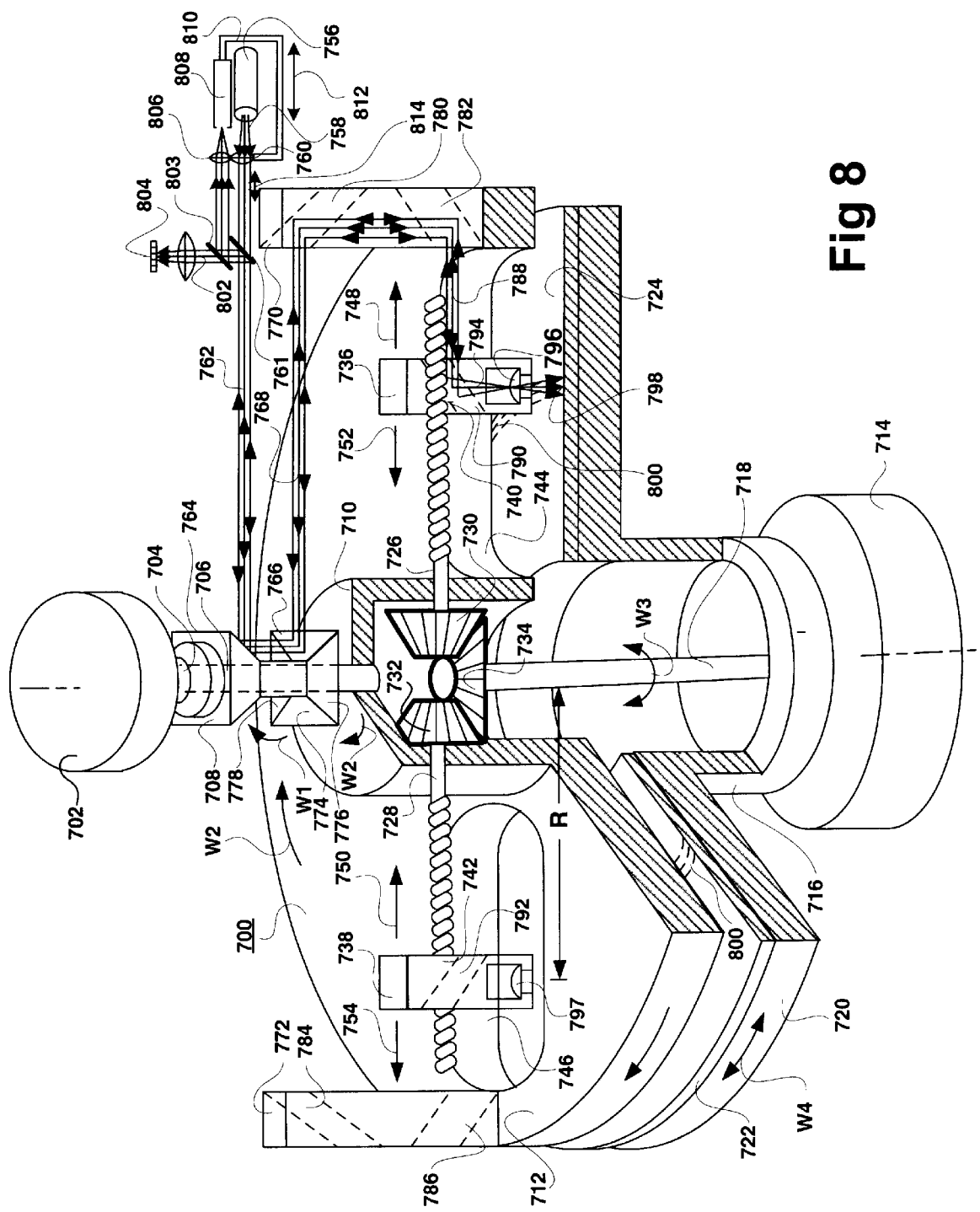

FIG. 8 illustrates a planar scanner according to the invention.

Figure 9:
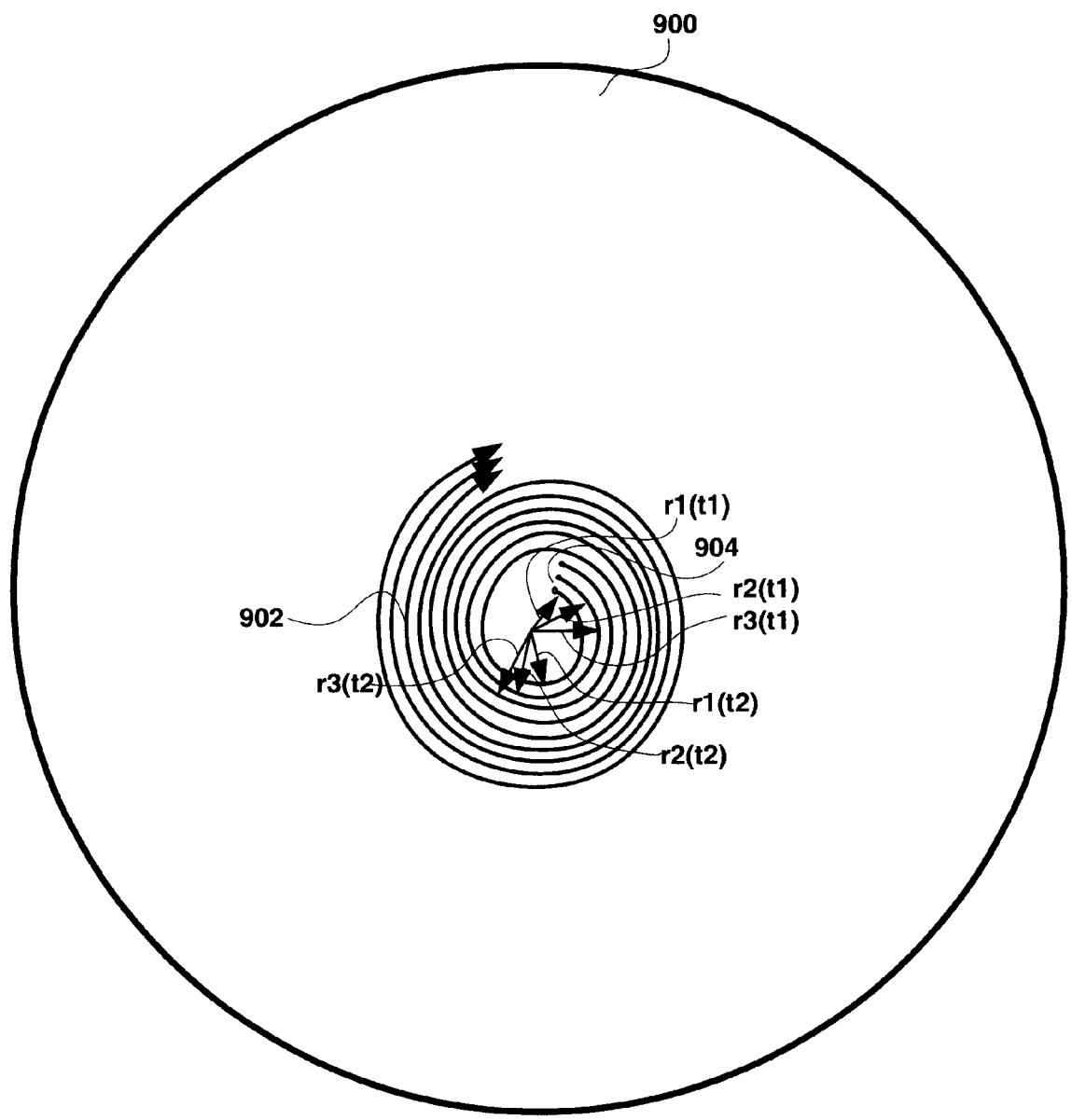

FIG. 9 illustrates the scan path of a planar scan system according to the invention.

Figure 10:
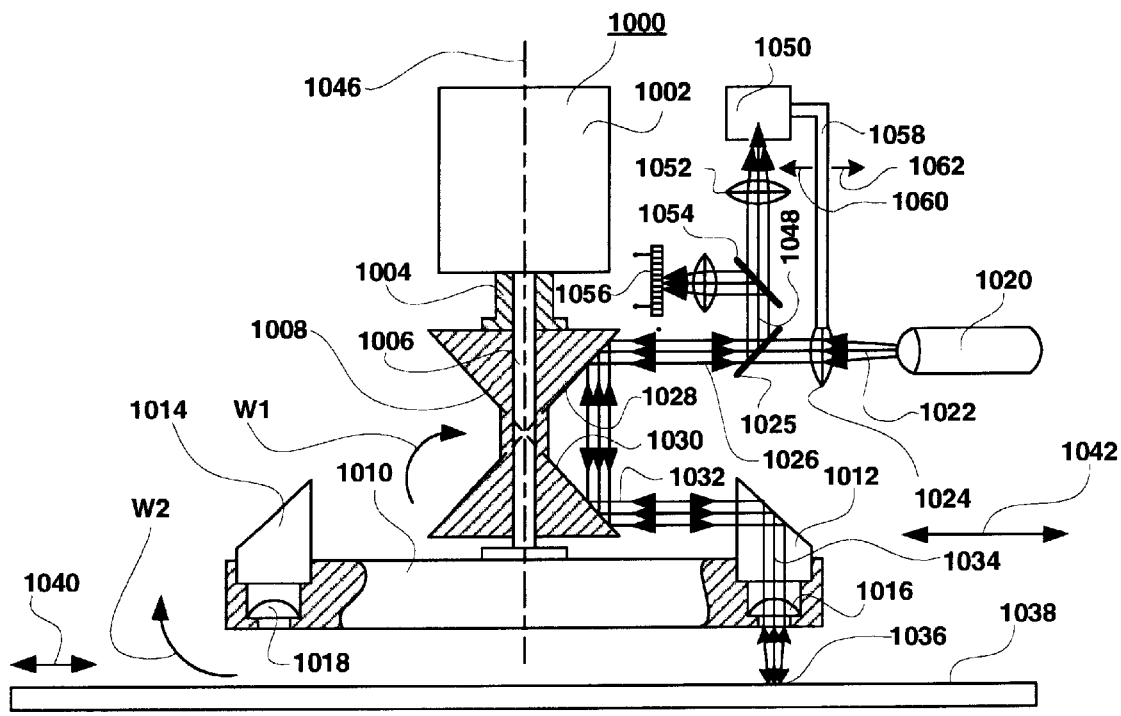

FIG. 10 illustrates another planar scanner system according to the invention.

Figure 11:
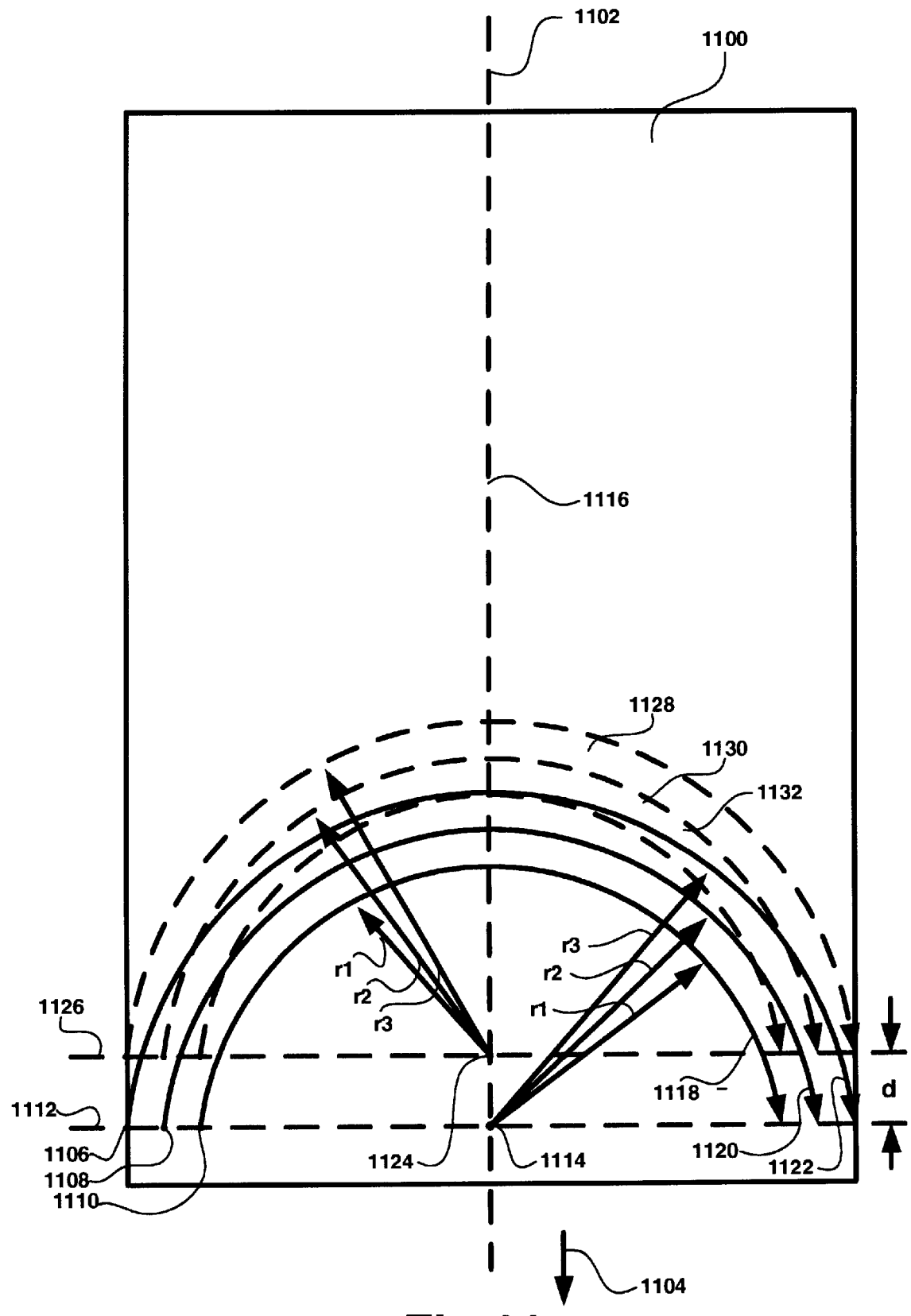

FIG. 11 shows another scan path of the planar scan system.

FIGS. 12a to 12d show an additional version of a planar scanner according to the invention.

Figure 13:
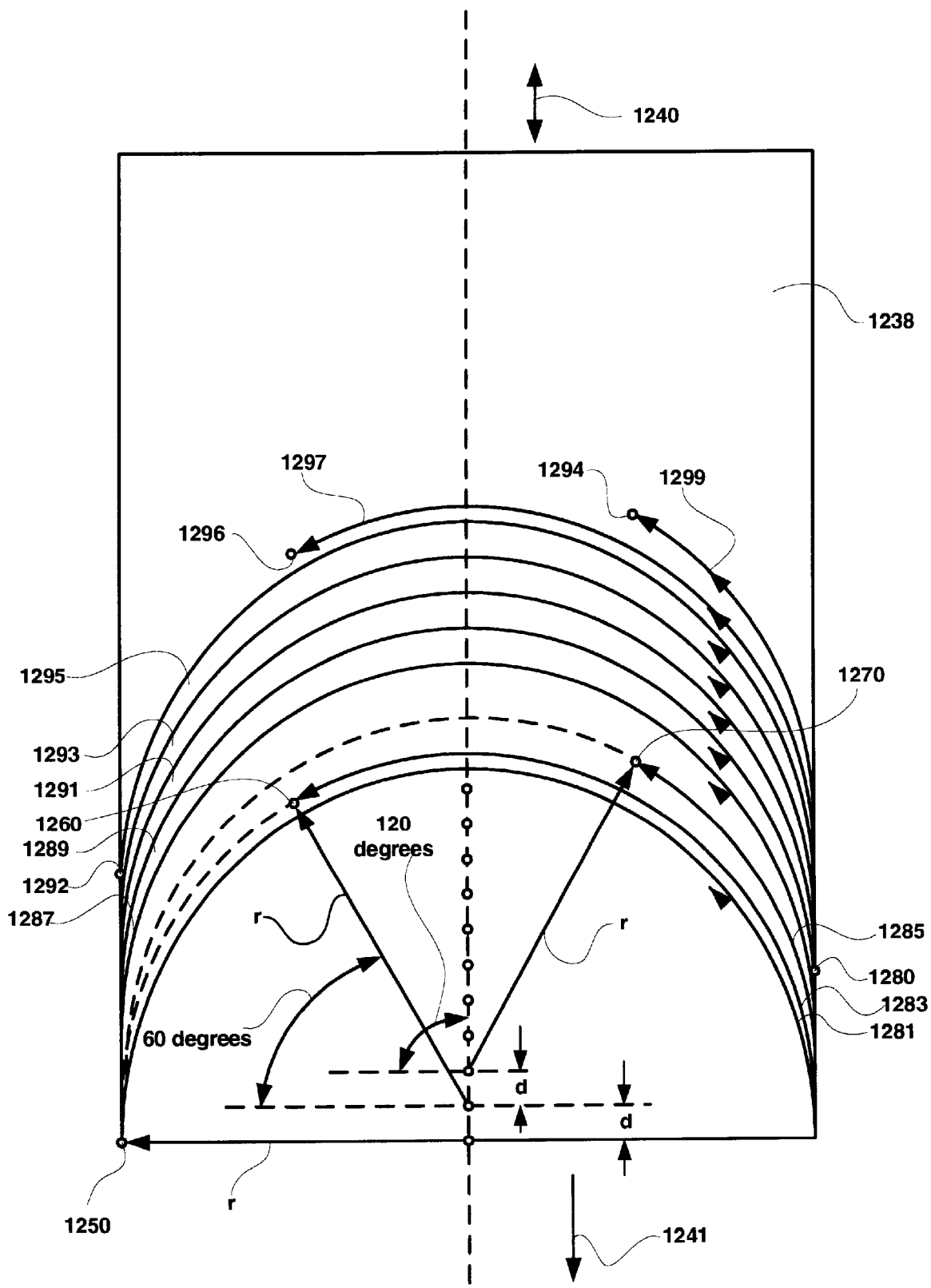

FIG. 13 illustrates a scan path on a planar surface according to the invention.

Figure 14:
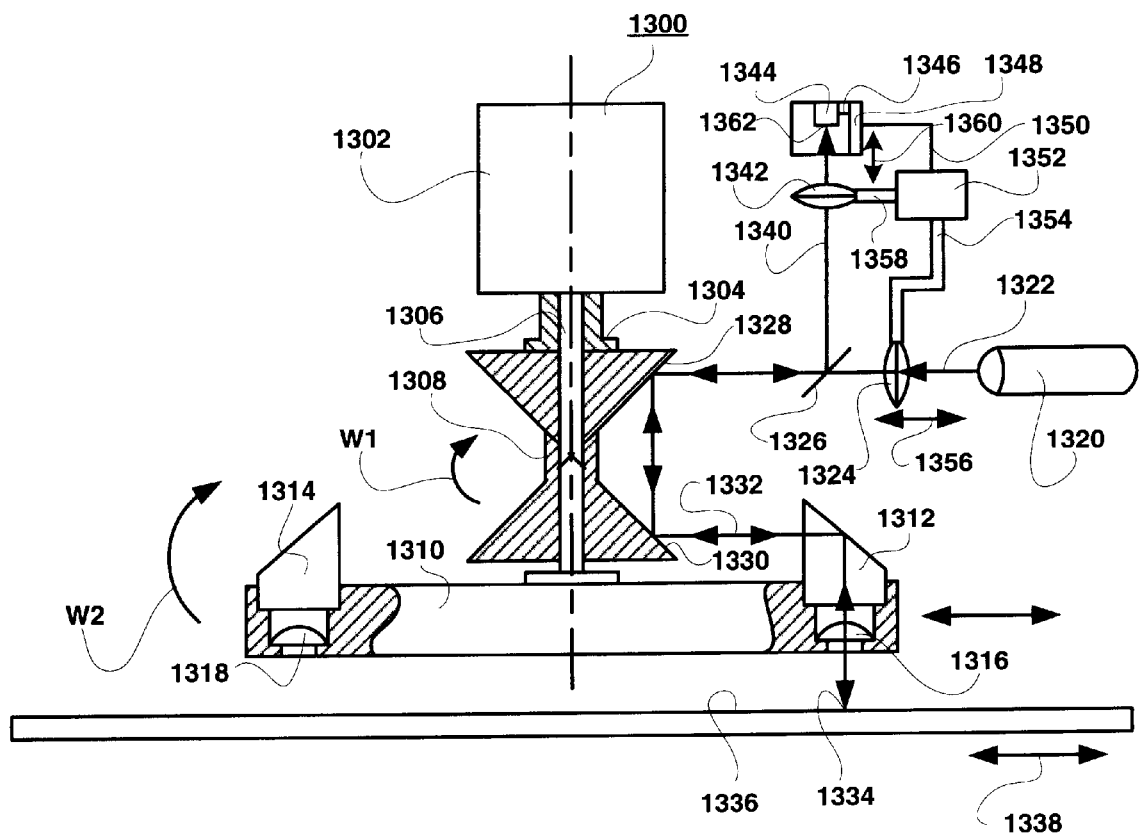

FIG. 14 shows the optical path of a scanner according to the invention.

Figure 15:
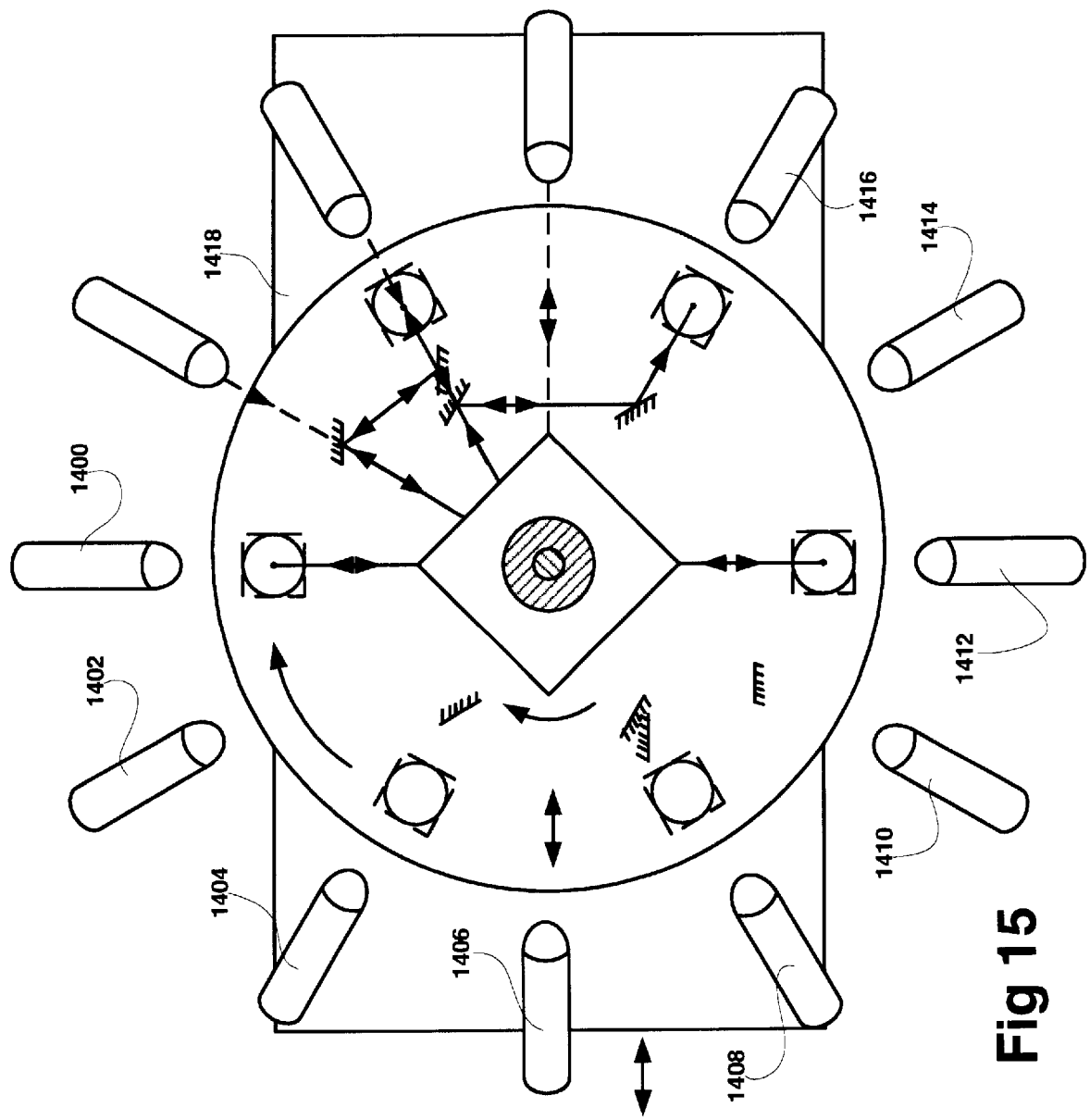

FIG. 15 illustrates a scanner with multiple illuminating facets according to the invention.

Figure 16:
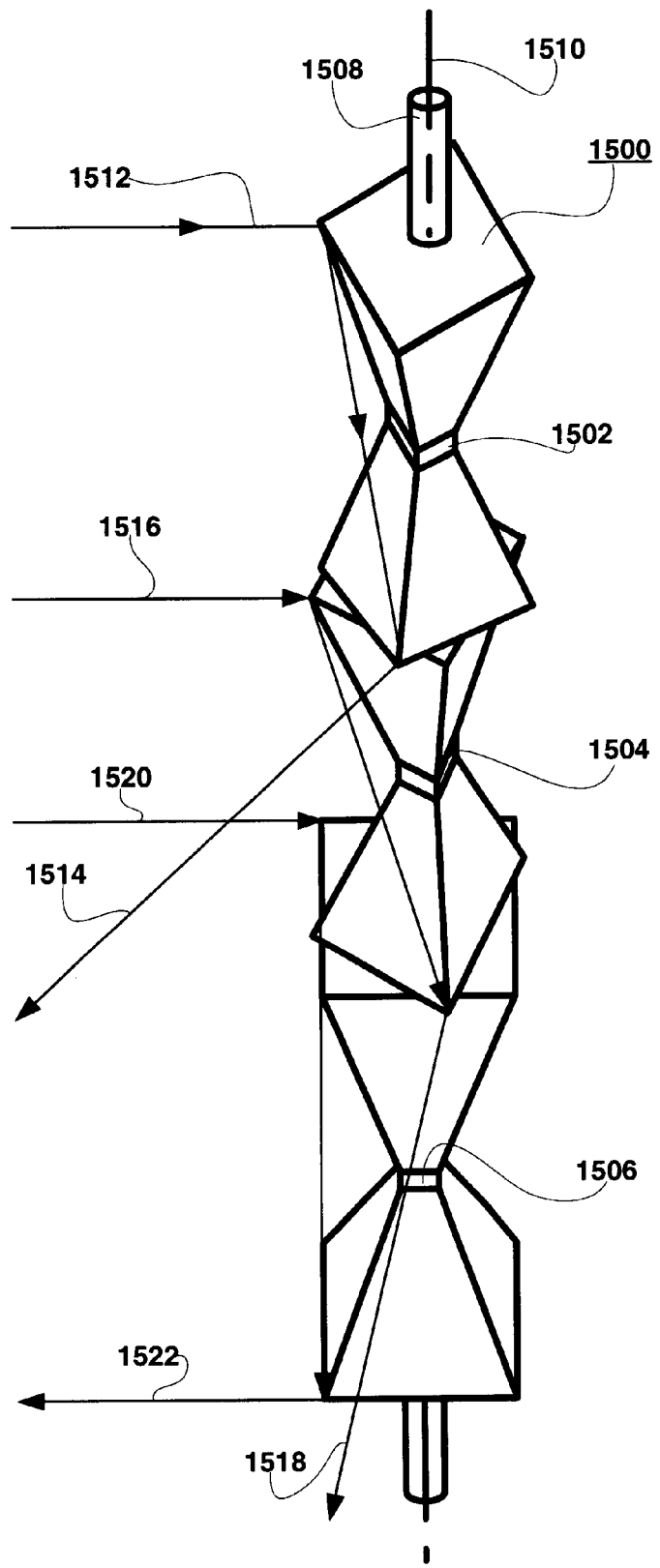

FIG. 16 shows a spinning scan device according to the invention.

Figure 17A:
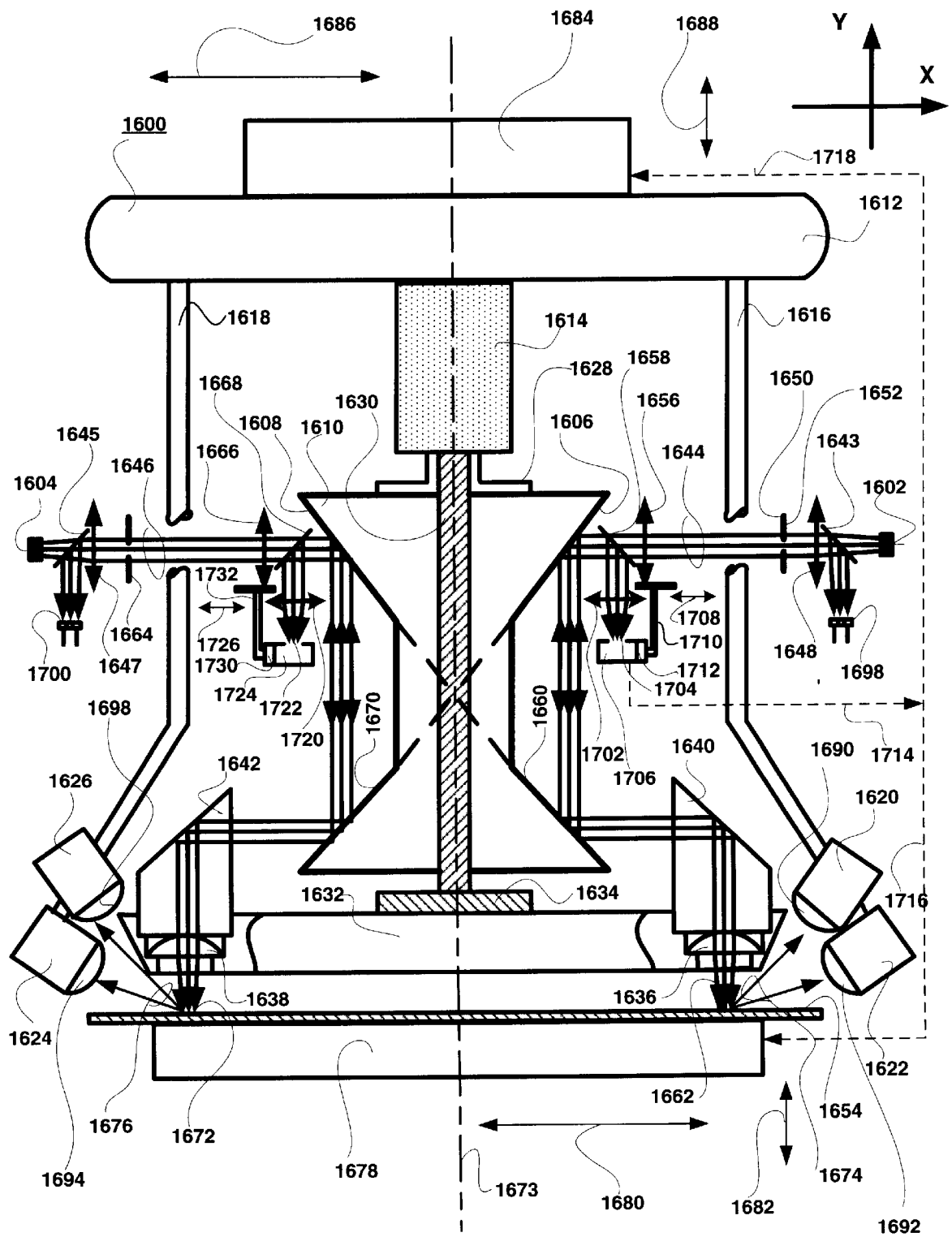
Figure 17B:
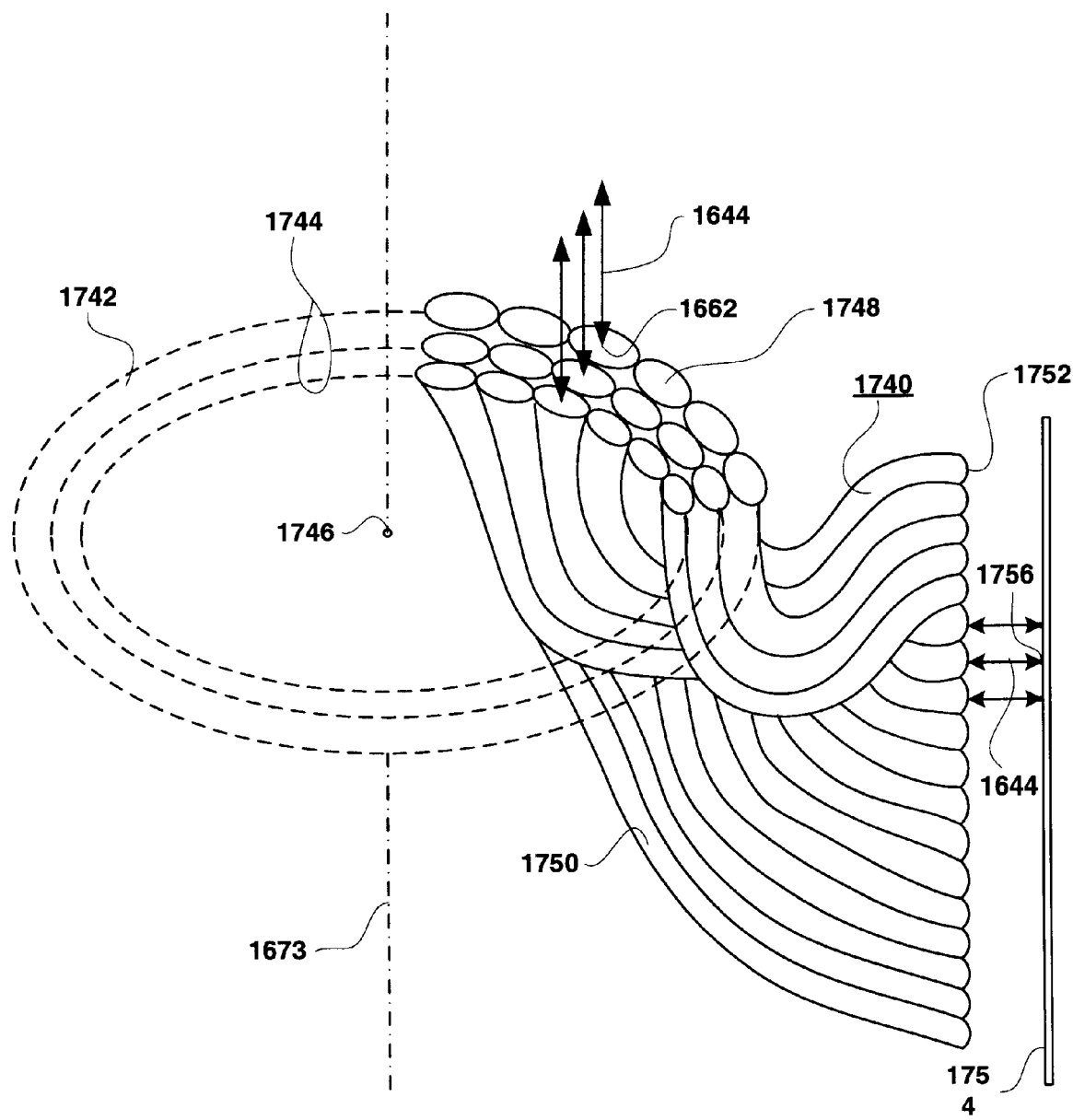

FIGS. 17a and 17b illustrate a side view of planar scan system according to the invention and a scanned region in the form of a bundle of radiation guides, respectively.

Figure 18:
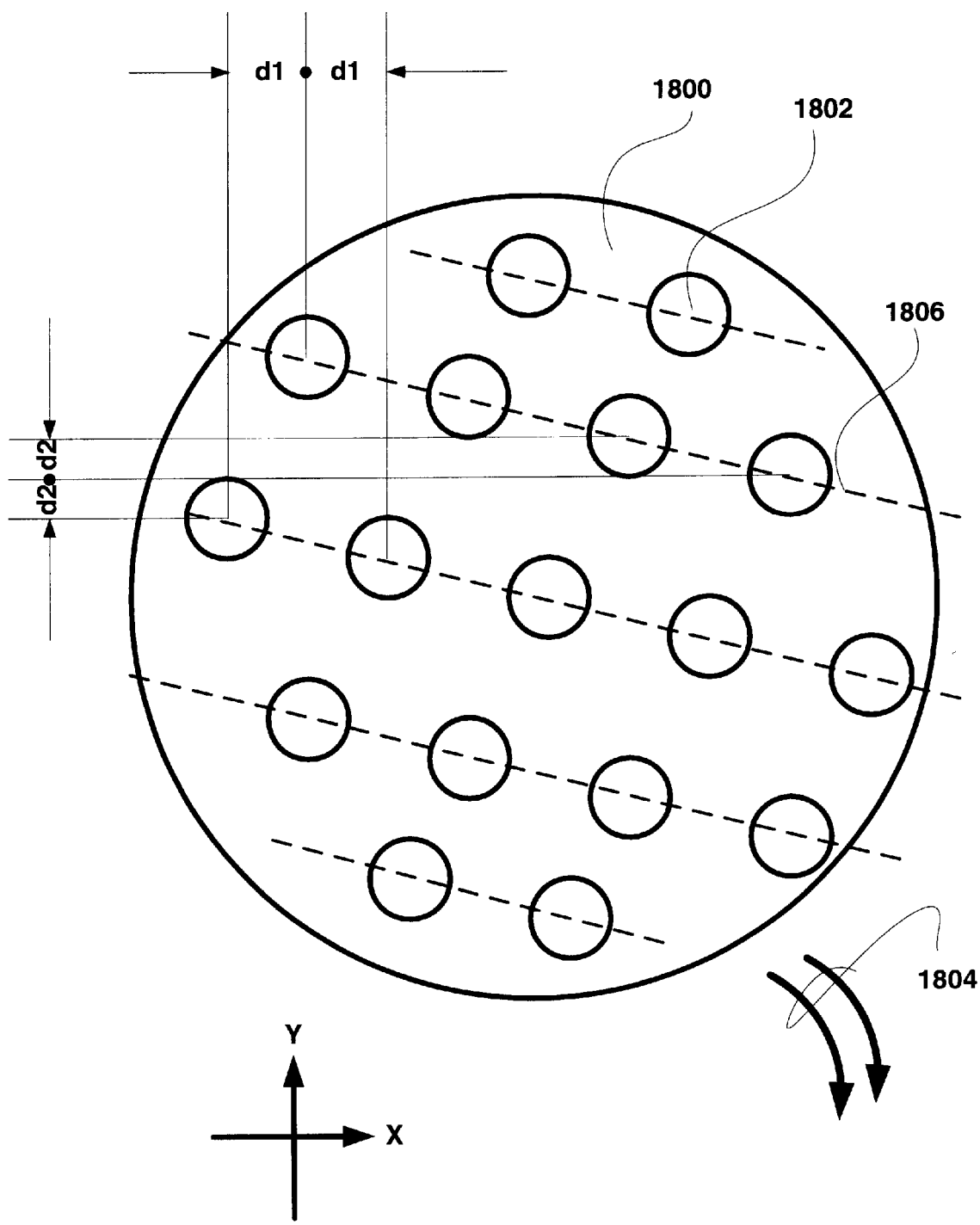

FIG. 18 shows a schematic top view of a pinhole array used in the field of scanning confocal microscopes, designed according to the invention.

Figure 19A:
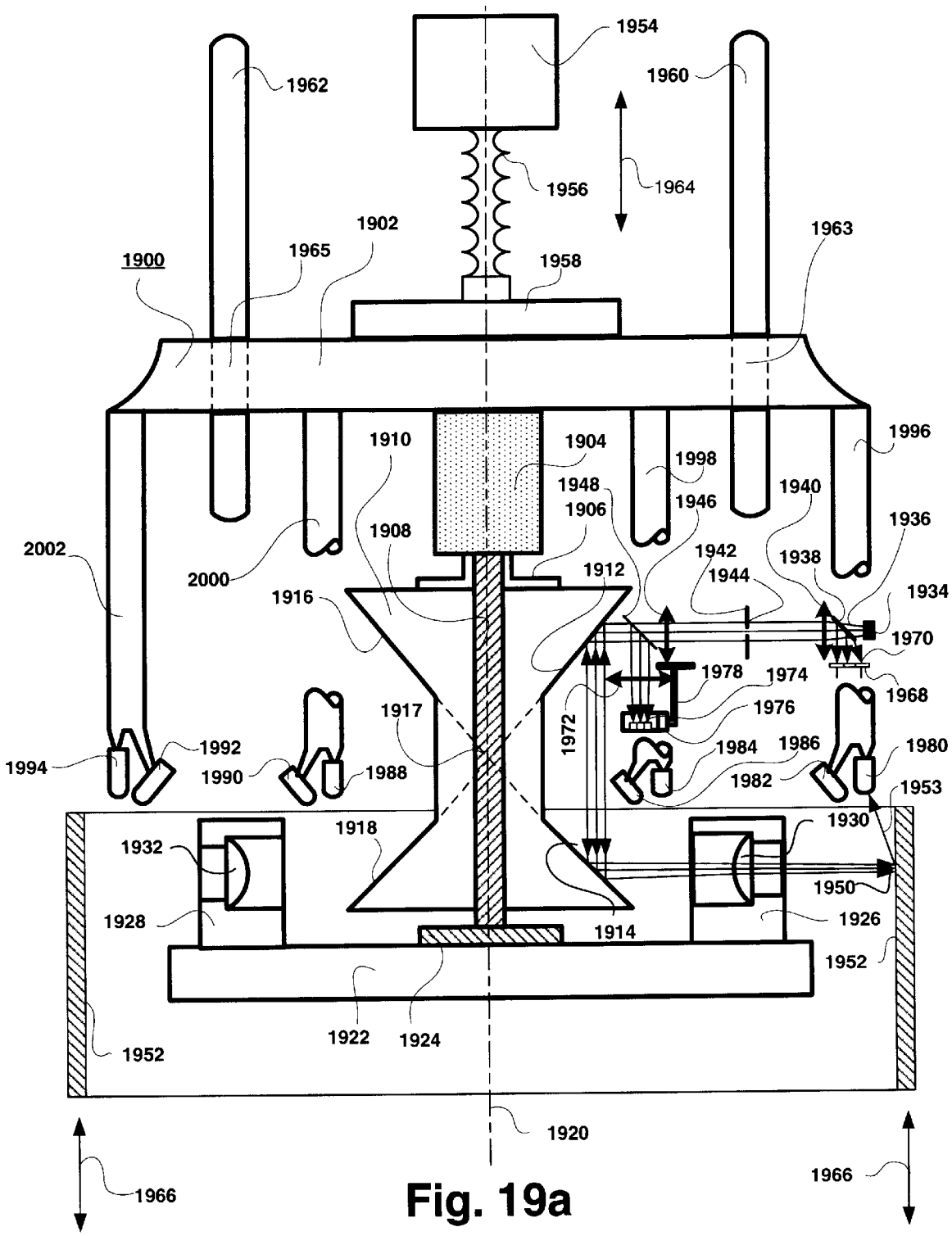
Figure 19B:
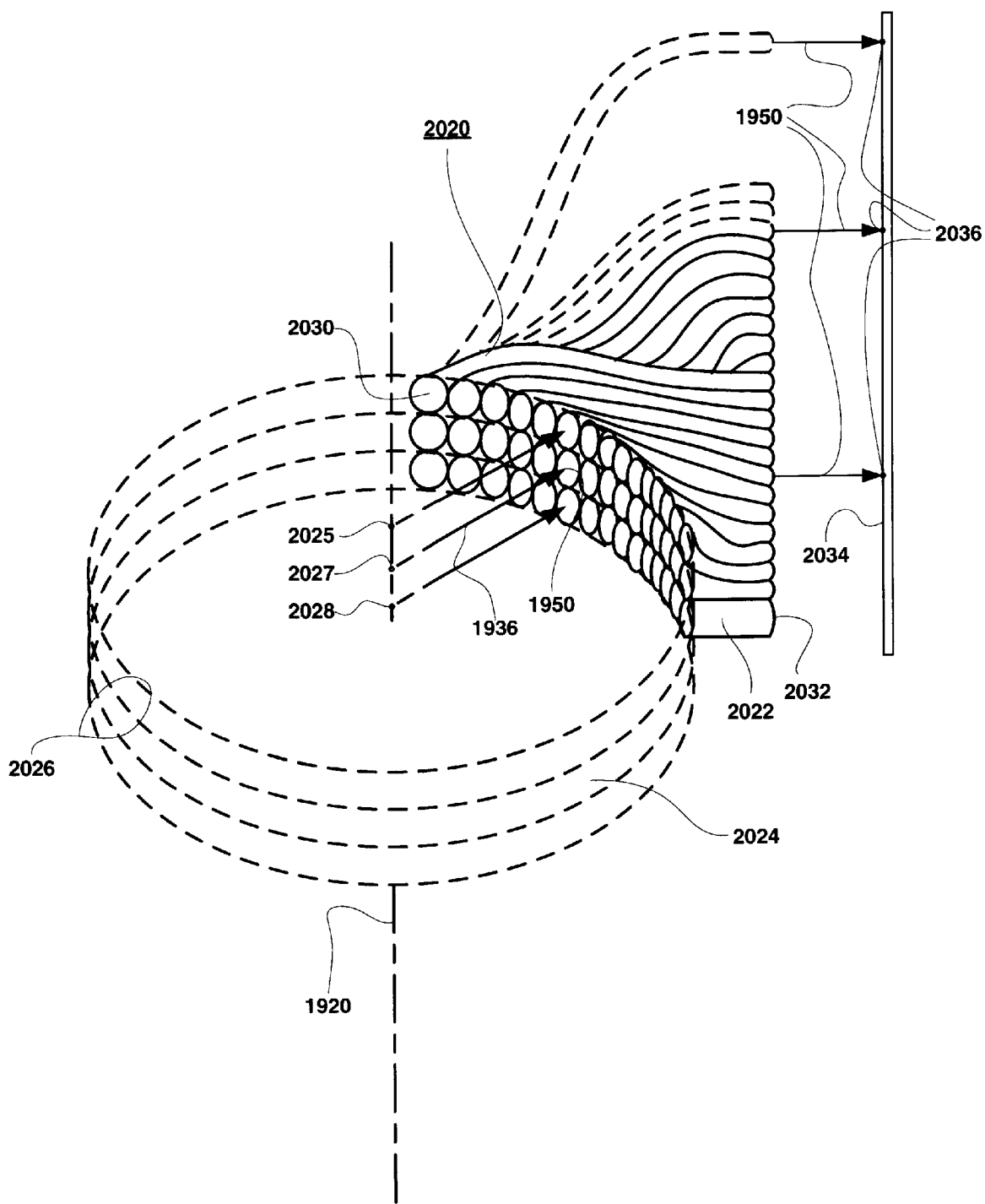

FIGS. 19a and 19b illustrate a side view of inner drum scan system according to the invention and a scanned region in a form of a bundle of radiation guides, respectively.

Figure 20:
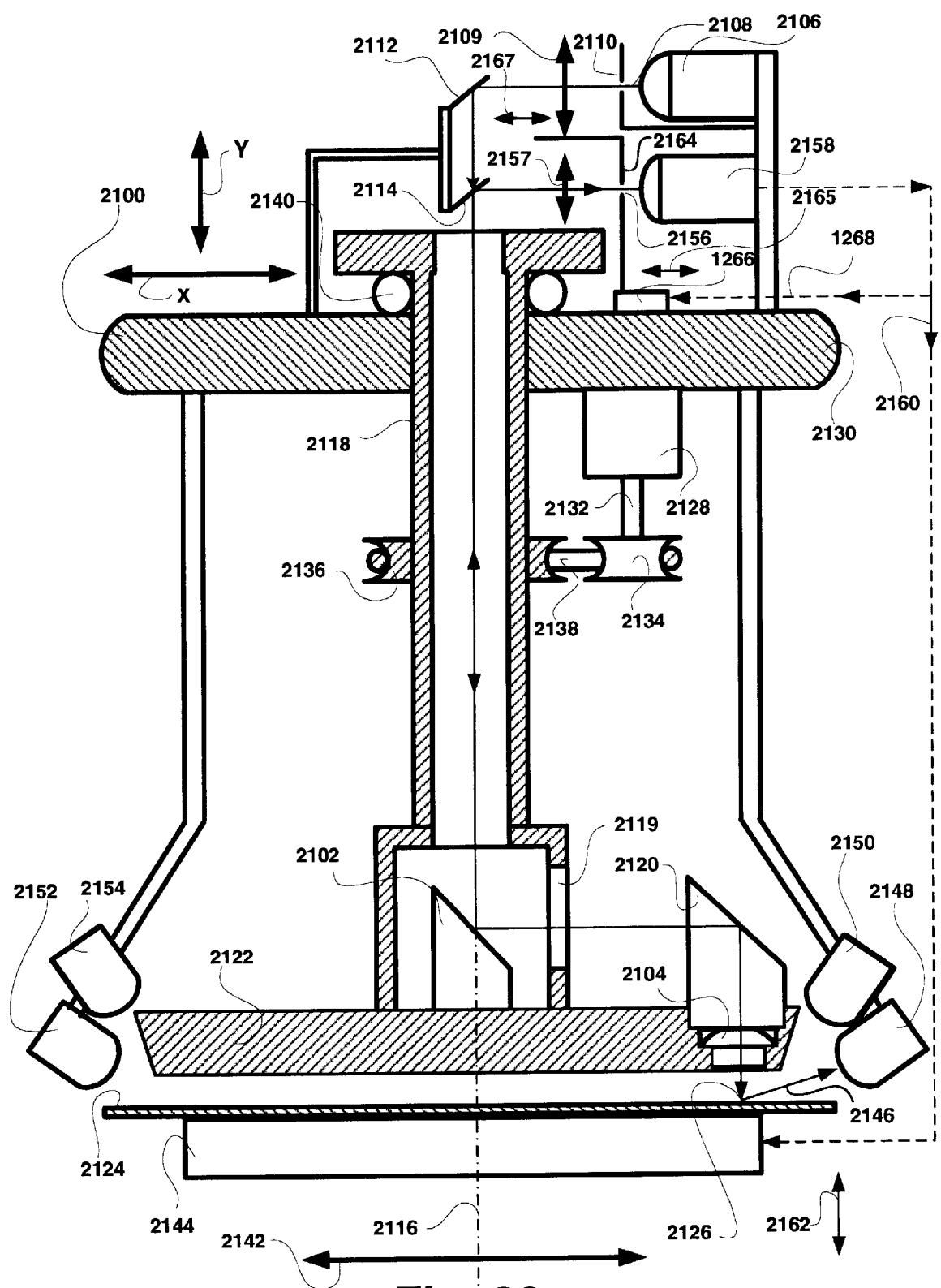

FIG. 20 shows a planar scan system according to the invention for a single scan beam rotating at the same angular velocity as the scan device.

Figure 21:
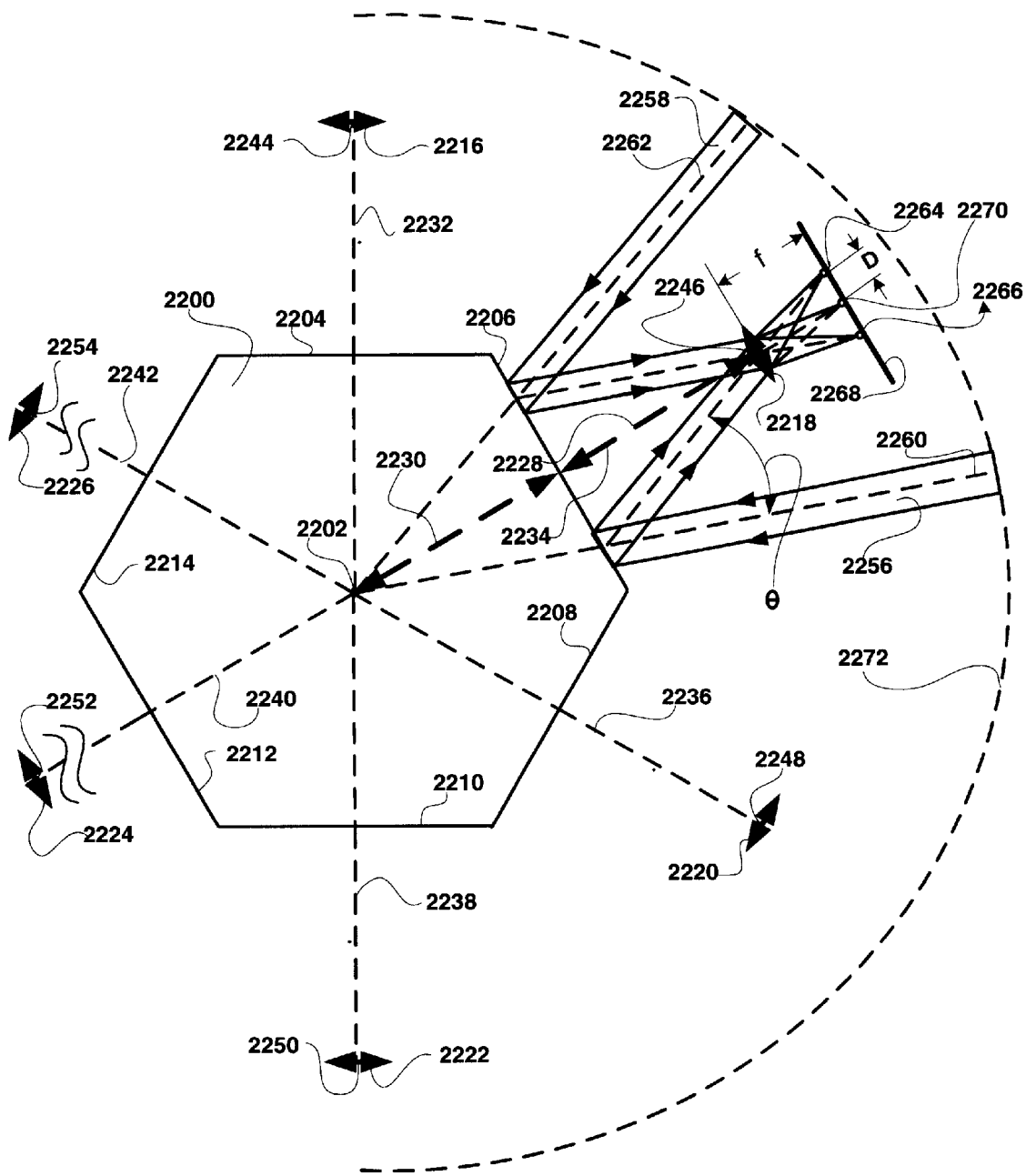

FIG. 21 Illustrates the optical properties of scan polygons used in the system of the invention.

Figure 22A:
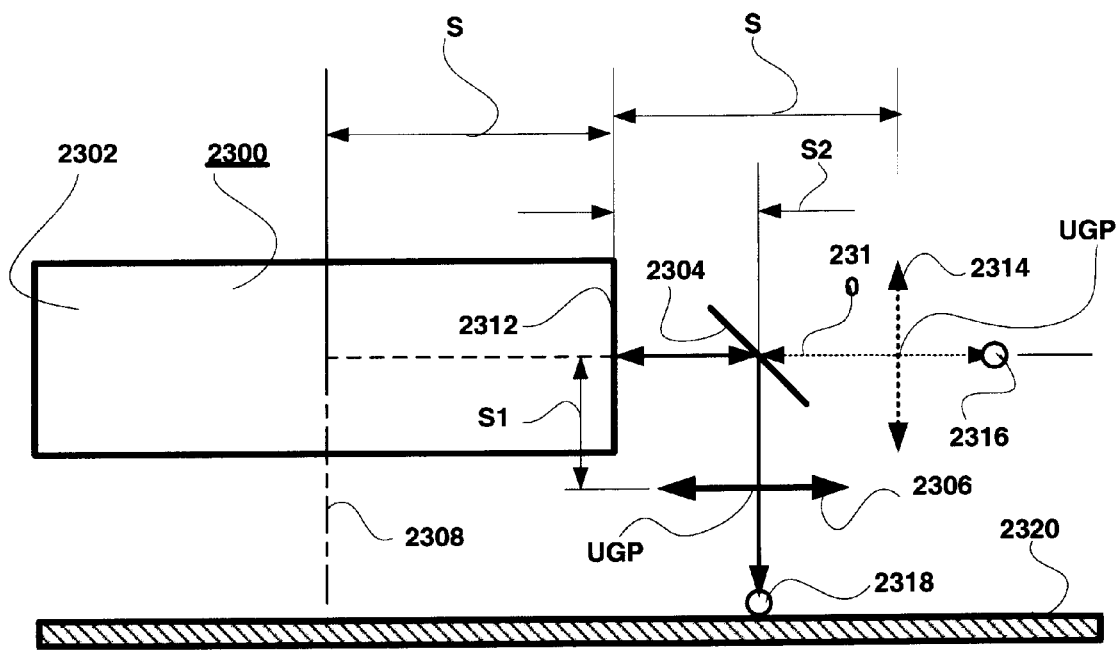
Figure 22B:
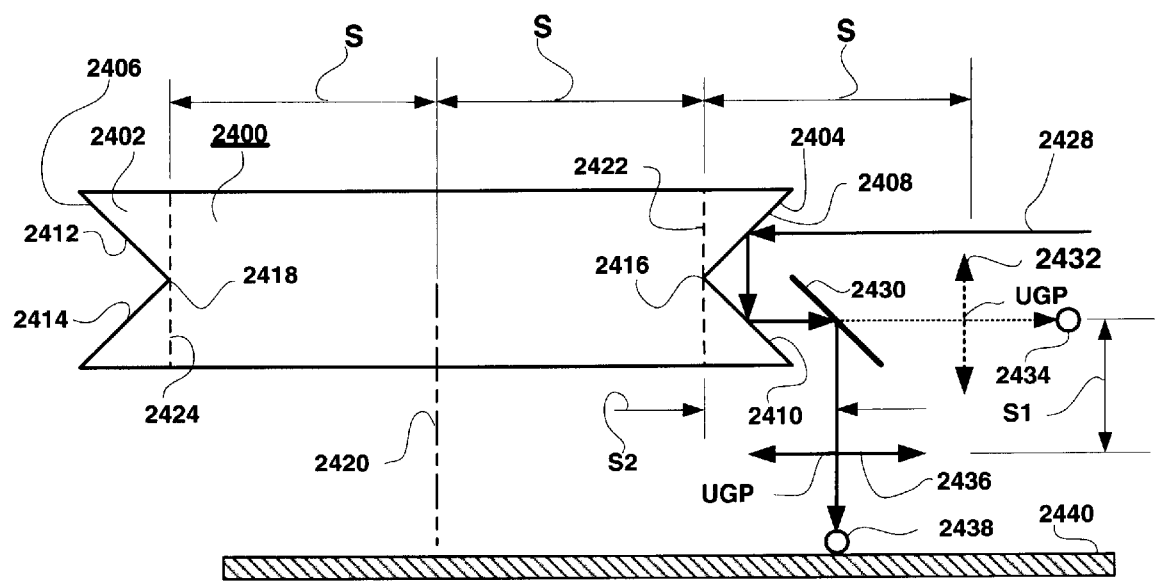

FIGS. 22a and 22b illustrate scan configurations according to the invention.

Figure 23:
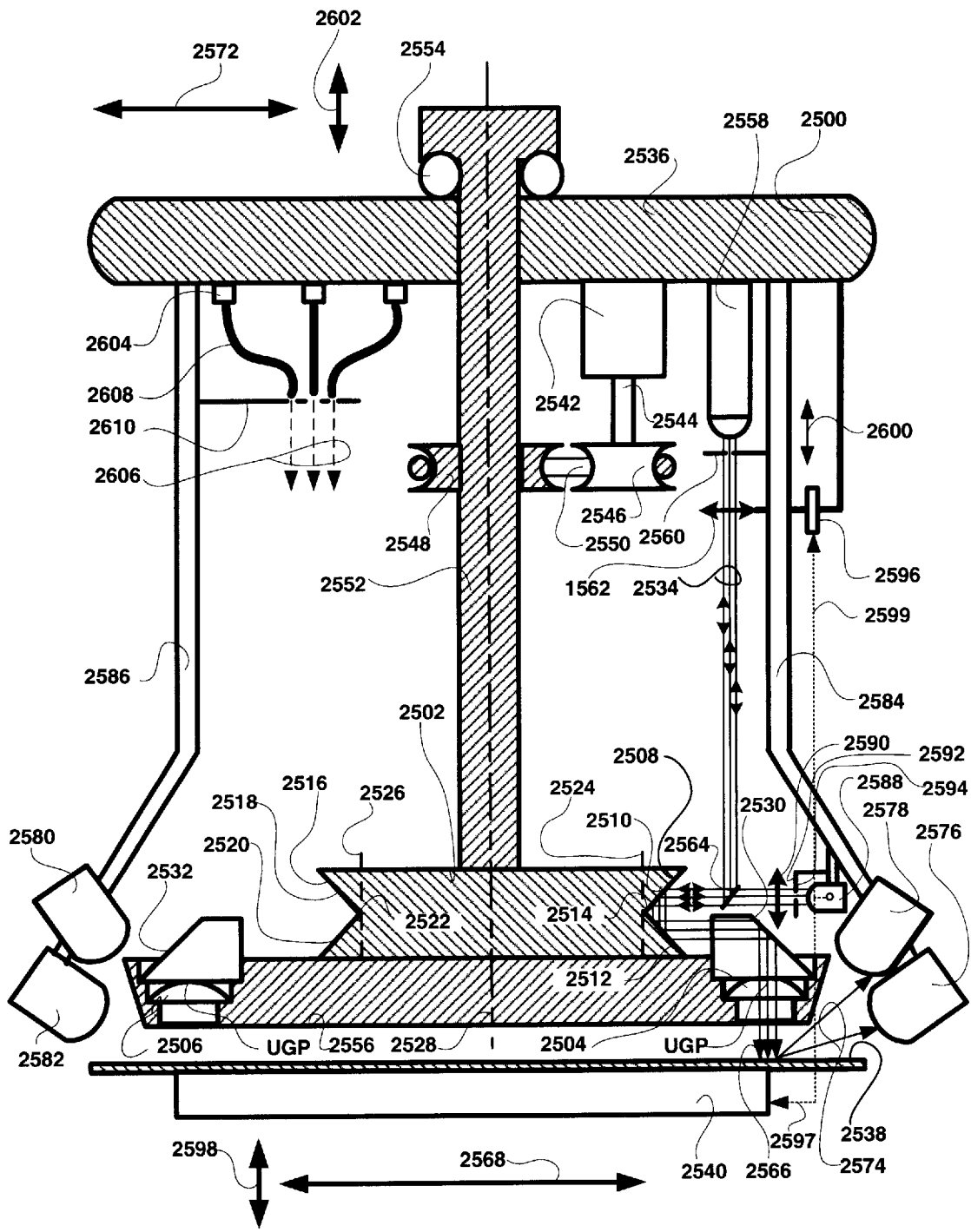

FIG. 23 illustrates a planar scan system according to the invention using a scan device and scan lenses rotating at the same speed.

SUMMARY

A scan system for writing, plotting, engraving, printing, photolithography includes a plurality of radiation sources, a lens system, an autofocus system, a rotating scan device, a rotating medium support, a rotating scan lens system, and a region. The radiation sources emit at least one radiation beam. The lens system includes at least one lens for receiving and collecting the radiation beam from the radiation source and for converting the beam into a directed beam. A rotating scan device has a rotational axis for receiving the directed beam from the lens of the lens system and for reflecting the directed beam as a rotating scan beam. The latter beam rotates about the rotational axis of the rotating scan device and is directed along lines that pass through its rotational axis. A rotating medium support rotates about the rotational axis of the rotating scan device for carrying the rotating lens system. The lens of the rotating lens system is arranged to receive from the rotating scan device the rotating scan beam with substantially no relative movement between the lens and the beam for producing at least one focusing beam. A region is arranged to receive at least one focused radiation spot formed on it by the focusing beam. The focused radiation spot moves on the region at a rotational velocity equal to the rotational velocity of the rotating lens system and along lines that appear substantially circular and have a center point located on the rotational axis of the rotating scan device. An autofocus system for controlling the distance between the radiation source and the lens of the lens system maintains the size of the focused radiation spot on the scanned region to be minimal all over the scan range.

The system has four versions:

(1) The rotating medium support carries the one lens of the rotating lens system in a position such that when the optical axis of the lens of the rotating lens system is directed along lines which pass through the rotational axis of the rotating scan device, the lens directly receives, from the rotating device, the rotating scan beam. In this version the region has a cylinder-like shape.

(2) The rotating medium support carries the lens of the rotating lens system in a position such that when the optical axis of the lens is directed along lines that are parallel to the axis of the rotating scan device, the lens receives, from the scan device, the rotating scan beam. The beam is received either directly or via at least one folding mirror (shifting mirror), In this version the region has a plane like shape.

(3) A scan system for reading and inspecting includes a region, a rotating medium support, a rotating scan lens system, a rotating scan device, autofocus systems, a lens system, and at least one radiation sink. The design of the system is similar to the design of the above two versions, except for the radiation sources. These are replaced by radiation sinks for the direction of propagation of the beams. The propagation direction of the beams is inverted, so that instead of being from the radiation source to the region (along the optical path as described above) they travel from the region to the radiation sinks via the same optical path.

(4) A scan system for writing and/or reading, inspecting and/or engraving, plotting, and photolithography includes radiation sources, radiation sinks, beam-splitters, a lens system, autofocus systems, a rotating scan device, a rotating medium support, a rotating scan lens system, and a region. This version combines the first two versions with the third version. At least one directed beam that propagates from at least one lens of the lens system passes through at least one beam splitter and continues to propagate toward the region along the same optical path as in the first two versions. At least one radiation beam reflected from the region propagates in the inverted direction toward at least one beam splitter along the optical path of the third version of the invention. From at least one beam splitter the radiation is reflected toward at least one radiation sink and is collected there.

In all versions with a region having a cylinder-like shape an area scan is produced by introducing relative movement between the scan system and the region and along or parallel to the rotational axis. Also where a region has a plane-like shape an area scan is produced by introducing relative movement between the scan system and the region and along the region. Alternatively an area scan can be achieved by introducing additional movement to at least one lens of the rotating scan lens system and along the radial direction of the rotational axis of the rotating scan device.

FIGS. 3a, 3b, 3c, and 3d—Properties of Spinning Scan Devices Used in Preferred Embodiment FIGS. 3a, 3b, 3c, and 3d illustrate spinning and scan-devices; some of their optical properties are used in the present system.

Figure 1:
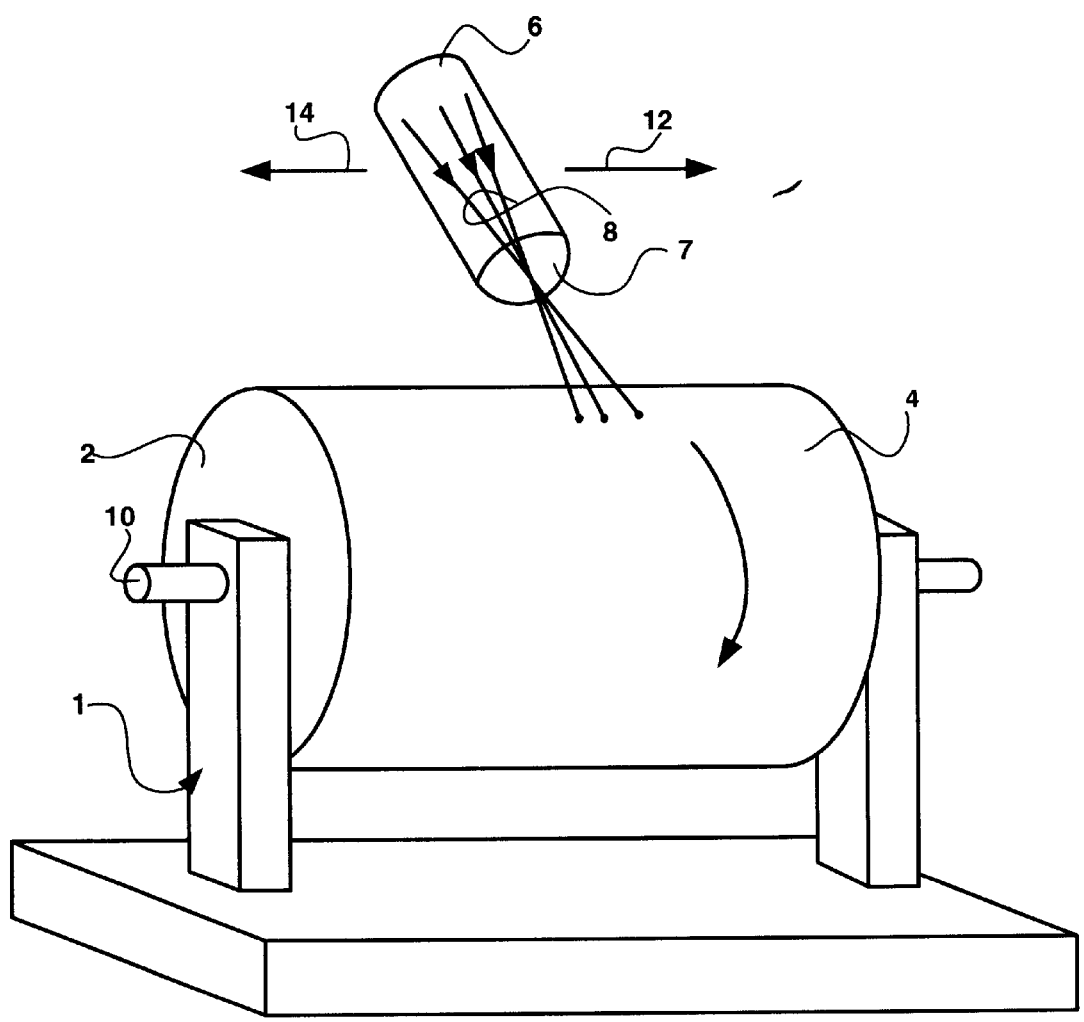
FIG. 1 illustrates a prior-art external drum scan system.
Figure 2:
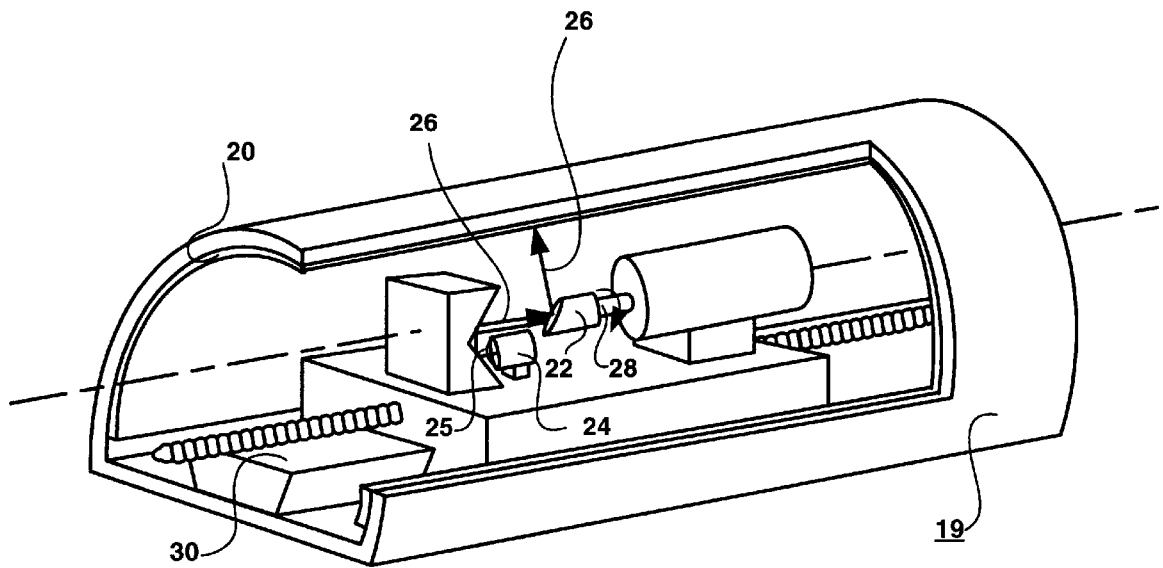
FIG. 2 illustrates a prior-art internal drum scan system.
Figure 3A:
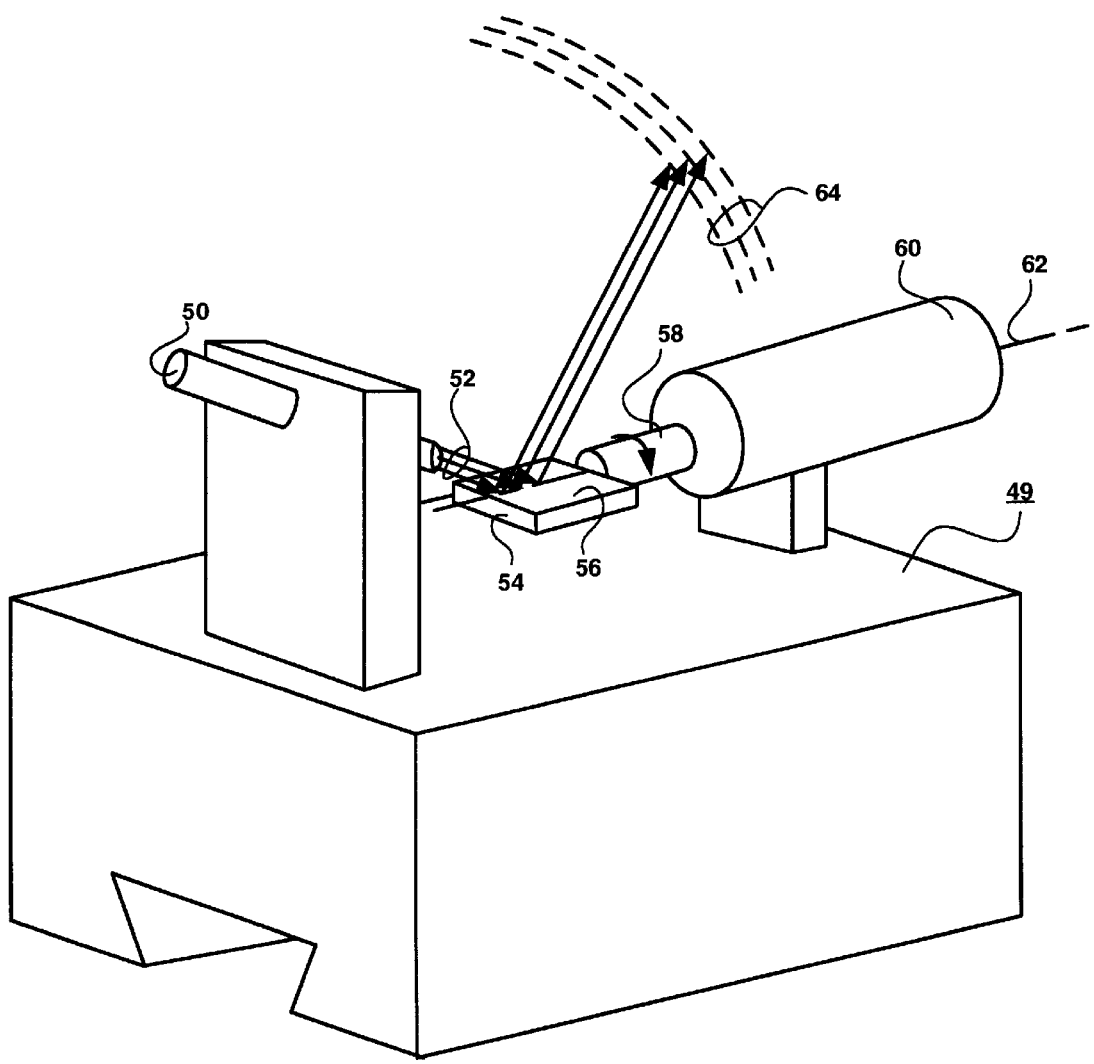

FIG. 3a illustrates a spinning and scan device 49 that can scan using multiple beams where each of the scanned beams is aligned over the entire scan range along a rotating line that passes through the rotational axis of the device. Radiation source 50 emits multiple beams 52 toward spinning flat-mirror 54, which has a reflecting plane 56. Mirror 54 is mounted on axis 58 of motor 60 that spins it. Axis 58 spins around its rotational axis 62. Plane 56 includes rotational axis 62. Beams 52 emitted from head 50 are aligned to axis 62. For any scan position of mirror 54, beams 52 are reflected from surface 56 along lines that pass through axis 62 and are projected along cylindrical lines 64.

Figure 3B:
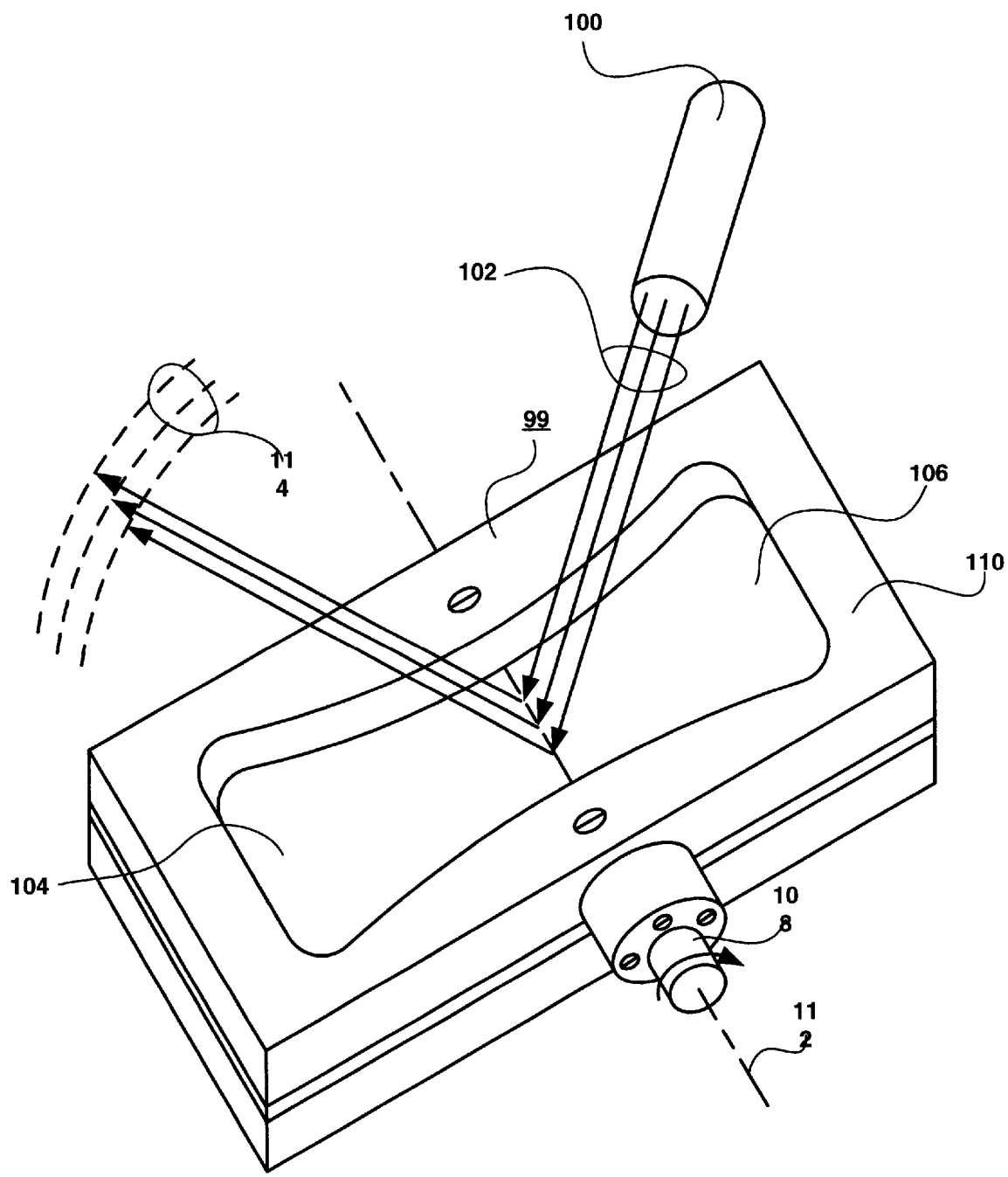

FIG. 3b illustrates another spinning and scan device 99 that can scan multiple beams when each beam is aligned over the entire scan range along a rotating line that passes through the rotational axis of the device. Radiation source 100 emits multiple beams 102 toward a spinning flat-foil 104 having two reflecting planes: plane 106 on its front side and an additional reflecting plane on its backside (not shown). Foil 104 is mounted in holding frame 110, which is attached to rotational axis 108. Axis 112 spins around its rotational axis 112. For a good approximation, since foil 104 is very thin, it can be assumed that both of its planes, front and back, contain rotational axis 112 to which beams 102 emitted from head 100 are aligned.

For any scan position of foil 104, beams 102 are reflected from both front and back surfaces along lines that pass through axis 112 and are projected along cylindrical lines 114. In principle spinning and scan device 99 of FIG. 3b is superior to device 49 of FIG. 3a since it has the advantage of two scan surfaces. On the other hand, device 99 is not as practical since it is not easily produced and its foil suffers from vibrations during a scan.

Figure 3C:
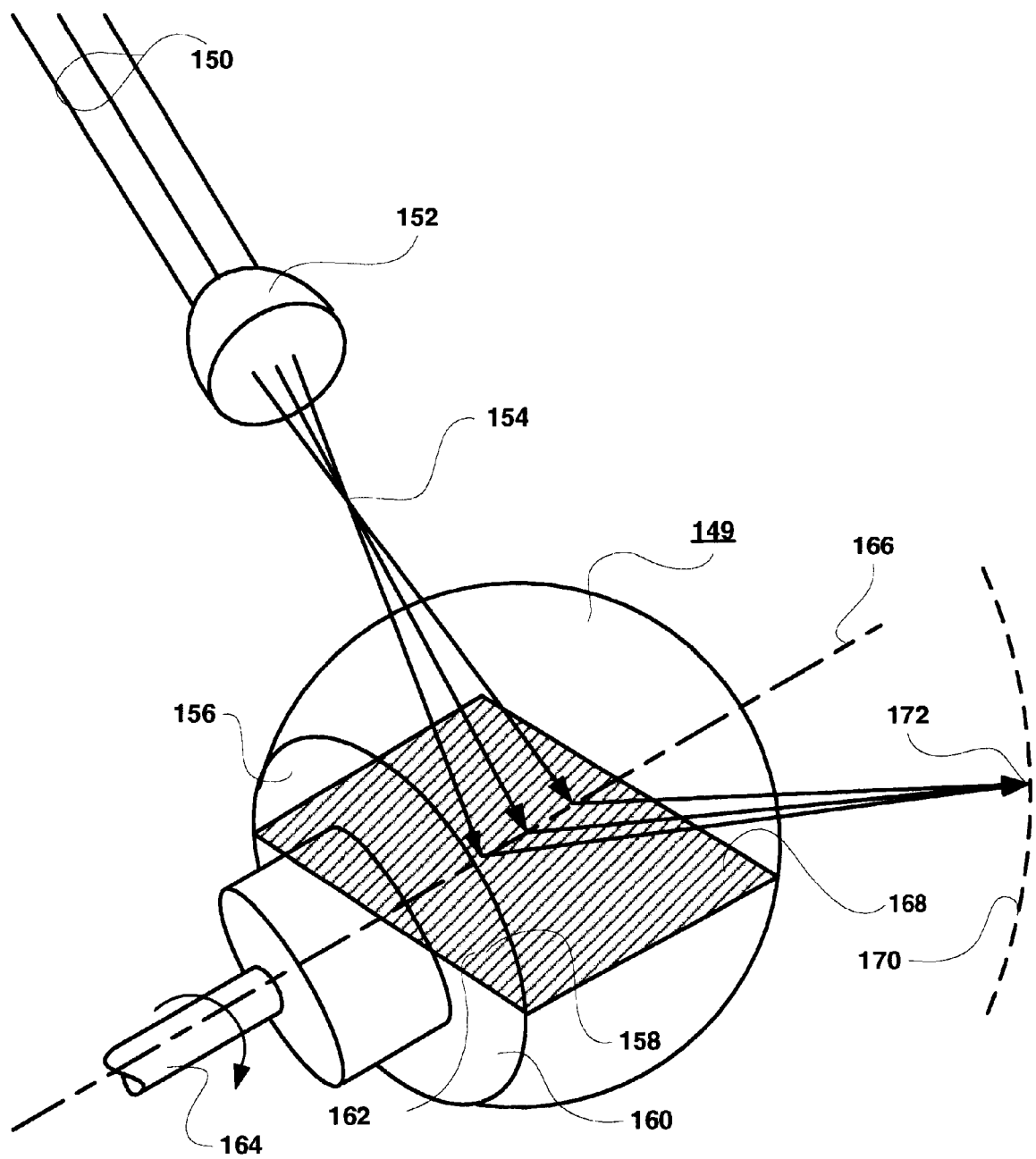

FIG. 3c illustrates a spinning and scan device 149, similar to device 99 of FIG. 3b, that can be produced more readily. Its reflecting surfaces do not suffer from vibrations. Though device 149 can scan multiple beams when each of the beams is aligned over the entire scan range along a rotating line that passes through the rotational axis of the device, only a single beam is shown. Collimated beam 150 is focused by lens 152 into radiation spot 154. From spot 154, beam 150 continues to propagate toward spinning sphere 156. Sphere 156 consists of two half-spheres 158 and 160. One of them is coated on its flat surface with a thin reflecting layer 162 and is bonded to the other half-sphere with a strong transparent glue. Rotating axle 164 is attached to sphere 156 and spins it.

Axle 164 spins around its rotational axis 166. For a good approximation, since layer 162 is very thin, it can be assumed that both of its planes, front plane 168 and its back plane (not shown) contain rotational axis 166 to which beam 150 is aligned. For any scan position of layer 162, beam 150 is reflected from both front and back surfaces along a rotating line that passes through axis 166 and is projected during the scan along cylindrical line 170. In addition to scan layer 162, sphere 156 also acts as spherical lens that transmits image focusing spot 154 to radiation spot 172 on line 170.

Figure 3D:
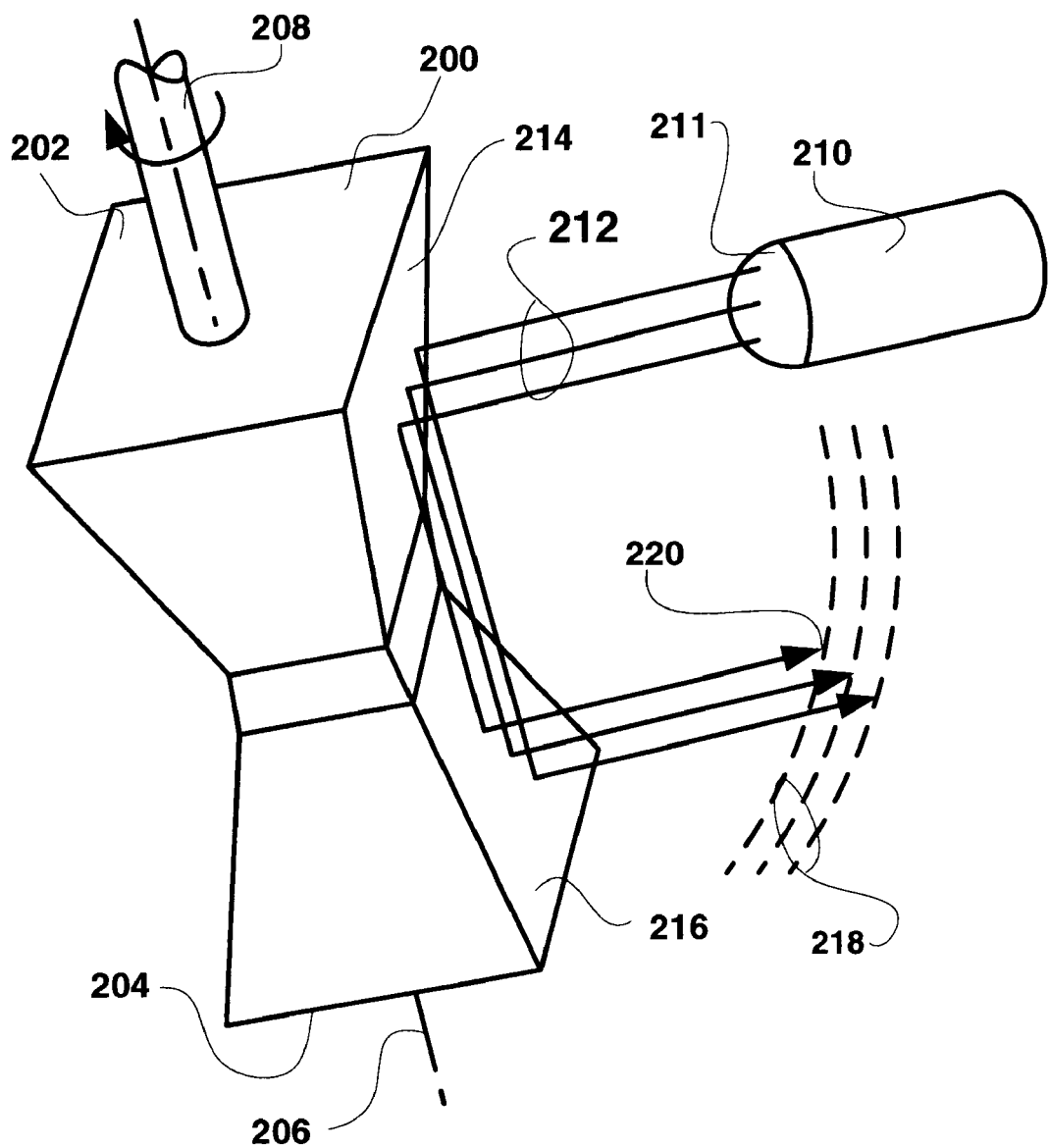

FIG. 3d illustrates a spinning and scan device 200 designed according to the above '438 patent. Device 200 includes upper polygonal mirrors 202 and lower polygonal mirrors 204. Both polygons 202 and 204 have tilted reflecting facets. All of the planes that contain these tilted facets intersect on a line or a point located on rotational axis 206.

Each pair of tilted facets, such as facets 214 and 216 of polygons 202 and 204, are oriented at right angles to each other and create a retro-reflector. This retro-reflector behaves effectively like a mirror. Its reflecting surface includes rotational axis 206 with an additional vertical displacement along rotational axis 206. Device 200 has an axis 208 that spins with device 200 around rotational axis 206. Head 210 has a focusing lens 211 and emits multiple beams 212 oriented toward rotational axis 206 and toward facet 214 of polygon 202 in device 200. Beams 212 are reflected out of device 202 along rotating lines, each of which passes through rotational axis 206 and scans focused spots 220 along cylindrical lines 218. Device 200 has the advantage that any number of scan sides can be used; it is not limited to two sides. Also device 202 does not suffer from the unwanted phenomena of wobble and jitter.

The important property of all the spinning and scan devices of FIGS. 3a to 3d is their ability to produce an accurate scan of multiple beams along circular lines at a rotational speed that is precisely twice the rotational speed of these devices. Alternatively it is possible to use these devices with multiple beams for producing accurate tracking of objects moving along circular lines at precisely twice the rotational speed of the device. The most attractive device is the one of FIG. 3d due to its large number of sides, which allows the device to produce a periodic scan with a high repetition rate. As widely discussed and explained in the above '438 patent, it is impossible to accurately scan or track along circular lines using a conventional polygon due to its off-axis facets.

Some of the following descriptions, explanations, and their accompanied drawings may refer to and illustrate one of the devices. These are given as examples only and any specific scan device may represent any of the devices illustrated in FIGS. 2 and 3a to 3d with their description.

FIG. 4—High-Resolution Internal Cylindrical Scanning—First Preferred Embodiment FIG. 4 illustrates an internal drum scanner according to the invention. Scanner 300 has a radiation source 302 that emits multiple radiation beams 304 toward folding mirror 306. Mirror 306 receives beams 304 from source 302 and directs them toward spinning and scan device 308. Facet 310 of device 308 receives beams 304 from mirror 306 and reflects them toward facet 312 of device 308. From facet 312 beams 304 are reflected out of device 308. Beams 304 are oriented along lines that pass through rotational axis 314. Motor 316 has two spinning concentric axes 318 and 320. Device 308 is attached to outer axis 318. Inner axis 320 passes through axis 318 and device 308 (without touching) and is attached to rotating support 322, which carries lenses 324 and 326. Motor 316 spins axis 318 with device 308 mounted on it at a first rotational speed $\omega 1$ and spins axis 320 with support 322 mounted on it at a rotational speed $\omega 2$ that is twice rotational speed $\omega 1$. Axis 318, axis 320, device 308, and support 322 all spin around common rotational axis 314.

While device 308 spins at the first rotational speed ω1, beams 304 reflected from device 308 spin around axis 314 at twice the rotational speed ω2, where ω2=2·ω1. Beams 304 reflected from device 308 are oriented toward lens 324 mounted on support 322 and spin with support 322 at the double rotational speed. Since both lens 324 and beams 304 rotate and spin at the same speed, they have no relative movement between them. Accordingly beams 304 track lens 324 while both of them are in motion. Lens 324 focuses beams 304 into multiple radiation spots 328 onto surface 330. Lenses 324 and 326 are located close to surface 330 and thus have short focal lengths. In this situation lenses 324 and 326 can have an f number close to 1 and can be diffraction-limited quality for producing a very high scan resolution.

Surface 330 can be made from a flexible material to be inserted into drum 332 for providing a cylindrical shape. Along surface 330 the distance between lenses 324 and 326 is maintained fixed all over the scan range. Thus the conditions of focusing of beams 304 by lenses 324 and 326 on surface 330 are also maintained fixed all over the scan range. Surface 330 can be used for engraving, as is usually done with aluminum plates. For example, surface 330 can also be made from film coated with a light-sensitive material, as usually done in the pre-printing industry. This film is photographically developed to convert it into a projecting mask. This mask is used in photolithography to expose an aluminum plate for converting it into a printing plate by post etching. The plate is inked and pressed by the printing machine to produce the desired printing.

Device 308 has, for example, four sides. Each of the sides contains a pair of facets, like facets 310 and 312. Since the double rotational speed of spinning beams 304 is twice the rotational speed of device 308, it is clear that the rotational scan angle of beams 304 is twice the rotational scan angle of device 308. Beams 304 track lenses 324 and 326 which also rotate at ω2=2·ω1 and thus also have a rotational scan angle that is twice the rotational scan angle of device 308. Accordingly if the device has M sides, each side has a rotational scan angle that is equal to 360/M degrees. This corresponds the corresponding rotating scan lenses, which each have a rotational scan angle 2*360/M. This means that for an M-sided device, only M/2 scan lenses are required.

In the example of FIG. 4 device 308 has four sides and thus rotating support 322 has only two (4/2) lenses, lens 324 and lens 326. The rotational scan angle of each side of device 308 is 90 degrees and the corresponding rotational scan angle of lenses 324 and 326 is 180 degrees and is equal to the rotational angle of half the cylindrical shape in which surface 330 is set. The periodical rotational scan of each side of the sides of device 308 is 90 degrees. During this scan, beams 304 track one lens out of the group of lenses 324 and 326 along a rotational angle of 180 degrees. This means that two opposite sides of device 308 will always be related to the tracking of lens 324 and the other two opposite sides of device 308 will always be related to the tracking of lens 326.

For producing an area scan, all optical parts of the scanner should have relative movement with respect to surface 330 and along or parallel to axis 314. Such relative movement can be produced by either moving the optical parts when surface 330 is static or by moving surface 330 when the optical parts are static. A mechanical system for moving the optical components along and parallel to axis 314 includes motor 334 mounted on base plate 336 that spins guiding screw 338. Spinning screw 338 passes through mounting base 340 that carries motor 316 and causes base 340 to slide on guiding rail 342 parallel to axis 314. Arm 344 is attached to motor 316 and carries mounting bar 346 that supports source 302. Motor 316 also carries base 348, which has a mounting arm 350 that carries mirror 306. Accordingly it can be seen that base 340 actually carries all the components of the optical system. Thus when base 340 slides along rail 342, it introduces a movement in the direction of axis 314. This movement adds, to scan spots 328 that move on surface 330 along circular lines, an additional linear movement parallel to the direction of axis 314. The combination of the movements of spots 328 on surface 330, i.e., the circular movement around axis 314 with the linear movement parallel to axis 314, produces a screw-shaped scan of surface 330 by spots 328.

Surface 330 may represent any scanned surface having a cylindrical or a portion of a cylindrical shape. It especially may represent flexible surfaces that can be bent to fit the shape of guiding drum 332. Surface 330 can be an aluminum plate to be used in a Computer To Plate (CTP) scanner or plotter used in a direct writing process for the preparation of printing plates. Such plates are used as printing masks in prepress applications. (In prepress applications printing plates are inked and pressed onto a printed surface during the printing process.)

While FIG. 4 shows a writing, printing, or engraving system, such a system can be operated as a reading, inspecting, or viewing system. When replacing radiation source 302 with a radiation sink, the propagation of the radiation beams is inverted. Rotating lenses 324 and 326 collect multiple beams from their fields of view that they form and move on surface 300 and direct them to spinning device 308 that reflects them at a fixed orientation toward mirror 306. From mirror 306 the beams propagate toward the radiation sink and are collected there.

The system of FIG. 4 demonstrates a major principle of the invention that enables scans to be produced with ultra-high resolution, limited only by the diffraction limit of rotational lenses 324 and 326. In general, when using a rotational lens which is quality-of-diffraction limited, the scan resolution d (also known as an Arry disk) is given by:

$$d=1.22\lambda f/D$$

In the above equation $\lambda$ is the radiation wavelength, f is the focal length of the rotational lens, and D is the size of the radiation spot projected on the rotational lens by the scan beam reflected out from the scan device. Accordingly the resolution is improved with the decrease of f and with the increase of D.

The system of FIG. 4 includes a post-focusing technique i.e., a technique in which the focusing of scan beams 304 is done after their reflection from scan device 308. Due to the post focussing technique, the focal length f of rotational lenses 324 and 326 should be equal only to the distance between these lenses and the scanned region and thus it can be selected to be as small as desired. The maximum size of D is equal to f/F where F is the f-number of rotational lenses 324 and 326.

The best scan resolution is achieved when the sizes of the radiation spots on rotational lenses 324 and 326 is equal to the maximum size of D. In this case the sizes of the radiation spots is equal to the entire useable size of these lenses. In this arrangement, a proper operation of the system shown in FIG. 4 must assure that scan beams 304 track rotational lenses 324 and 326 very accurately without any translation between them. It is necessary to avoid such translation in order to maintain, over the entire scan range, a situation in which the useable area of rotational lenses 324 and 326 completely includes the radiation spots projected by scan beams 304 toward these lenses.

The combination of the tracking system with post focussing illustrated in FIG. 4 has a major advantage over known scan systems. This is the ability to maintain diffraction-limited resolution over an unlimited scan range. The scan range depends only on the rotational radius of the rotating lens and can be chosen to be as large as desired without any limitation on the scan range or the resolution. On the contrary, in other known scan systems that have a static scan lens, the scan range increases with the focal length f of the scan lens. Increasing the length f causes degradation in the scan resolution. This means that, unlike the system shown in FIG. 4 that can maintain a diffraction-limited resolution over any desired scan range, other known scan systems suffer from resolution degradation with an increase of the scan range.

The post-focussing technique has the additional important advantage of using a short focal length f which reduces unwanted scan deviations caused by production tolerances of the scan device. These tolerances have strong negative effects, especially when the scan device has multiple scan sides. In this case each side of the scan device may reflect the scan beam at a different angle. In such a situation when the reflection-angle deviation is $\delta\phi$, then the scan deviation is $\delta\phi \cdot R$ when R is the scan radius. In the present scan system, the scan deviation is $\delta\phi \cdot f$. Since f is much smaller then R, the scan deviations caused by production tolerances of the scan device are smaller by a factor of f/R than the scan deviations in other known scan systems.

The system of FIG. 4 demonstrates the principle of using a post focussing technique with highly accurate tracking of rotational lenses 324 and 326 by scan beams 304, with substantially no translation between them. This principle assures high-resolution scanning over any desired scan range with at least one radiation beam. This advantage is common to all other embodiments described below.

Scanner or plotter 300 exhibits very fast internal scanning due to the use of multiple beams 304 while maintaining very high resolution due to its rotational lenses 324 and 326. The combination of a fast scan at a high resolution enables the scanner to be used in many new fields for many new applications. Some of these applications are reading, inspecting, or viewing very dense information, such as the information written on computer disks, video disks, DVDs, PCBs, or silicon wafers used in the IC industry. Alternatively scanner 300 can be used for writing applications, such as writing very dense information on computer disks, video disks, and DVDs. Scanner 300 can also be used for direct laser beam writing on wafers or for lithographic application on masks used for exposing wafers, such as silicon IC wafers.

FIG. 5—High-Resolution Reading and Writing Using Internal Cylindrical Scan—Second Preferred Embodiment FIG. 5 illustrates an internal drum scanner designed according to the invention for high resolution reading and writing. Scanner 400 includes light source 402 that emits multiple beams 404. Beams 404 pass through beam splitter 406 and propagate toward focusing lens 408, which converts them into focusing beams. From lens 408 focusing beams 404 continues to propagate toward mirror 410 that reflects them toward spinning and scan device 412. Device 412 consists of multiple devices 414, 416, and 418 connected in a row. Each of them has a similar structure and a similar mode of operation as device 308 of FIG. 4.

Beams 404 hit device 414 and are reflected out of device 414 as spinning scan beams 404. Motor 420 spins two concentric axes 422 and 424. Outer axis 422 is attached to device 412 and spins it at angular velocity $\omega 1$. Inner axis 424 passes through axis 422 and device 412 without touching them. Motor 420 spins axis 424 at rotational speed $\omega 2 = 2 \cdot \omega 1$. Frame 426 supports axis 424 by hole 428 and supports axis 422 by hole 430. Axis 424 spins lens support 432 at rotational speed $\omega 2$ and thus scan beams 404 track lenses 434 and 436 that are mounted on lens support 432. Lenses 434 and 436 are close to cylinder 438 and have large numerical aperture and thus produce a scan with high resolution by focusing beams 404 into small radiation spots 440 on the surface of cylinder 438. Axis 422, axis 424 device 412, lens support 432, lens 434, and lens 436 all spin and rotate around rotational axis 478.

Radiation spots 440 can be used for writing on surface 438 or for illuminating surface 438 at high intensity for reading purposes. When using the scan system for illuminating the desired region to be read, lenses 434 and 436 collect the multiple radiation beams reflected from surface 438 as beams 442. Beams 442 propagate in a direction opposite to the direction along which illuminating beams 404 propagated before, but along the same optical path. Accordingly beams 442 continues to propagate via spinning device 414 and from there along a fixed orientation via mirror 410 and lens 408 toward splitter 406. Beams 442 are reflected from splitter 404 toward radiation sink 444 via splitter 406.

Splitter 446 splits each of beams 442 in conventional fashion so that one part of each beam passes through splitter 446 and another part is reflected. The reflected parts travel toward autofocus system 448. The parts of beams 442 that pass through splitter 446 are lost in the system and are not used in scan applications. Autofocus system 448 can be of the type described in the above '976 patent. Autofocus 448 measures the deviations from the optimal conditions of the focusing conditions of spots 440 on surface 438. These measurements of system 448 produce a controlling signal that is fed to motor 450 by leads 452. The controlling signal produced in system 448 controls motor 450. Motor 450 in turn moves mounting base 456 along the directions indicated by arrows 462. Base 456 carries supporting arm 458 to which lens 408 is connected by bar 460.

The controlling signal causes lens 408 to move into a position in which the focus conditions are optimal. Motor 420 is attached to frame 426 by tube 464 and is connected to bar 468 by rod 470. Bar 468 carries radiation source 402 and beam splitter 406 by arm 472, lens 408 by mounting base 456, autofocus system by box 474, radiation sink 444 by box 474 and beam splitter 446 by box 474, which are all attached to bar 468. Accordingly frame 426 actually carries all the optical components of the system. When frame 426 is moved by screw 476, it moves the whole optical system in the direction of rotational axis 478 for producing an area scan.

Illuminating and reading information from a surface at high resolution with autofocus system control using multiple beams is very attractive. It can replace known systems using computer disks, videodisks, and compact disks. It can be done very fast and the information can be written on at very low cost using materials such as plastic films that are bent into a cylindrical shape. There is no requirement for planarity and the media can be written on very rapidly by engraving using the same scan system. For reading information that consists of tracks and sectors, it is very important to move the scan from one sector to another in a very short time. For shortening the transition time between sectors, the scan can be done over multiple locations, as shown by additional groups of multiple beams 480 and 482 that are a duplication of beams 404. Beams 480 and 482 produce focused radiation spots 484 and 486 on surface 438, respectively, and thus reduce the transition time between scanned sectors and sectors to be scanned.

Surface 438 may represent any surface that can be bent into a cylindrical shape or a portion of a cylinder. IBM has recently announced new displays and electronic circuits that are partly made of organic materials and are very flexible. Such displays and circuits are very attractive for inspection and photolithographic purposes, as in the system of FIG. 5, because they can provide a very fast scan at a very high resolution, as needed in the IC industry.

In some applications planar scanning is important. Known scan systems for high resolution (diffraction limited) cannot scan wide ranges for the reasons explained below and as illustrated in the following FIGS. 6 and 7.

FIG. 6—Planar Scan System—Prior Art

FIG. 6 illustrates a prior-art system 499 for planar scanning. Radiation source 500 emits beams 502 and 504 toward a rotating conventional polygon 506. Polygon 506 reflects beams 502 and 504 out of its facet 508 and toward focusing lens 510 that focuses beams 502 and 504 into scan spots 512 and 514. Spots 512 and 514 move along lines 516 and 518, respectively. The scan range of spots 512 and 514 depends upon the focal length of lens 510. For achieving scan with high resolution the focal length of the lens has to be short. A short focal length provides a narrow scan range

FIG. 7—Planar Scan System with Fiber Optics—Prior Art

FIG. 7 illustrates a prior-art system 600 for planar scanning designed according to the above '483 patent. System 600 includes a radiation source 602 that emits multiple beams 604 toward rotating polygon 606. Polygon 606 reflects beams 604 from its orthogonal facets 608 and 610 toward bundle of optical fibers 612. The receiving side of bundle 612 is arranged in a cylindrical shape 614 for collecting beams 604. Bundle 612 guides beams 604 to its other side where beams 604 are emitted onto a planar region 616. The output of bundle 612 is arranged along a line that can be very wide for producing wide scan range. On the other hand system 600 has a limited resolution that is dictated by the resolution that can be achieved by bundle 612.

FIG. 8—High-Resolution Reading and Writing Using Planar Scan—Third Preferred Embodiment FIG. 8 shows scanner 700 for planar scanning designed according to the invention. Scanner 700 includes motor 702 having two concentric axes 704 and 706. Motor 702 spins outer axis 704 at rotational speed $\omega 1$. Outer axis 704 is attached to polygonal mirrors 708 and thus spins it at the same speed $\omega 1$. Inner axis 706 passes through outer axis 704 and polygon 708 without touching them. Motor 702 spins inner axis 706 at rotational speed $\omega 2 = 2 \cdot \omega 1$. Axis 706 is attached to cylinder 710 that is attached to circular plate 712 and thus spins both of them at rotational speed $\omega 2$. Motor 714 has two concentric axes 716 and 718. Outer axis 716 is attached to plate 720 and carries it. Plate 720 carries plate 722 having scanned surface 724.

Two axial screws 726 and 728 pass through tube 710 and are attached to wheels 730 and 732, respectively. When wheel 734 is static and tube 710 rotates with axis 706 and plate 712 at rotational speed $\omega 2$ it causes wheels 730 and 732 to roll on wheel 734. Rolling wheels 730 and 732 cause screws 726 and 728, respectively, to spin. Screws 726 and 728 pass through transparent bars 736 and 738 via holes having internal screws 740 and 742, respectively. When screws 726 and 728 spin they cause both bars 736 and 738 to move along guiding groves 744 and 746 in plate 712 in the direction along which their rotational radius R is increased. When wheel 734 is static, the spinning speed of screws 726 and 728, and thus the moving speed of bars 736 and 738, are all proportional to rotational speed $\omega 2$ of tube 710.

For controlling the spinning speed of screws 726 and 728 and thus controlling the moving speed of bars 736 and 738, wheel 734 may also be spun by motor 714 at a spinning speed $\omega 3$. As long as $\omega 3 < \omega 2$ and is at the same direction as $\omega 2$, it reduces the spinning speed of screws 726 and 728 and thus reduces the moving speed of bars 736 and 738. When $\omega 3 > \omega 2$ it inverts the spinning speed of screws 726 and 728 and thus also inverts the moving speed of bars 736 and 738. Similarly when $\omega 3$ has a direction opposite to the direction of $\omega 2$ it increases the rotational speeds of screws 726 and 728 and thus the moving speed of bars 736 and 738. Accordingly it is clear that the moving speed of bars 736 and 738 can be controlled by the speed and direction of $\omega 3$. This control allows the speed of bars 736 and 738 from being in the range between zero and high speed at any direction. I.e., both of them move inward (in the direction where R is decreased) along arrows 750 and 752 or both of them move outward (in the direction where R is increased) along arrows 748 and 754.

Light source 756 emits multiple beams 758 that are converted by lens 760 into collimated or quasi-collimated beams 762 that pass through beam splitter 761. Beams 762 hit rotating polygon 708 at its facet 764 and are reflected toward facet 766 which further reflects them out of the polygon as rotating collimated (or quasi-collimated) beams 768. Beams 768 rotate at angular velocity $\omega 2$ in which transparent bars 770 and 772 rotate also with their supporting plate 712. As explained before, beams 768 track bar 770 where they are reflected out from polygon 708 by one of its opposite facets 766 or 774. Beams 768 track bar 770 or bar 772 where they are reflected out from polygon 708 by one of its opposite facets 776 or 778. Transparent bar 770 is shown in cross section but, for the simplicity of the drawing, no dashed line are shown.

Transparent bars 770 and 772 are attached to plate 712 and are made from material such as glass, quartz, or plastic and include two internal mirrors 780 and 782 and 784 and 786, respectively. These internal mirrors may be fabricated by the same technique used to produce a cubic beam splitter, i.e., evaporating a reflecting surface on transparent material, and bonding it with transparent glue to a complementary surface of another transparent material. Beams 768 are reflected twice by internal mirrors 780 and 782 of bar 770 and continue to propagate as collimated (or quasi-collimated) beams 788. (Or the beams can be reflected by mirrors 784 and 786 of bar 772 corresponding to another rotational position of polygon 708 when beams 768 are reflected by facet 776 or facet 778.)

Beams 788 are reflected as beams 794 by internal mirror 790 or internal mirror 792 of transparent bars 736 or 738, respectively. Lens 796 is mounted within bar 736 and is arranged to receive collimated (or quasi-collimated) beams 794 for focussing them into small radiation spots 798 on scanned surface 724. When plate 720 (supporting plate 722 with its surface 724) is in a static position, spots 798 scan planar surface 724 along lines 800 at rotational speed ω2. Motor 714 can spin plate 720 at rotational speed ω4 by its outer axis 716 and thus surface 724 also rotates at angular velocity ω4. Accordingly the rotational speed of the planar scanning on surface 724 is equal to the relative speed between ω2 and ω4.

Axis 704, axis 706, polygon 708, tube 710 plate 712, surface 724 of plate 722, plate 720, axis 716, and axis 718 all spin around rotational axis 816.

The description above relates to scanner 700 operating as writing system. Scanner 700 can also be operated as reading system when collecting the radiation beams reflected from surface 724 by rotating lens 796 that scans this surface. When reading, rotating lens 796 converts the radiation collected from surface 724 into collimated (or quasi-collimated) beams that propagate along the same optical path as in the writing situation, but in the opposite direction. I.e., they propagate from rotating lens 796 to static beam splitter 761 via rotating mirrors 790, 782, 780, rotating polygon 708, and from there in a fixed orientation to beam splitter 761. From beam splitter 761 inverted beams 762 are reflected as beams 802 passing through beam splitter 803 and are collected by multiple detectors 804 for reading the information from surface 724. Scanner 700 can be used also for illuminating and reading by combining the two modes of operation, the writing mode for illuminating the surface and the reading mode for reading the illuminated surface.

Collimated beams 762 have a small tilt angle relative to each other and thus beams 794 have the same relative tilt angle. This angle causes beams 794 to be focused by lens 796 into several separate radiation spots onto surface 724. For achieving optimal focussing conditions, lens 796 of bar 736 and the corresponding lens of bar 738 (not shown) are separated from surface 724 by a distance known as the Working Distance (WD) that is equal to their Focal Length (FL). For maintaining the WD equal to the FL over the entire scan range parts of beams 802 which are actually collected from surface 724 are directed by splitter 803 toward lens 806, which focuses them inside autofocus system 808. Autofocus system 808 measures the deviation between the WD and the FL. Depending on this deviation, it moves arm 810 along arrows 812. This causes lens 760 to move in the direction of arrows 814 into a position that causes the image of radiation source 756 on surface 724 to appear in optimal focus.

The additional movement of rotating bar 736 along arrows 748 and 752, or the additional movement of rotating bar 738 along arrows 750 and 754, converts the circular line scan of surface 724 into area scan.

The above additional movements of bars 736 and 738 also cause their mirrors 790 and 792 to move and to change the length of the optical path between radiation source 756 and surface 724. These changes do not affect the focus conditions of lens 796 (and corresponding lens 797 of bar 738) since these changes occur in the region where the radiation beams are collimated or quasi-collimated. For such beams the optical length along which they propagate has no influence on the focussing conditions.

Scanner 700 is useful for scanning various surfaces, such as the surfaces of CDs, computer disks, or videodisks for the purposes of reading, inspecting, writing, or engraving. In a conventional scanner the scan speed, even when using multiple beams, is limited since the optical part of the system is in a static position. In this situation the scan speed is equal to ω4 and the supporting plate spins surface 724. ω4 is limited speed and is in a range of relatively low rotational speeds. This limited speed is due mainly to the imperfect balance of the disks having a surface such as surface 724 and is also due to variations between the disks. The unbalanced disks cause mechanical vibrations that make the scan impossible at high values of ω4.

Unlike the conventional scanners, scanner 700 has rotating optics which do not change when replacing one disk with another and thus can be balanced permanently for all the disks to be scanned. The almost perfect balance of the rotating optical system (polygon 708, bars 770 and 772, bars 736 and 738, and plate 712) allows it to rotate at a very high speed ω2. This speed is much higher than the rotational speed of the disks in conventional systems. This results in a dramatic improvement in the scan speed. On top of that the disk also can spin along a direction opposite to the rotational direction of the optical system. At ω4 that is equal to the rotational speed used in such conventional systems. Accordingly the scan speed of scanner 700 can be proportional to (ω2+ω4). Cf. conventional systems which spin at ω4 only, where ω2>>ω4.

When scanner 700 is used to scan disks, scan lines 800 are actually tracks that may be arranged to contain sectors of information. While scanning the ability to move fast from one sector to another is very important. Such fast transition between sectors can be achieved by controlling rotational speed ω3 of wheel 734 for fast movement of bars 736 and 738 inward or outward between the desired sectors.

Surface 724 may represent any scanned surface, especially a compact disk, a videodisk, a computer disk, or a DVD.

FIG. 9—Circular Scan of Multiple Beams on Planar Surface

FIG. 9 schematically illustrates the scan tracks of a scan system designed according to the invention, such as the system of FIG. 8 but with a capability to scan along a complete circle. An almost complete circle can be scanned by a two-sided polygon or by joining together several arcs into a complete circle when the scan arcs are produced simultaneously by several facets of the rotating polygon (a spinning scan-device).

A scanned surface 900 is scanned along lines (tracks) 902 in a way similar to the way that surface 724 of FIG. 8 is scanned by lines 800. In this example surface 900 is scanned simultaneously along three lines 902, starting at three starting points 904. Each of lines 902 has a cycloid like shape when r1(t1), r2(t1), and r3(t1) are the values or the radii of the scan lines at a time t1. Similarly r1(t2), r2(t2), and r3(t2) are the values of the corresponded radii at t2. Radii r1, r2, and r3 change their sizes linearly with time. Their sizes are changed due to the motion of the focusing lens along the radius of the scanned surface, similar to the illustrated motion of lens 796 along grove 744 of FIG. 8.

The scan position on lines 902 as a function of time is given by the mathematical expressions: $(X) = r0 + a \cdot t \cdot \sin(\omega \cdot t)$ and $(Y) = r0 + a \cdot t \cdot \sin(\omega \cdot t)$. These are cycloid functions where (X) and (Y) are Cartesian coordinates, r0 is the initial value of the radius where the scan starts, t is time, a is a linear coefficient according to which radius R changes its size with time, and ω is the angular velocity of the scan. The latter is equal to the relative angular velocity between the rotating optics and the scanned surface. The value of coefficient a is such that during a rotation period T, the radius of the scan increases at least by a value equal to the total width d of scan lines 902. Accordingly a is bigger or equal to d/T.

FIG. 10—Planar Scan with Relative Movement Between Rotating Optics and Scanned Surface FIG. 10 is a side view of another version of planar scanning according to the invention. Scanner 1000 of FIG.

10 is similar to that of FIG. 8 but the conversion of a circular line scan into an area scan is done by introducing relative movement between the rotating optics and the scanned surface, instead of moving the focussing lens as shown in FIG. 8. Scanner 1000 includes motor 1002 having two concentric axes, outer axis 1004 and inner axis 1006. Axis 1004, driven by motor 1002, spins four-sided polygon 1008 at rotational speed ω1. Axis 1006 passes through axis 1004 and polygon 1008 is driven by the same motor and spins plate 1010 to which it is attached. It spins at rotational speed ω2. Plate 1010 carries two reflecting prisms 1012 and 1014 and two focussing lenses 1016 and 1018. Axis 1004, axis 1006, polygon 1008, and plate 1010 are all spin around rotational axis 1046.

Radiation source 1020 emits multiple beams 1022 that are converted by lens 1024 into beams 1026 passing through beam splitter 1025 and are directed toward facet 1028 of rotating polygon 1008. From facet 1028 beams 1026 are reflected toward facet 1030 of polygon 1008 and from there they are reflected as rotating scan beams 1032. Scan beams 1032 are oriented toward prism 1012, or toward prism 1014 in another scan position of polygon 1008 when beams 1032 are reflected from another facet of polygon 1008. They have an angular velocity ω2 that is equal to the rotational speed of plate 1010, prisms 1012 and 1014, and focussing lenses 1016 and 1018. Accordingly beams 1032 are reflected from prism 1012 (or from prism 1014) as beams 1034 and are directed toward rotating focussing lens 1016 (or toward focussing lens 1018). They track this lens without relative movement between them and the focussing lens over the entire scan range.

Lens 1016 (or lens 1018) focuses beams 1034 into small radiation spots 1036 onto scanned surface 1038. Spots 1038 move on surface 1038 along circular lines at rotational speed ω2. For converting the line-scan into an area-scan a relative movement is introduced between surface 1038 and rotating lenses 1016 and 1018. This relative movement can be produced by moving surface 1038 along arrows 1040, by moving scan system 1000 along arrows 1042, or by moving both of them along their corresponded arrows 1040 and 1042, respectively.

Since focussing lenses 1016 and 1018 are in a static position relative to plate 1010 (unlike FIG. 8 where focussing lenses 796 and 797 move relative to plate 712), the optical path between source 1020 and surface 1038 remains constant over the entire scan range. Due to the constant optical length between source 1020 and surface 1038, it is not necessary to use collimated or quasi-collimated beams for beams 1032 that propagate between facet 1030 of rotating polygon 1008 and prism 1012.

As explained in connection with scanner 700 of FIG. 8, scanner 1000 can also be operated as reading system or as an illuminating and reading system when the multiple beams collected from surface 1038 by lens 1016. These beams propagate along the same optical path between beam splitter 1025 and lens 1016, but in the opposite direction from rotating lens 1016 via rotating prism 1012, rotating polygon 1008, and from there along a fixed orientation toward beam splitter 1025. Beam splitter 1025 directs the inverted beams as beams 1048 toward autofocus system 1050 via beam splitter 1054 and focussing lens 1052. Parts of beams 1048 are directed by beam splitter 1054 toward multiple detectors 1056 for reading the information on surface 1038. Autofocus system 1050 measures the deviations of the focusing conditions on surface 1038 from their optimal conditions. According to this measurement autofocus system 1050 moves arm 1058 on which lens 1024 is mounted along arrows 1060 and 1062 for reproducing optimal focussing conditions on surface 1038.

FIG. 11—Scanning Planar Surfaces

FIG. 11 schematically illustrates a scan path on a planar surface. This scan is produced by a scan system such as scanner 1000 of FIG. 10. Scanned surface 1100 has relative movement, indicated by arrows 1102 or 1104 with respect to scanner 1000, for producing a planar area scan on surface 1100. For example the scan is produced by three focused spots 1106, 1108, and 1110. Each of which moves clockwise and starts on line 1112. Spots 1106, 1108, and 1110 have a velocity on surface 1100 that is a superposition of their rotational speed and their velocity relative to surface 1100 along arrow 1102 or arrow 1104. The rotational speeds of spots 1106, 1108, and 1110 are ω·r1, ω·r2, and ω·r3 when ω is the angular velocity of all the spots and r1, r2 and r3 are the rotational radii of spots 11016, 1108, and 1110, respectively. the spots have a common center 1114 at the intersection point between lines 1112 and 1116. Solid lines 1118, 1120, and 1122, along which spots 1106,1108 and 1110 move, are approximately circular since the rotational speeds of these points are much higher than their velocities in the direction of arrow 1102.

For each scan period the rotational center, such as center 1114, must move a distance that is equal or larger than scan width d, which is equal to r1–r3. For example the rotational center for the next (second) scan period is located at intersection point 1124 between lines 1116 and 1126. Centers 1124 and 1114 are separated from each other by a distance d. Broken lines 1128, 1130, and 1132 are the scan lines of the second scan period. In spite of the proper separation d=r1–r3 between centers 1124 and 1114, it can be seen that broken lines 1128, 1130, and 1132 create overwriting by the intersection of solid lines 1118, 1120, and 1122. This intersection between the solid lines of the first scan period and those of the next or second period cannot be avoided when the whole area is scanned.

This cross between the scan lines of different scan periods is due to the use of multiple scan spots in a scan system such as scanner 1000 that forces usage of different scan radii for each spot. Due to the different radii of the scan lines, the larger radii of the previous scan period are located just before the small radii of the next scan period at the boundary zone between the scan lines of such periods. Thus crossing between lines cannot be avoided.

Accordingly for proper scanning using multiple beams, a new scan configuration should be used when the scanned surface has linear relative movement with respect to the scan system. Such a new system is illustrated in FIG. 12.

FIGS. 12a to 12d—Planar Scanner with Multiple Beams and Moving Surface

Figure 12A:
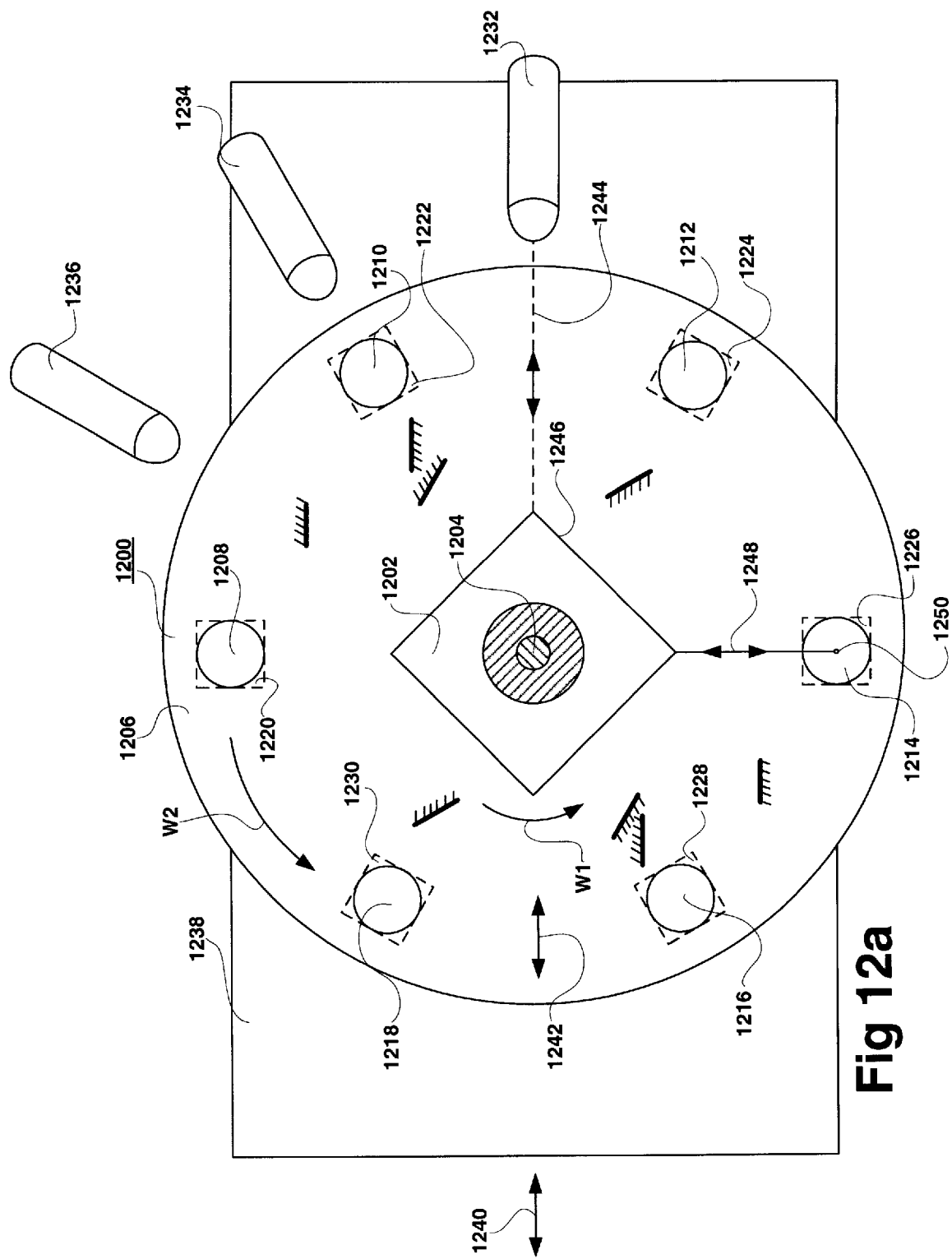

FIG. 12a illustrates a top view of scan system 1200 for scanning planar surfaces using multiple beams. FIGS. 12a to 12d include many parts of the same scanner and thus the same numeral is used for the same components. Scanner 1200 includes rotating polygon 1202 that was cut in its center and its upper part was removed. Inner axis 1204 passes through polygon 1202 and is attached to rotating plate 1206. Inner axis 1204 spins plate 1206 at rotational speed ω2 that is twice the rotational speed ω1 of polygon 1202. Rotating plate 1206 carries focussing lenses 1208, 1210, 1212, 1214, 1216, and 1218, which have reflecting prisms 1220, 1222,1224, 1226, 1228, and 1230, respectively.

In the example of FIG. 12a, polygon 1202 has four sides and thus its periodic scan angle α equals 360/N=90 degrees when N=4 for a four-sided polygon. Radiation sources 1232, 1234, and 1236 may each emit a single beam and are distributed around axis 1204 at equal angles β between them. Angle β=α/n where is the number of radiation sources used. For scanner 1200 n=3 and thus β=90/3=30 degrees. In addition to the rotational movement of scanner 1200 it also has linear relative movement with respect to scanned surface 1238. This relative movement can be produced by moving surface 1238 in the direction indicated by arrows 1240 or by moving scanner 1200 (arrows 1242) or moving both of them along their corresponding arrows.

Radiation source 1232 emits a single beam 1244 toward a facet of the upper part of polygon 1202. From this facet beam 1244 is reflected toward facet 1246 at the lower part of polygon 1202. I.e., beam 1244 is reflected as rotating scan beam 1248 that tracks reflecting prism 1226. Regarding the optical path of beam 1248, only the portion extending out of polygon 1202 in shown. Prism 1226 reflects beam 1248 down toward lens 1214, which collects beam 1248 with no relative movement between them over the scan range. Lens 1214 focuses beam 1248 into a small radiation spot 1250 on surface 1238. Spot 1250 scans surface 1238 at a tangential rotational speed of ω2·r where r is the rotational radius of lens 1214. In principle source 1232 with its single beam can produce an area scan of planar surface 1238 when relative movement exists between surface 1238 and scanner 1200 (arrows 1240 or 1242). When high scan speed is important additional sources, such as sources 1234 and 1236, are added to scanner 1200. Polygon 1202 is illustrated in FIG. 12a at a position that allows it to scan over its entire scan angle α.

Figure 12B:
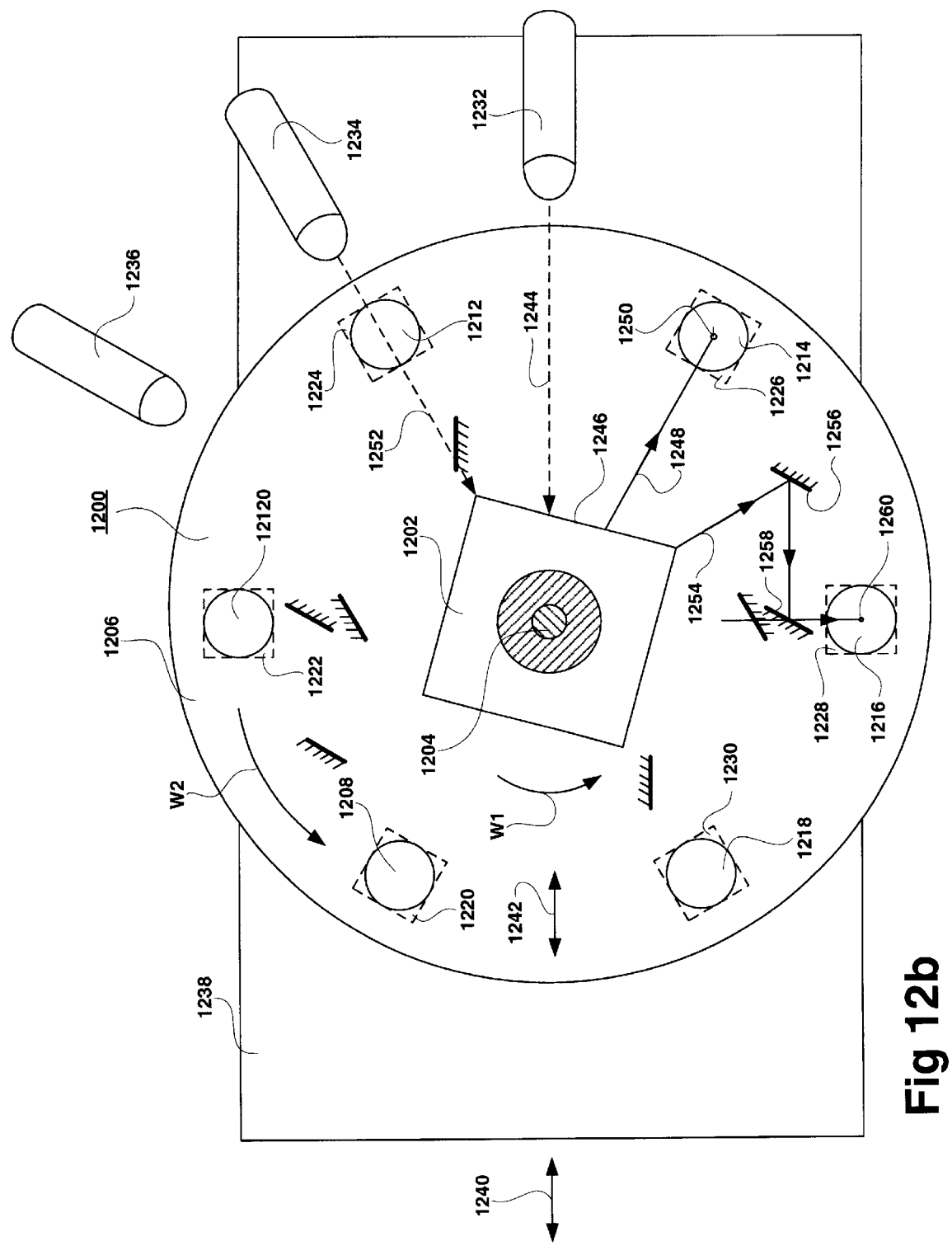

FIG. 12b illustrates scanner 1200 in another scan position when polygon 1202 is rotated at angle of 30 degrees and plate 1206 rotated at twice the angle, i.e., at angle of 60 degrees. At this position radiation source 1234 is located at angle of 30 degrees relative to source 1232 and can start to project its single beam onto the upper part of polygon 1202 (not shown). It does this in a way that beam 1252 is finally reflected out by facet 1246 at the lower part of polygon 1202. Beam 1252 is a rotating scan beam 1254 having a rotational speed ω·2 that is equal to the rotational speed of mirrors 1256 and 1258, prism 1228, and lens 1216. Accordingly, beam 1254 is reflected twice by mirrors 1256 and 1258 and is reflected again by prism 1228 toward lens 1216. Lens 1216 collects rotating scan beam 1254 without relative movement between them over the entire scan range and focuses beam 1254 into a small radiation spot 1260 onto surface 1238.

Source 1234 is shifted at 30 degrees relative to source 1232 and its emitted beam 1252 is reflected from facet 1246, similar to beam 1244 of source 1232. In spite of the shift between sources 1232 and 1234 the starting pint of their scan (points 1250 and 1260 of FIGS. 12a and 12b, respectively) is the same due to the shift that mirrors 1256 and 1258 produce. Both sources scan via the same facets of polygon 1202, with the same starting point of the scan, having the same scan range a of polygon 1202, and having the same scan range 2·α on surface 1238. Sources 1232 and 1234 differ from each other in that they start at different times. Accordingly for avoiding overlap between the scan lines of sources 1232 and 1234 on surface 1238, surface 1238 has to move a distance d that is equal to or greater than the width of the scan line of spot 1250 on surface 1238. The movement of surface 1238 along a distance d must be done during the period of time Δt between the starting times of sources 1232 and 1234.

Figure 12C:
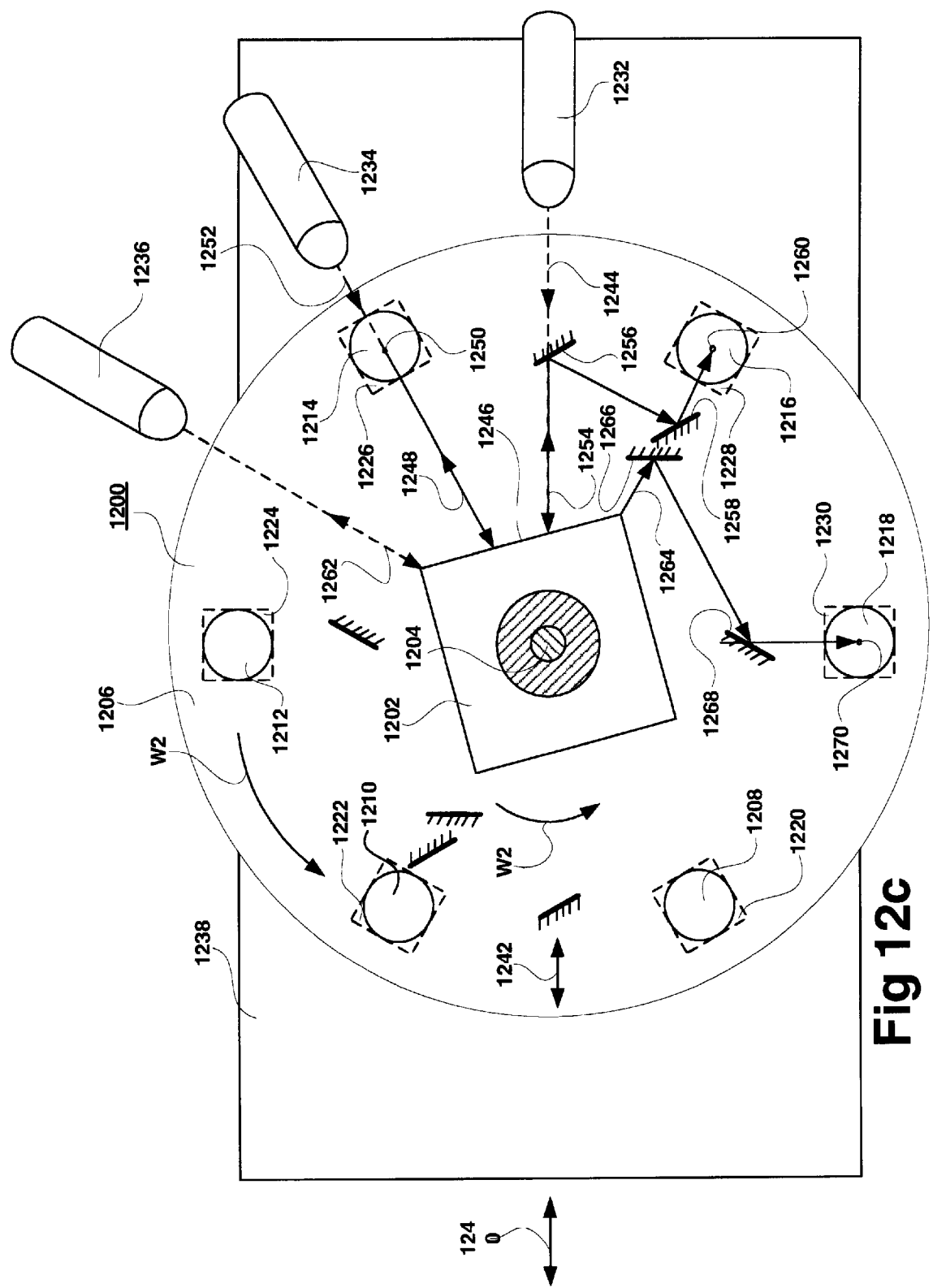

FIG. 12c illustrates scanner 1200 in another scan position when polygon 1202 is rotated at angle of 30 degrees and plate 1206 rotated at twice the angle, i.e., at angle of 60 degrees relative to the scan positions of FIG. 12b. At this position radiation source 1236 is located at angle of 30 degrees relative to source 1234. It can start to project its single beam 1262 onto the upper part of polygon 1202 (not shown) in a way such that beam 1262 is finally reflected out from polygon 1202 by facet 1246 in the lower part of polygon 1202. Beam 1262 is reflected from polygon 1202 as rotating scan beam 1264, which has a rotational speed ω·2 that is the same as the rotational speeds of mirrors 1266 and 1268, prism 1230, and lens 1218. Accordingly, beam 1264 is reflected twice by mirrors 1266 and 1268 and is reflected again by prism 1230 toward lens 1218.

Lens 1218 collects rotating scan beam 1264 without relative movement between-lens 1218 and beam 1264 over the entire scan range and focuses beam 1264 into a small radiation spot 1270 on surface 1238.

Source 1236 is shifted at 30 degrees relative to source 1234 and its emitted beam 1262 is reflected from facet 1246, similar to beam 1252 of source 1234. In spite of the shift between sources 1234 and 1236 the starting points of their scan (points 1250 and 1260 of FIGS. 12a and 12b, respectively) are the same due to the shift that shifting mirrors 1266 and 1268 produce. Note that both sources scan via same facets 1246 of polygon 1202, and have the same starting point of scan. Also they have the same scan range α of polygon 1202, and have the same scan range 2·α on surface 1238.

Sources 1234 and 1236 differ in their scan starting times. Accordingly to avoid overlap between the scan lines of sources 1234 and 1236 on surface 1238, surface 1238 must move a distance d that is equal to or greater than the width of the scan line of spot 1260 on surface 1238. The movement of surface 1238 along distance d must be done during the period of time Δt between the starting times of sources 1234 and 1236.

FIG. 12d illustrates scanner 1200 in another scan position when polygon 1202 rotates at an angle of 30 degrees and plate 1206 rotates at twice this angle, i.e., 60 degrees relative to the positions illustrated in FIG. 12c. At this position all radiation sources 1232, 1234, and 1236 are located at an angle of 30 degrees relative to each other. They continue to project their respective single beams onto the upper part of polygon 1202 (not shown) in a way that beams 1244, 1252, and 1262 are finally reflected from polygon 1202 by facet 1246 in the lower part of polygon 1202. Beams 1244, 1252, and 1262 are reflected from polygon 1202 as rotating scan beams 1248, 1254, and 1264. They have a rotational speed ω·2 that is the same as the rotational speed of their reflecting mirrors, their prisms, and their lenses. Accordingly each focussing lens collects its corresponding rotating scan beam without relative movement between these lenses and the beams that they collect over the entire scan range and focuses its corresponded beam into a corresponded small radiation spot onto surface 1238.

Sources 1232, 1234, and 1236 are shifted at 30 degrees relative to each other and their emitted beam is reflected from the same facet 1246. In spite of the shift between the sources, the starting point of their scan (points 1250, 1260, and 1270 of FIGS. 12a to 12c) is the same due to the shift that their corresponding mirrors produce. Note that all sources scan via the same facets of polygon 1202 and have the same scan starting point. They also have the same scan range α of polygon 1202, and have the same scan range 2·α on surface 1238. The sources differ in their scan starting times. Accordingly to avoid overlap between the scan lines of the sources on surface 1238, surface 1238 must move a distance d that equals or exceeds the width of the scan line of each spot on surface 1238. The movement of surface 1238 along a distance d must be done during the period of time Δt between the starting times of the sources.

FIG. 12*d* illustrate scanner 1200 in its scan position just before scan beam 1244, reflected from facet 1246, is to be reflected as scan beam 1272 from facet 1274 for producing, by lens 1208, scan spot 1280 on surface 1238. The scan range on surface 1238 is along 180 degrees and thus system 1200 has a symmetry of 180 degrees. Accordingly mirrors 1276, 1278, 1282, and 1284 have an 180-degree symmetry with respect to mirrors 1256, 1258, 1266, and 1268, respectively.

As explained above, scanner 1200 can also be operated as a reading system or as illuminating and reading system. The focussing conditions can be controlled by autofocus systems as shown in the previous embodiments. For the clarity it is not shown here.

Scanned surface 1238 can be a PCB or a flat-panel display which must be scanned at high speed and high resolution for an inspection application or one which is to be written on by a direct writing photolithographic process. Surface 1238 can also be a plate to be written on or to be read by systems such as shown in FIGS. 10, 12*a* to 12*d*. Such systems can read and written on at a very high speed, even when the information is very dense. Accordingly surface 1238 can be read, inspected, or written on with very high density. Such density allows surface 1238 to improve and replace the CD, the videodisk, the computer disk, and the DVD by a plate such as surface 1238. This plate has improved performance due to its greater information density.

FIG. 13—Scan Path on Planar Surface

FIG. 13 illustrates the scan path of scanner 1200 of FIGS. 12*a* to 12*d* on a reduced scale.

Surface 1238 can move in the direction of arrows 1240, but in this example it moves in the direction of arrow 1241. FIG. 13 illustrates the scan path that starts at time t0 and ends at time t1. At time to the scan position corresponds to the illustration of FIG. 12*d* when scan spot 1250 completes a scan along line 1281 at an angular range of 180 degrees (half a circle) and it about to start a new period of scanning as spot 1280 along line 1287. At this position spot 1260, which started its scan with a time delay At along line 1283, completed an angular scan range of (180−2×30=120 degrees. Similarly spot 1270, which started its scan along line 1285 with a time delay of 2Δt, completes an angular scan range of (180−2×60)=60 degrees. When the scan continues spots 1260 and 1270 continue to scan along the parts of the broken lines of scan lines 1281 and 1283, respectively.

When each of spots 1250, 1260, 1270, and 1280 completes its periodic scan range (half a circle) it starts a new period of scan. This process is shown for spot 1250 that completed its scan along line 1281 and is about to start a new scan period of as spot 1280 along line 1287. During the delay Δt between the starting times of sources 1232, 1234, and 1236, surface 1238 moves a distance d which is equal to or greater than the width of scan spots 1250, 1260, and 1270, or is equal to or greater than the width of their corresponding lines 1281, 1283, and 1285. This movement of surface 1238 prevents overlap between the scan lines. For example, when a certain scan spot, such as spot 1250, completes its scan it starts a new scan period. The new scan period starts at a delay of 3Δt with respect to t0 and thus surface 1238 moves a distance 3×d, which is sufficient to produce a skip over the two scan lines above.

Accordingly the new period of scan of spot 1250 starts as spot 1280 on line 1287 above line 1285. Spot 1280 scans along line 1280 without any intersection between lines 1285 and 1287. Similarly all the periods of scan take a time of 3·Δt and thus all additional periodic scan lines 1289, 1291, 1293, 1295, 1297, 1299 that will be produced later will not cross each other. The delay of Δt between the scan spots corresponds to a scan delay of 60 degrees over the entire scan range. Accordingly at the end of the scan at time t1 there will also be a scan delay of 60 degrees as can be seen from the positional differences between scan spots 1292, 1294, and 1296 on their corresponding lines 1293, 1295, and 1297.

Since d is much smaller than the length of the scan lines, each scan line has approximately the shape of half a circle having a radius r.

FIG. 14—Optical Path of Planar Scan

FIG. 14 illustrates a side view of scanner 1300 designed for a planar scan. Scanner 1300 is illustrated to demonstrate the side-view structure of the optical path of scanners, such as scanner 1200 of FIG. 12*d*. For clarity FIG. 14 shows only the main principles of the optical path of scanners such as scanner 1200. Accordingly some parts, such as shifting mirrors 1256, 1258, 1266, 1268, their corresponding symmetrical shifting mirrors 1284, 1282 1278, and 1276, and some other components included in FIG. 12, are not shown. The optical path shown is similar to the optical path shown in the top view of FIG. 12*d* between source 1232 and spot 1250 on surface 1238.

Motor 1302 has two concentric axes 1304 and 1306. Outer axis 1304 spins polygon 1308 at rotational speed ω1 and inner axis 1306 passes through axis 1304 and polygon 1308 without touching them. The motor spins plate 1310 at rotational speed ω2=2ω1. Plate 1310 carries reflecting prisms 1312 and 1314 and focussing lenses 1316 and 1318. Radiation source 1320 emits beam 1322 through focussing lens 1324 and beam splitter 1326 and toward facet 1328 of polygon 1308. Beam 1322 is reflected from facet 1328 toward facet 1330 of polygon 1308 and from there it is reflected from polygon 1308 as rotating scan beam 1332. Beam 1332 rotates at angular velocity ω2, the same as the rotational speed of prism 1312 and lens 1316.

Accordingly beam 1332, oriented toward prism 1312, tracks it and is reflected by prism 1312 toward lens 1316. Lens 1316 collects beam 1332 without any relative movement between this lens and beam 1332 over the entire scan range and focuses beam 1332 into small a radiation spot 1334 on scanned surface 1336. This spot is similar to spot 1250 on surface 1238 of FIG. 12*d*. Spot 1334 moves on surface 1336 along a circular line at rotational speed ω2.

When additional relative movement between surface 1336 and scanner 300 is introduced along arrows 1338 the circular scan turns into an area scan of surface 1336. In a reading mode, or illuminating and reading mode, the optical path between beam splitter 1326 and spot 1334 in the writing mode is the same as in the above modes. However the beam propagates in the reverse direction from spot 1334 to beam splitter 1326 via lens 1316, prism 1312, and polygon 1308, and from there in a fixed orientation toward beam splitter 1326. Beam splitter 1326 reflects inverted beam 1332 as beam 1340 through lens 1342 and toward sensor 1344. Sensor 1344 reads the information from surface 1336 and measures the deviations of the focus of spot 1334 on surface 1336 from optimum.

This measurement produces an electrical signal that is transferred by leads 1346 to autofocus system 1348. System 1348 produces a control signal that is transferred by leads 1350 to motor 1352. According to the control signal, motor 1352 moves lens 1324 by its arm 1354 in the direction indicated by arrows 1356 and/or moves lens 1342 by its arm 1358 along arrows 1360 to reproduce the optimal focus conditions of spot 1334 on surface 1336 and spot 1362 on sensor 1344.

For the simplicity scanner 1200 of FIG. 12d is illustrated without sensor 1344 and autofocus system 1348. A sensor, such as sensor 1344, and an autofocus system, such as autofocus system 1348, can be added and used with scanner 1200 of FIG. 12d.

Surface 1336 can be for example, a silicon wafer such as those used to fabricate ICs.

FIG. 15—Scanning With Multiple Sources Aligned Toward Multiple Facets

FIG. 15 illustrate a scanner 1400 and a scanned surface 1418. These are actually equivalent to scanner 1200 with scanned surface 1238 but, with additional radiation sources. For the clarity and to emphasize the additional sources added, the numerals of the components of FIG. 12 have been removed.

Additional sources 1400, 1402, 1404, 1406, 1408, 1410, 1412, 1414, and 1416 have been added to the system of FIG. 12d and are distributed uniformly around a complete circle. When only a part of the above sources is used with the sources are distributed along a part of a circle, the separation angle between them must fit the design of the system, which is 30 degrees for the specific scanner in FIGS. 12d and 15.

Each group of three additional sources, such as sources 1406, 1408 and 1410, act similarly to sources 1232, 1234, and 1236 of scanner 1200 of FIG. 12d. This allows the range of scanner 1200 to be converted from 180 degrees to be 360 degrees, with the additional benefit of simultaneously illuminating several facets of the polygon, resulting in increasing scan speed.

FIG. 16—Spinning and Scan Device

FIG. 16 illustrates a spinning and scan device 1500 for producing a scan with multiple beams in a scan configuration similar to that of scanner 1200 of FIG. 12d. The scan of device 1500 is similar to that of scanner 1200 in the sense that both of them produce a scan with an angular delay between the scan beams. While in scanner 1200 the angular delay between beams is produced by shifting mirrors, device 1500 produces such a delay directly without the need for shifting mirrors.

Device 1500 includes three polygons 1502, 1504, and 1506, each of which is similar to polygon 1202 of FIG. 12d. Polygons 1502, 1504, 1506, and mounting axis 1508, all have the same rotational axis 1510. Polygons 1502, 1504, and 1506 are oriented to have a constant rotational angle relative to each other. For scanner 1500 (or scanner 1200) an equivalent relative rotational angle between the polygons is 30 degrees.

Beam 1520 hits polygon 1506 and is reflected as scan beam 1522. Beam 1512, oriented at the same angle as beam 1522, hits polygon 1502 and is reflected as scan beam 1514. Polygon 1502 is rotated relative to polygon 1506 at an angle of 60 degrees and thus beam 1514 is rotated at an angle of 120 degrees relative to beam 1522.

Beam 1516 is oriented at the same angle as beams 1520 and 1512. It hits polygon 1504 and is reflected as scan beam 1518. Polygon 1504 is rotated at angles of 30 and −30 degrees relative to polygons 1502 and 1506, respectively. Thus beam 1518 is rotated relative to beams 1514 and 1522 at angles of 60 and −60 degrees, respectively.

Accordingly device 1500 can directly produce a scan with an angular delay between scan beams 1522, 1516, and 1518 in a configuration that may fit the scan system, such as that of scanner 1200, without the need for shifting mirrors.

FIG. 17a—Planar Scanning With Multiple Sources Aligned Toward Multiple Facets for Writing, Illuminating, or Inspecting by Imaging or Collecting Scattered Light FIG. 17a schematically illustrates a scanner 1600 which includes multiple radiation sources 1602 and 1604 directed toward multiple sides 1606 and 1608 of a rotating scan device 1610. Carrying plate 1612 carries a spindle 1614 (driven by a motor) and mounting bars 1616 and 1618. Sinks 1620 and 1622 are mounted on bar 1616 and sinks 1624 and 1626 are mounted on bar 1618. Spindle 1614 has two concentric axes. It spins an outer axis 1628 at first angular velocity ω1 and an inner axis 1630 at second angular velocity ω2. Outer axis 1628 is attached to scan device 1610, carries it, and spins it at first angular velocity ω1. Inner axis 1630 is connected to plate 1632 by connecting disk 1634 and spins it at angular second angular velocity ω2. Inner axis 1630 passes through outer axis 1628 and scan device 1610 without touching them. Rotating plate 1632 carries rotating lenses 1636 and 1638 with their corresponding reflector prisms 1640 and 1642 and spins them all at second angular velocity ω2.

Each of sources 1602 and 1604 emits multiple radiation beams (or at least one radiation beam) 1644 and 1646 directed toward splitters 1643 and 1645, respectively. Splitter 1643 receives beams 1644 from radiation source 1602 and transmits parts of them to lens 1648. Lens 1648 receives beams 1644 1643 and directs them to pinhole array 1650.

Lens 1648 is designed to convert beams 1644 into an image 1652 of multiple focused radiation spots arranged in the same structure as pinhole array 1650 and such spots are projected onto its plane. Thus each spot of image 1652 is aligned with its corresponding hole in array 1650, The holes of array 1652 have smaller dimensions than the diffraction limit of lens 1648, as is usual in confocal microscopes. (A confocal microscope is one in which both, the illuminating radiation and the radiation collected from the imaged surface are transmitted through pinholes for improving resolution and decreasing depth of focus.)

In that way the holes of the array clip or trim the waists or spread of beams 1644 by transmitting only parts of them. The holes also serve as very small objects to be imaged on planar scan surface 1654. Each beam that passes through the holes of array 1650 behaves as a diverging beam that comes out of an object that is located at its corresponded hole in pinhole array 1650 and has the same size as that hole.

Pinhole array 1650 is shown in a side view cross section. Only one hole is shown and thus it is the only one that illustrates the transmission of one beam (of multiple beams 1644) through array 1650.

To improve the imaging resolution of the radiation spots of image 1652 that serves as an object to imaged on surface 1654, the diverging angle of each beam is designed to be as large as possible. This angle is limited when the radiation spot of each of beams 1644 on lens 1656, which collects it, will cover the whole effective area of that lens.

Lens 1656 collects beams 1644 and converts them into beams that are substantially parallel and are directed toward splitter 1658. Splitter 1658 receives beams 1644 and transmits parts them toward side 1606 of rotating scan device 1610.

Side 1606 receives beams 1644 from splitter 1658 and reflects them toward side 1660 of scan device 1610. Side 1660 receives beams 1644 from side 1606 and reflects them toward reflector-prism 1640. Reflector 1640 receives beams 1644 from side 1660 and reflects them toward scan lens 1636.

Lens 1636 receives beams 1644 from reflector-prism 1640 and converts them into image 1662 projected onto surface 1654. Image 1662 moves on surface 1654. Surface 1654 is positioned at a distance from lens 1636 equal to the focal length of this lens. In this case the focusing conditions of image 1662 are optimal. Image 1662 is the image of pinhole array 1650 (or real image 1652 that serves as an object) on surface 1654. Image 1662 can be produced by providing scan lens with an f-number close to 1 and thus it can have a resolution that is diffraction limited.

The optical path between radiation source 1604 and scanned surface 1654, via rotating device 1610, is described briefly since it is similar to the optical path between source 1602 and scanned surface 1654 via rotating device 1610.

Source 1604 emits beams 1646 toward lens 1647 that collects and directs them toward splitter 1645. Splitter 1645 transmits parts of them toward pinhole array 1664. Parts of beams 1646 pass through array 1664 toward lens 1666, which converts them into beams that are close to parallel and directs them to splitter 1668. Splitter 1668 transmits parts of beams 1646 that propagate toward side 1608 of rotating scan device 1610. Beams 1646 are reflected from side 1608 toward side 1670 of device 1610 and are reflected from there to prism 1642. Beams 1646 are reflected from prism 1642 toward scan lens 1638, which converts them into image 1672 of pinhole array 1664 and projects this-image onto surface 1654 and moves it along this surface. Surface 1654 is positioned at a distance from lens 1638 that is equal to the focal length of this lens. In this case the focusing conditions of image 1672 are optimal.

Scan device 1610 has a special design in which all the planes that contain its sides, such as sides 1606, 1608, 1660, and 1670, all intersect at a point on rotational axis 1673. Due to this design, when scan device 1610 rotates at angular velocity ω1 around axis 1673, it reflects beams 1644 as a scan beam rotating at angular velocity ω2 around axis 1673. ω1 and ω2 satisfy the relationships ω2=2ω1. Supporting plate 1632 carries lenses 1636 and 1638 and reflector-prisms 1640 and 1642 and rotates at angular velocity ω2. Thus it causes all the above optical components that it carries to rotate at the same angular velocity ω2. Beams 1644 and 1646 reflected from scan device 1610 also rotate at angular velocity ω2 and track reflectors 1640 and 1642, respectively, with no relative translation between them. Since scan lenses 1636 and 1638 with their corresponding reflectors 1640 and 1642, respectively, are all mounted on plate 1632, there is no relative motion between them. Thus beams 1644 and 1646, reflected from reflectors 1640 and 1642 toward lenses 1636 and 1638, respectively, track their corresponding lenses very accurately and without relative translation.

An accurate tracking of scan lenses 1636 and 1638 by beams 1644 and 1646, respectively, without relative translation between the beams and the lenses, is very important for producing a high-resolution scan. In general, the lack of translation between the scan lenses and the beams that track them enables whole effective area of the scan lenses to be covered throughout the entire scan range. This provides very high scan resolution that is diffraction limited.

Images, such as image 1662 and 1672 of pinhole arrays 1650 and 1664, respectively, are projected onto scanned surface 1654 and can be used for writing and engraving applications. Modulating or switching the intensity of each beam of radiation beams 1644 and 1646 controls the written or engraved information. Sources 1602 and 1604 can be lasers arrays capable of emitting multiple beams while the intensity of each beam can be modulated or switched separately by a switching or modulating controller which controls the radiation sources (not shown).

The small focused spots of images such as images 1662 and 1672 of pinhole arrays 1650 and 1664, respectively, can be used also for illuminating scanned surface 1654. By using this technique, the scan system of FIG. 17a is capable of illuminating surface 1654 at a very high intensity. High illumination is very important for applications of imaging and inspecting since it improves the brightness and thus the signal-to-noise ratio and the contrast, resulting in improved image acquisition.

The system of FIG. 17a illustrates two techniques for imaging according to the invention.

The first technique is for acquiring the images or inspecting by collecting scattered light. This technique is also known as imaging and inspecting by laser scattering.

In the other technique multiple detectors such as a line scan camera, CCD camera, or Time Delay Integration (TDI) camera, does acquiring images in the mode of a rotating confocal microscope.

According to the first technique, the small focused spots of images 1662 and 1672 on scanned surface 1654 illuminate this surface. The low transmission loss of beams 1644 and 1646 through pinhole arrays 1650 and 1664 is minor. In addition the focused spot of images 1662 and 1672 on surface 1654 can be very small due to the achievable diffraction limited resolution all over the scan range. In general, the above low transmission loss and the small size of the focused radiation spots on the scanned surface enable very high illumination intensity on the scanned surface to be achieved. This is achievable even when the power of the sources is conventional.

The small focused spots of images 1662 and 1672 are reflected from and scattered by surface 1654. Radiation 1674 that is reflected from and scattered by surface 1654 is collected by sinks 1620 and 622. Similarly, sinks 1624 and 1626 collect radiation 1676 that is reflected from and scattered by surface 1654. Sinks 1620, 1622, 1624, and 1626 can be made of highly sensitive radiation detectors, such as photomultipliers, which are sensitive to the wavelength that radiation sources 1602 and 1604 emit.

When using a single beam, image acquisition is obtained by illuminating surface 1654 with that beam during the scan produced by rotating scan device 1610 and rotating plate 1632 at angular velocities ω1 and ω2, respectively. In this mode the focused spot of this single beam moves on surface 1654. Each time it illuminates a different spot on planar surface 1654 along the scan path. During the time in which the scan is conducted, detectors 1620 to 1626 collect radiation 1674 and 1676 that is scattered and reflected from surface 1654 and convert it into a time dependent signal that is fed into an image acquisition system (not shown).

The relationships between the timing of the scan and the illumination position on surface 1654 are known. The image acquisition system synchronizes this timing with the time-dependent signal produced by detectors 1620 to 1626 and creates the relationships between the signal of these detectors and the illumination position on surface 1654. The use of these relationships enables image acquisition system to construct the image of scanned surface 1654.

The system of FIG. 17a is actually divided into two groups. The first group includes surface 1654 and translation stage 1678 which carries that surface and can move it in the X, Y plane along arrows 1680 or along arrows 1682 in the Z direction. The second group actually includes all the rest of the components schematically illustrated in FIG. 17a. All the components of the system of FIG. 17a that belong to the second group are attached directly or indirectly to carrying plate 1612. Some of these components are not shown attached for avoiding complexity and maintaining the clarity of the drawing of FIG. 17a.

Translation stage 1684 that belongs to the second group actually carries all the components of this group and is capable of moving them all together as a single rigged body in the X, Y plane along arrows 1686, or in the Z direction along arrows 1688.

An area scan can be produced in two different ways by introducing relative movement between rotating plate 1632 and scanned surface 1654 along the X, Y plane in the direction of arrows 1680 or 1686 normal to axis 1673. The first option is to move surface 1654 by translator 1678 along arrows 1680 and normal to rotational axis 1673. The other option is to move the whole second group by translator 1684 along arrows 1686 and normal to axis 1673. An additional option is to use the combination of the two previous options by moving both stages 1678 and 1686 along a direction normal to axis 1673. The relative movement between plate 1632 and surface 1654 normal to axis 1673 converts the scan from being along lines, when such relative movement does not exist, into an area scan when this relative movement is introduced.

Radiation-sensitive detectors 1620–1626 can schematically represent additional multiple detectors distributed around axis 1673.

Similarly, sources 1602 and 1604 can schematically illustrate additional multiple sources that are distributed around axis 1673 and are directed toward multiple sides of scan device 1610. In addition lenses 1648 and 1656, splitters 1643 and 1658, and pinhole array 1650 can be included as parts in the assembly of source 1602. Similarly, lenses 1647 and 1666, splitters 1645 and 1668, and pinhole array 1664 can be included as parts in the assembly of source 1604.

It is possible to dramatically increase the scan speed of the scan system of FIG. 17a for the purposes or writing, engraving, illuminating, reading, imaging, and inspecting by using multiple beams. The use of multiple beams in the above technique of light (or laser) scattering for a single radiation beam requires that the scan system use its additional capabilities.

When a single beam I used to scan in applications of illuminating and inspecting by light scattering, the radiation reflected from and scattered by the scan surface can be collected by all the radiation sensitive detectors. In this case the construction of the image of the scanned surface is done by the correlation between the illumination position on the surface and the corresponding signal of all the detectors.

Unlike the situation where imaging is done using light scattering of a single beam, the use of multiple beams for imaging by light scattering causes each one of the detectors to collect and combine the light scattered and reflected from all the focused spots on the scanned surface. The signals corresponding to each scan spot are also summed and mixed. Proper imaging requires the capability to distinguish between the different signals corresponding to the different focused spots produced by the different beams. This distinction is necessary for identifying the different signals corresponding to the different positions of the focused spots on the scanned surface, produced by different beams.

FIG. 17a illustrates a technique for distinguishing between the different signals produced by detectors 1620–1626 corresponding to the positions of the focused spots of images 1662 and 1672 on scanned surface 1654, related to pinhole arrays 1650 and 1664, respectively. Each beam of beams 1644 and 1646 has a different wavelength. Detectors 1620–1626 include filters 1690–1696, respectively. At least one of filters 1690–1696 1620–1622 transmits only a wavelength that is equal to one of the wavelengths of one of the beams. In this configuration for each beam there is at least one dedicated detector that produces only the signal that is related to this beam with its specific wavelength. This technique enables a different and separate image of the scanned surface to be produced for each beam. Adding the images produced by each of the beams results in the image of whole the scanned area. Such an image is produced at much higher throughput as compared to imaging by scattering of a single beam.

To increase the sensitivity of the detectors they can be made of photomultipliers that are sensitive to the spectral range of the beams.

The second imaging technique is based on at least one radiation sensitive detector 1698 or 1700, or both of them. Usually detectors 1698 and 1700 include multiple detectors in the form of a line scan camera or CCD camera. The radiation of the focused spots related to image 1662 of array 1650 is reflected from and scattered by surface 1654 while image 1662 is moved along planar surface 1654 by rotating lens 1632.

Lens 1636 collects the radiation scattered and reflected from image 1632 on surface 1654 and converts it into reflected radiation beams 1644 that are very close to parallel beams and contain at least one radiation beam.

Reflected beams 1644 propagate along an optical path that is similar to the optical path of beams 1644 between splitter 1643 and image 1662 on surface 1654. However the beams travel in the reverse direction. Beams 1644 are directed by rotating lens 1636 toward reflector-prism 1640. Reflector 1640 reflects them toward side 1660 of device 1610. From side 1660 beams 1644 are reflected and directed to side 1606 of device 1610 and are reflected there from device 1610. Radiation beams 1644 are actually about the same as incoming beams 1644 and differ in their behavior only by the direction of their propagation.

The existing situation, where the path of incoming beams 1644 for illumination process also exists for the optical path of reflected beams 1644 for the imaging process. In both cases plate 1632 and scan device have angular velocities $\omega 1$ and $\omega 2$ when $\omega 2 = 2\omega 1$. Beams 1644 start their path when they are oriented along a fixed direction and end their path as scan image 1662 moving along surface 1654. Accordingly, reflected beams 1644 that start their optical paths at scan image 1662, move on planar surface 1654, and end their path in a fixed orientation where they are reflected from device 1610 to beam splitter 1658. The fixed orientation along which reflected beams 1644 are reflected from device 1616 is parallel to the fixed orientation along which incoming beams 1644 are aligned in their initial optical path.

Beam splitter 1658 receives reflected beams 1644 from device 1610 with a fixed orientation, even though scan device 1610 rotates at angular velocity ω1. Splitter 1658 transmits parts of reflected beams 1644 and directs them toward lens 1656. Lens 1656 converts beams 1644 back into image 1652 projected onto pinhole array 1650. Image 1662 of array 1650 is projected on surface 1654 with optimal focus. Reflected beams 1644 originate as this image when it serves as an object to be imaged by lens 1656. Accordingly, the image that lens 1656 produces from reflected beams 1644 is projected back onto pinhole array 1650 and is identical to both, image 1652 and array 1650.

The radiation spots of image 1652 project back on themselves and are perfectly matched in structure, arrangement, and size to the holes of array 1650. Thus the array receives reflected beams 1644 from lens 1656 and transmits them from image 1652 toward lens 1648 without attenuation. Image 1652, which serves as an object to be imaged by lens 1648, is the image of image 1662 on surface 1654, which also serves as an object. Lens 1648 projects the image of object 1652 (real image) by reflected beams 1644 onto detector 1698 via beam splitter 1643. Splitter 1643 reflects parts of beams 1644 toward detector 1698.

In this configuration, detector 1698 actually receives the image of scanned surface 1654 under moving image 1662 and converts it into corresponding electrical signals that are fed into the image acquisition system (not shown). When relative movement is introduced between rotating scan lens 1636 and scanned surface 1654 along a direction normal to rotational axis 1673, the radiation sensitive detectors of detector 1698 produce signals. During scanning, these signals are related to different scan times and scan positions. These signals are used by the image acquisition system to reconstruct the image area of the scanned image.

Beam splitter 1658 reflects parts of reflected radiation beams 1644 toward lens 1702, which collects them and converts them into image 1704 of object 1662 (real image) that is projected onto autofocus system 1706. Autofocus system 1706 measures the deviations of the imaging conditions of image 1662 on surface 1654 from their optimal conditions. Autofocus system 1706 controls the focusing conditions of image 1662 on surface 1654 to keep them optimal over the entire scan range. (Optimal focussing conditions occur when the sizes of the radiation spots of image 1662 on surface 1654 are minimal.) There are three ways in which system 1706 maintains optimal focussing conditions:

The first is by changing the distance between lens 1656 and pinhole 1650 (or real image 1652) in a direction along arrows 1708. Shifting arm 1710 that holds lens 1656 moves lens 1656 in this direction. Arm 1710, and thus the movement of lens 1656, is shifted by translator 1712. The latter is controlled by autofocus system 1706. Autofocus system 1706 causes lens 1656 to be located in a position where image 1662 on surface 1654 is optimally focussed.

The second way is by changing the distance between rotating lens 1636 and scanned surface 1654 to maintain its value such that image 1636 on surface 1654 will be optimal. Autofocus system 1706 controls translation stage 1678 via leads 1714 and 1716. The signal supplied on these leads moves this stage in the Z direction along arrows 1682. The controlled translation of stage 1678 causes surface 1654 to move into positions where optimal focussing conditions are maintained. I.e., the sizes of the radiation spots of image 1662 on surface 1654 are minimal over the entire scan range.

The third way is by changing the distance between rotating lens 1636 and scanned surface 1654 such that image 1636 on surface 1654 will be in optimal focus. Autofocus system 1706 controls translation stage 1684 by leads 1714 and 1718 which supply a signal which cause it to move it in Z direction along arrows 1688. The controlled translation of stage 1684 causes rotating scan lens 1636 to move into positions where the distance between lens 1636 and surface 1654 produces optimal focus conditions. These conditions are maintained such that the size of the radiation spots of image 1662 on planar surface 1654 is minimal over the entire scan range.

The process of imaging by detector 1698 and controlling the focus conditions by autofocus system 1706 is completely analogous to the way it occurs in the symmetric sides of the scan system of FIG. 17a. Thus it will be described only briefly.

The radiation reflected and scattered by surface 1654 from the region under image 1672 is collected by lens 1638 and directed toward reflector 1642 as parallel reflected radiation beams 1646. From reflector 1642 beams 1646 continue toward side 1670 of device 1610 and are reflected toward side 1608 of device 1610. From side 1608 beams 1646 are reflected from device 1610, during its rotation, along a fixed orientation and toward splitter 1668. Splitter 1668 transmits parts of beams 1646 toward lens 1666, which converts them into the image of object (real image) 1672 on surface 1654 and projects it onto pinhole array 1664. Array 1664 transmits reflected beams 1646 toward lens 1647, which converts them into the image of pinhole array 1644 (or real image 1672) and projects them via splitter 1645, which reflects them onto detector 1700. Detector 1700 produces signals during the scan to feed an image acquisition system that reconstructs the image of the scanned area.

Beam splitter 1668 reflects the other parts of reflected beams 1646 toward lens 1720 that converts them into image 1722 of object (real image) 1672 and projects them onto autofocus system 1724. Lens 1666 is moved by arm 1728 in the direction indicated by arrows 1726. Arm 1728 is shifted by translator 1730 that is controlled by autofocus system 1724 to keep lens 1666 in a position that assures optimal focussing of image 1672 on surface 1654.

The imaging by sensitive detectors 1698 and 1700 by double passing of incoming and reflected beams 1644 and 1646 through pinhole arrays 1650 and 1664, respectively, is similar to the imaging done by a confocal microscope. Accordingly one of the versions of system 1600 illustrated in FIG. 17a actually shows at least one rotating confocal microscope designed according to the invention for the use of at least one radiation beam. Similar to a conventional confocal microscope that has a very short depth of focus, rotating microscope 1600 of FIG. 17a is also very sensitive to its focus conditions.

The use of pinhole arrays 1650 and 1664 increases the scan resolution of images 1662 and 1672 on surface 1654 and decreases dramatically the depth of focus of the rotating microscope. The depth of focus of microscope 1600 is very shallow since any slight deviation from optimal focus conditions will cause the radiation intensity of the image projected on detector 1698 to decrease dramatically. This intensity decrease in and out from optimal focusing conditions is due to the way that image 1652, produced from reflected beams 1644 by lens 1656, is imaged back onto pinhole array 1650.

If the focus conditions are proper, image 1652 is imaged precisely back on itself. Image 1652 is imaged in a way that the structure, size, and arrangement of its radiation spot will not perfectly fit pinhole array 1650. The mismatch between image 1652 and pinhole array 1650 causes a very high attenuation of reflected beams 1644 in their passage through array 1650 and this causes a dramatic reduction of the brightness of the image projected onto detector 1698. Accordingly system 1600, when used as a rotating confocal microscope, produces a strong contrast for features at different heights in the topology of the scanned surface. Thus it is useful as a system for three dimensional (3D) imaging. Such 3D imaging is very useful in the IC industry for inspecting stacks of processed silicon wafers that have different heights.

All the versions, modes, and ways of operation of system 1600 of FIG. 17a can be used in any combination. These combinations can be in any form, from the simplest combination where each of them is used separately, to the opposite, where all are used together.

FIG. 17—Conversion of Circular Scan Into Another Scan Form

FIG. 17b schematically illustrates bundle 1740 of radiation guides 1750 that serves as first scan region 1742 of scan system 1600 of FIG. 17a and is combined into scan system 1600 to replace scanned surface 1654 and translator 1678. Since the rest of the components of system 1600 remain the same, they are not shown in FIG. 17b. Only rotational axis 1673 of system 1600 and scan beams 1644, which are converted into scan spots 1662, are shown. Axis 1673 determines the relative position of bundle 1740 with respect to the rest of the components of system 1600. Beams 1644 and spots 1662 illustrate the way in which first region 1742 is scanned.

Region 1742 is a plane including concentric circular lines 1744 having center 1746. Inputs 1748 of radiation guides 1750 are arranged along circular lines 1744 in a form of at least portions of complete circles. Rotational axis 1673 is normal to plane 1742 of first region 1742 and passes through center 1746 of concentric circular lines 1744. The distance of region 1742 from lenses 1636 and 1638 of system 1600 is adjusted to produce optimal focusing of beams 1644. Plane 1742 of the first region actually replaces plane 1654 of the scanned region of FIG. 17a. Thus beams 1644 are focused into scan spots 1662 which having minimal size. They are projected and are moved by lenses 1636 and 1638 onto first scanned region 1742 and along circular lines 1744. Scan spots 1662 that move along lines 1744 scan inputs 1748 of guides 1750, which are arranged along these lines.

During the scan of spots 1662 along inputs 1748 of guides 1750 the radiation of spots 1662 is coupled alternately into guides 1750, which direct them into outputs 1752 of guides 1750. The radiation is then emitted as beams 1644 toward second region 1754. Beams 1644 are projected on second region 1754 and form corresponding scan spots 1756 on that region. Accordingly the alternate coupling of spots 1662 into inputs 1748 during the scan of spots 1662 along lines 1744 of first region 1742 results in the alternate emitting of beams 1644 from outputs 1752 toward and along second region 1754. This produces a scan of spots 1756 along region 1754.

Bundle 1740 of radiation guides 1750 demonstrates, for example, the conversion of planar circular scan of spots 1662 along lines 1744 into a linear scan of spots 1756 along region 1754. It is clear that by using other arrangements of guides 1750 of bundle 1740, the planar circular scan on first scanned region 1742 can be converted into any other desired scan form. In such situations the scan forms of spots 1756 match the forms of region 1754.

In writing applications region 1754 emits multiple reflected beams 1644 from the surface under spots 1756 and directs beams 1644 toward outputs 1752 of guides 1750 in bundle 1740. Outputs 1752 of guides 1750 receive beams 1644 and guide beams 1644 into inputs 1748 of guides 1750 where they are emitted out from these inputs. The radiation emitted from inputs 1748 is directed from first surface 1742, where inputs 1748 are located, as reflected beams 1644. Rotating lenses 1636 and 1638 of system 1600 of FIG. 17a alternately collect beams 1644. The rest of the scanning and imaging process is identical to the illustrated in FIG. 17a and explained in its accompanied description and thus is not taught here.

FIG. 18—Scan Image Structure in Rotating Confocal Microscopes

FIG. 18 schematically illustrates scan image 1800 of a pinhole array, such as scan image 1662 of array 1650 in system 1600 of FIG. 17a. Image 1800 includes multiple radiation spots, corresponding to the multiple holes of a pinhole array (not shown) that serves as an object to produce image 1800. Spots 1802 are arranged in a structure suitable for use as scan image 1662 in system 1600. Image 1800 of the array 1800 is projected onto the scanned surface (not shown) in a way similar to the way that image 1662 is projected on planar surface 1654. Image 1800 moves with its radiation spots 1802 on the scanned surface in the direction indicated by arrows 1804.

Each of spots 1802 is separated from the next spot by a distance d1 in the X direction. Similarly, each spot 1802 is separated from the next spot by a distance d2 in the Y direction. Accordingly spots 1802 are arranged along diagonal lines 1806. A distance that is large enough to avoid any interference pattern of image 1800 separates beams 1802 from each other. On the other hand, the structure of diagonal lines 1806, along which spots 1802 are distributed, assures that the scan line that each spot produces when scan image 1800 moves on the scanned surface to overlap the next scan line. The overlap between adjacent lines enables the entire area of the surface to be scanned.

Accordingly, the structure of scan image 1800 fulfills two requirements needed for a rotating confocal microscope:

1. Interference between radiation spots 1802 should be avoided.
2. The entire area of the surface should be scanned.

FIG. 19a—Inner Drum Scan Combined with Scattered Light Collection

FIG. 19a schematically illustrates an inner drum scan system 1900 to be used as scanner, plotter, reading system, inspecting system, printing system, writing system, engraving system, or direct writing system.

Plate 1902 carries spinning motor (or spindle) 1904 which has two concentric axes, outer axis 1906 and inner axis 1908. Outer axis 1906 is attached to scan device 1910 and spins it around rotational axis 1920 at angular velocity $\omega 1$. Device 1910 has multiple sides 1912, 1914, 1916, and 1918. Each pair of sides of device 1910, such as the pair of sides 1912 and 1914 and the pair of sides 1916 and 1918, effectively reflect the radiation like a mirror mounted directly on rotational axis 1920 with additional vertical displacement. This property of device 1910 is achieved since all the planes that contain its sides intersect at point 1917 on axis 1920.

Inner axis 1908 is attached to rotating plate 1922 by connecting disk 1924 and spins it around axis 1920 at angular velocity $\omega 1$. Rotating plate 1922 carries lens mounts 1926 and 1928 in which rotating scan lenses 1930 and 1932 are mounted. Lenses 1930 and 1932, plate 1922, and mounts 1926 and 1928 all rotate together at angular velocity ω2, which is twice ω1.

Radiation source 1934 emits multiple beams 1936 and directs them through beam splitter 1938 toward lens 1940. Lens 1940 receives parts of beams 1936 transmitted by splitter 1938 and converts them into image 1944 containing multiple radiation spots and is projected onto pinhole array 1942. The arrangement of the spots of image 1944 perfectly match the arrangement of array 1942 and thus beams 1936 pass through the array with a minor radiation loss and continue to propagate toward lens 1946.

Lens 1946 receives beams 1936 from the pinhole array and converts object (real image) 1944 on array 1942 into parallel beams directed toward splitter 1948. Parts of beams 1936 pass through splitter 1948 toward side 1912 of device 1910. Side 1912 receives beams 1936 and reflects them toward side 1914. Side 1914 reflects them out of device 1910 as rotating scan beams 1936, which are directed toward rotating scan lens 1938. Scan beams 1936 rotate at angular velocity ω2 that equals the rotating speed of scan lens 1930. Thus the beams track rotating scan lens 1930 without any translation between them.

Lens 1930 receives rotating beams 1936 and converts them into image 1950 projected on surface 1952. Image 1950 is the image of real image 1942 that serves as an object to be imaged on surface 1952. Image 1950 is identical to the image of pinhole array 1942 on surface 1952 and moves on this surface along circular lines. Surface 1952 is in a form of at least a portion of a cylinder and each spot of image 1950 produces a circular scan line on surface 1952, which overlaps its adjacent scan line.

Rotating lenses 1930 and 1932 are distributed around axis 1920 with central angles that are twice than the central angles of the sides of the scan device, Accordingly when the scan device changes its active scan side during the scan, its other side becomes the active scan side and starts to track another scan lens.

Surface 1952 has a shape in a form of at least a portion of a cylinder. Surface 1952 can be made from a flexible plate of metal such as aluminum or can be made from some type of plastic. The scan of surface 1952 can be done with a resolution that is diffraction limited. Accordingly surface 1952 can be used for writing and reading information that is very dense. The high density of the information on surface 1952, and the high speed at which it can be written or read, makes surface 1952 suitable for replacing currently CDs, videodisks, and computer disks. Surface 1952 can also be a flexible display and flexible IC, similar to one recently developed by IBM, which is partially made of organic materials.

The system of FIG. 19a is divided into three groups. One group is scanned surface 1952.

The second group is the moving units which includes static drive motor 1954 that spins lead screw 1956 connected to plate 1902 by plate 1958, which has an internal screw. Guiding pins 1960 and 1962 pass through plate 1902 via lead holes 1963 and 1965. The driving unit causes plate 1902 to slide along guiding pins 1960 and 1962 while the lead screw spins.

The third group contains the rest of the system components in a configuration where they are all attached directly or indirectly to plate 1902 and can move with it as one rigid body.

Accordingly when the moving unit moves plate 1902 it actually moves all of the components of the third group and thus adds to the circular scan lines a motion in a direction along axis 1920. This additional relative motion between surface 1952 and scan plate 1922 along axis 1920 converts the line scan, which exists without this motion, into an area scan of region 1952.

An alternative way of producing an area scan is to produce relative motion between region 1952 and plate 1922 along axis 1920 in the direction of arrows 1966. Moving surface 1952 along arrows 1966 produces such relative movement.

Imaging in the scan system of FIG. 19a can be done in two ways. The first one is in the mode of rotating confocal microscope and the second way is by collecting scattered light.

When the system of FIG. 19a acquires the image of surface 1952 under image 1950, radiation is reflected from and scattered by surface 1952. Surface 1952 is under image 1950 and within the field of view of lens 1930. This lens collects the reflected radiation. Lens 1930 converts the radiation reflected from and scattered by surface 1952 into beams 1936 that are parallel and can consist of only one beam.

Reflected beams 1936 propagate along the path between region 1952 and splitter 1940. This path is similar to the optical path of incoming beams 1936 but extends in the opposite direction. Beams 1936 are directed by lens 1930 toward side 1914 of device 1910 and are reflected toward side 1912 of device 1910. Side 1912 receives beams 1936 and reflects them, during its rotation, along a fixed orientation and toward splitter 1948. Splitter 1948 receives beams 1936 and transmits parts of them toward lens 1946. Lens 1946 collects beams 1936 and converts them into image 1944 projected back on itself and on pinhole array 1942 in a way such that they match each other.

Accordingly beams 1936 pass through pinhole array 1942 with a minor radiation loss and toward lens 1940, which receives them. Lens 1940 converts beams 1936 into image 1970, which is the image of surface 1952 under image 1950. Lens 1940 projects image 1970 toward and via splitter 1939 to be formed on detector 1968. Detector 1968 may represent multiple detectors, such as a line-scan camera or a CCD camera. In any case it includes at least one detector. Detector 1968 converts image 1970 into a signal related to the position of image 1950 on surface 1952. The signals from detector 1970 are fed into an image acquisition system (not shown) that reconstructs the image of the scanned area on surface 1952.

Parts of reflected beams 1936 are directed by splitter 1948 toward lens 1972, which converts them into image 1974 of surface 1952 under image 1950 and projects image 1974 onto autofocus system 1976. System 1976 measures the focus conditions of image 1950 on surface 1952 and detects any deviation of the focus conditions from optimal. In any case where a deviation from the optimal focus is detected by system 1976, it causes supporting arm 1978, that carries lens 1946, to move into another position to put locating lens 1948 in a position that assures optimal focus. According to this control of system 1976, the optimal focus of scan image 1950 on scanned surface 1952 is maintained over the entire scan range.

When using the mode of imaging by collecting scattered radiation 1953 from surface 1952 under image 1950, radiation 1953 is collected by detectors 1980 to 1994. These detectors are mounted on arms 1996 to 2002 that are attached to plate 1900. Radiation sensitive detectors 1980–1994 are distributed around rotational axis 1920 and may represent photomultipliers, which are very sensitive detectors. The imaging of surface 1952 is acquired by an image-processing unit (not shown). This unit is fed by detectors 1980–1994 with the signals that these detectors produce. These signals represent a conversion of radiation 1953 into signals that are related to the image of surface 1952 under image 1950. This relation between the position on of image 1950 on surface 1952, and the corresponding signals produced by detectors 1980–1994, are used by the image processing unit for constructing the whole image of the scanned area on surface 1952.

When multiple scan beams 1936 illuminate surface 1952, image 1950 on surface 1952 contains multiple spots. To be able to distinguish between the different radiation beams 1953 scattered from surface 1952 under the different radiation spots of image 1950, each of beams 1936 has a different wavelength. Similarly, at least one of detectors 1980–1994 has a radiation filter suitable of transmitting only one wavelength, corresponding to the wavelength of one radiation beam included in beams 1936. In such a configuration it is possible to separate the different signals and to correlate between the position of each spot of image 1950 on surface 1952 and its corresponding signals. This correlation is used by the image processing unit to construct separately the image produced by each spot of image 1950 and to combine them into one unified image of the whole scanned area on surface 1952. This use of multiple scan beams results in a major increase of the scan speed and throughput by the scan system of FIG. 19a.

Each mode in which the scan system can be operated can be used separately, or they can be operated simultaneously. The rotating confocal microscope has the advantage of shallow depth of focus and high imaging resolution. The imaging mode where scattered light 1953 is collected has the advantage of high contrast and high sensitivity to small defects. Accordingly, the advantages of each mode of operation can be used separately or can be combined.

FIG. 19b—Conversion of Inner Drum Scan Into Another Scan Form

FIG. 19b schematically illustrates bundle 2020 of radiation guides 2022 that serves as first scanned region 2024 of scan system 1900 of FIG. 19a. Region 2024 is combined into system 1900 to replace scanned surface 1952. Since the rest of the components of system 1900 remain the same, they are not shown in FIG. 19b. Only axis 1920 of system 1900 and scan beams 1936 are shown. Axis 1920 determines the relative position of bundle 2020 with respect to the rest of the components of system 1900. Beams 1936 and spots 1950 indicate the scan path along first scanned region 2024.

First region 2024 is an inner surface of a cylinder which includes circular lines 2026 having centers 2025, 2027, and 2028. Inputs 2030 of guides 2022 are arranged along circular lines 2026 in the form of at least portions of complete circles. Axis 1920 is parallel to surface 2024 of the first scanned region and passes through centers 2025–2028 of circular lines 2026.

The distance of region 2024 from lenses 1930 and 1932 of system 1900 is adjusted to produce optimal focusing of beams 1936. Plane 2024 of the first region actually replaces plane 1952 of the scanned region of FIG. 19a. Thus beams 1936 are focused into spots 1950, which have minimal size. These are projected and are moved by lenses 1930 and 1932 onto region 2024 and along circular lines 2026.

Spots 1950 that move along lines 2026 scan inputs 2030 of guides 2022 that are arranged along these lines. During the scan of spots 1950 along inputs 2030 of guides 2022, the radiation of spots 1950 is coupled alternately into guides 2022 and is guided by guides 2022 into outputs 2032 of guides 2022. From outputs 2032 the radiation is emitted as beams 1936 directed toward region 2034. Beams 1936 projected on region 2034 form corresponding spots 2036 on that region. Accordingly the alternate coupling of spots 1950 into inputs 2030 during the scan of spots 1950 along lines 2026 of first region 2024 results in alternate emitting of beams 1936 from outputs 2032 toward and along second region 2034 and thus produces the scan of spots 2036 along region 2034.

Bundle 2020 of radiation guides 2022 indicates, inter alia, the conversion of inner drum scans of spots 1950 along lines 2026 into a linear scan of spots 2036 along region 2034. By using other arrangements of guides 2022 of bundle 2020, the inner drum scan on first region 2024 can be converted into any other desired scan form. In such situations the scan forms of spots 1950 matches the forms of second surface 2034.

Some of guides 2022 are illustrated in broken lines to indicate that bundle 2020 of guides 2022 may include more guides than actually shown in FIG. 19b.

In writing applications second region 2034 emits multiple reflected beams 1936 from the surface under radiation spots 2036 and directs beams 1936 toward outputs 2032 of guides 2022 in bundle 2020. Outputs 2032 of guides 2022 receive beams 1936 and guide the radiation of beams 1936 into inputs 2030 of guides 2022 where it is emitted out. This radiation is directed from first surface 2024, where inputs 2030 are located, as reflected beams 1936. Rotating lenses 1930 and 1932 of system 1900 of FIG. 19a alternately collect beams 1936. The rest of the scanning and imaging process is identical to the illustrated in FIG. 19a and explained in its accompanied description and thus is not taught here.

FIG. 20—Scan Device and Scan Lenses Rotating at Same Speed

FIG. 20 schematically illustrates a planar scan system 2100 in which scan device 2102 rotates with scanning and rotating lens 2104 at the same angular velocity $\omega 1$ ($\omega 1=\omega 2$) around axis 2116. Radiation source 2106 emits a single radiation beam 2108 toward single pinhole 2110. Pinhole 2110 transmits and directs beam 2108 through lens 2109 toward reflector 2112. Reflector 2112 reflects beam 2108 toward splitter 2114 and along axis 2116 around which scan device 2102 spins and scan lens 2104 rotates. Splitter 2114 receives beam 2108 and transmits part of it through tube 2118 toward scan device 2102. Beam 2108 is reflected by scan device 2102 as beam 2108 through opening 2119 in tube 2118 and toward rotating reflector prism 2120. Prism 2120 is mounted on rotating support plate 2122. This plate also carries scan device 2102, reflector prism 2120, and scan lens 2104 and rotates with them at angular velocity $\omega 1$. Reflector 2120 reflects and directs beam 2108 toward rotating scan lens 2104, which receives beam 2108 and focuses it into spot 2126 projected onto scanned surface 2124.

Motor (or spindle) 2128 has an axis 2132 and is attached to plate 2130. Its axle 2132 spins wheel 2134. Tube 2118 is connected to wheel 2136 that is in turn coupled to wheel 2134. Wheel 2134 spins the tube by driving belt 2138 at angular velocity $\omega 1$. Accordingly, tube 2118, mounted in ball bearings 2140 attached to plate 2130, also spins with its wheel 2136 and its opening 2119 at angular velocity $\omega 1$. Tube 2118, attached to supporting plate 2122, rotates this plate with device 2102, reflector 2120, and lens 2104 that it carries at angular velocity ω1.

For any rotational position of tube 2118, the relative position between plate 2122, scan device 2102, reflector 2120, scan lens 2104, and axis 2116 remains the same. Beam 2108 propagates along axis 2116 and is reflected by scan device 2102 as beam 2108 that rotates at angular velocity ω1. Beam 2108 has, for any scan position, the same relative angle relative to axis 2116. Accordingly, for any scan position, beam 2108, reflector 2120, scan lens 2104, and axis 2116 all have the same relative position between each other and especially between them and axis 2116. Thus beam 2108 tracks reflector 2120 and lens 2104 with no translation between them.

Radiation spot 2126 moves on scanned surface 2124 along circular lines. The line scan of spot 2126 on surface 2124 is converted to an area scan by introducing relative movement between surface 2124 and plate 2122 normal to axis 2116 and along arrows 2142 in the X direction. Such movement can be introduced by moving translator 2144 that carries surface 2124 and moves together with it along arrows 2142.

Alternatively, such relative movement can be produced by moving plate 2130 normal to axis 2116 and in the direction indicated by arrows 2142. Plate 2130 carries all the components of the scan system, as schematically illustrated by FIG. 20, except for surface 2124 and translator 2144. Accordingly, plate 2130, translator 2144, or moving both of them, will produce the desired relative movement between surface 2124 and plate 2122 for producing an area scan of surface 2124.

Spot 2126 can be used for writing, engraving, and photolithographic applications when modulating or switching the intensity of beam 2108 by source 2106. Source 2106 can be a gas tube or diode laser whose emitting intensity is controlled by a controller (not shown).

When spot 2126 illuminates scan surface 2124, the imaging of scanned surface 2124 under moving spot 2126 can be acquired in two ways similar to that illustrated in FIGS. 17 and 19 and as explained above.

The first imaging technique is done by collecting scattered light 2146 from spot 2126 that is scattered by illuminated surface 2124, under spot 2126, toward detectors 2148 to 2154. Detectors 2148–2154 can represent photomultipliers which collect scattered radiation 2146 and convert it into signals to be fed into an image acquisition system (not shown) to produce the image of scanned surface 2124.

According to the other technique, lens 2104 collects the radiation reflected from surface 2124 under spot 2126 and converts it into reflected beam 2108. Beam 2108 propagates back along the path between splitter 2114 and rotating lens 2104 in the same way as incoming beam 2108 does, but in the opposite direction. From splitter 2114 beam 2108 propagates toward pinhole 2156, which transmits reflected beam 2108 through lens 2157 toward radiation sensitive detector 2158. Detector 2158 can be, for example, a line scan or a CCD camera that converts beam 2108 into the image of the scanned area under illuminating spot 2126 on surface 2124. In this imaging mode the system of FIG. 20 is actually operates as a rotating confocal microscope. When removing pinholes 2110 and 2156, the system operates as a rotational conventional microscope.

The assembly of detector 2158 may also include an autofocus system (not shown) to maintain the proper focus conditions in which the size of spot 2126 on surface 2124 is minimal. Controlling the distance between lens 2104 and surface 2124 maintains the proper focus conditions. This distance is controlled by the autofocus system, which produces a control signal to feed translator 2144 trough leads 2160. According to the control signal, translator 2144 moves along arrows 2162 in the Y direction and thus moves surface 2124 with it to position surface 2124 at the proper distance to produce optimal focus conditions of spot 2126 on surface 2124.

Alternatively, moving plate 2130 along arrows 2162 in the Y direction can control the distance between lens 2104 and surface 2124.The focus of spot 2126 on surface 2124 can be controlled by moving lens 2109, which changes its distance from pinhole 2110 according to this movement. Lens 2109 is attached to arm 2164 and is moved by it. The motion of translator 1266 along arrows 2165 is controlled by the signals produced by the autofocus system. These signals are fed to translator 1266 by leads 1268. Accordingly, the autofocus system controls the position of lens 2109 in the direction indicated by arrows 2167 and thus controls the focus of spot 2126 on surface 2124 to maintain them optimal over the entire scan.

The scan system of FIG. 20 exhibits an advantage since scan lens 2104 and device 2102 both rotate at the same speed (ω1=ω2) and can be attached to plate 2122. Unlike the requirements for the systems in the previous drawings in which ω2=2ω1, in the system of FIG. 20 there is no need for different rotating units for driving scan device 2102 and scan lens 2104 at different speeds. There is also no need to maintain those speeds synchronized and at a ratio of 1:2.

On the other hand the system of FIG. 20 has the disadvantage that it can scan with a single beam only, resulting in a limited throughput. Scanning is limited to a single beam since beam 2108 must be aligned along axis 2116 before hitting device 2102 and only one beam can be aligned along such an optical path.

FIG. 21—Unique Geometrical Point of Conventional Polygon

The system of FIG. 21 is combines the advantages of a single angular velocity (ω1=ω2) with the ability to scan with multiple beams.

Conventional polygonal mirrors 2200 have a rotational axis 2202 and six off-axis outside surfaces 2204, 2206, 2208, 2210, 2212, and 2214, which serve as its facets. Each of surfaces 2204 to 2214 2200 has its corresponding lens outside of the lens group comprising lenses 2216, 2218, 2210, 2222, 2224, and 2226. Each center of lenses 2216–2226 is located on one of normal bisector lines 2232, 2234, 2236, 2238, 2240, and 2242 of its corresponding facet included in lenses 2216–2226. The distances of centers 2244, 2246, 2248, 2250, 2252, and 2254 from their corresponding facets along normal bisector lines 2232–2242 of these facets is equal to the distance of these facets from rotational axis 2202 along the same normal bisector lines passing through axis 2202. For example, distance 2228 of center 2246 of lens 2218 from facet 2206 equals the distance 2230 of side 2206 from axis 2202 when distances 2228 and 2230 are both measured along normal bisector line 2234.

From basic optical rules it is clear that centers 2224–2254 of lenses 2216–2226 are positioned in "Unique Geometrical Points" (UGP). The UGP is a point to which the central axis of any beam reflected by a polygon facet is directed to and passes through after being directed toward axis 2202. For example, central axes 2260 and 2262 of beams 2256 and 2258, respectively, reflected by facet 2206, are directed to and pass through UGP 2246 after being oriented toward axis 2202. Axes 2260 and 2262 of beams 2256 and 2258, respectively, that are reflected from facet 2206 of polygon 2200 pass through UGP 2246, which it is also the center 2246 of lens 2218. Thus their orientation is not affected by lens 2218.

Accordingly beam 2256 is focused by lens 2218 into spot 2264, which is projected onto intersection point 2264 between axis 2260 and focal plane 2268 of lens 2218. Similarly, beam 2258 is focused by lens 2218 into spot 2266 projected onto point 2266 between axis 2262 and focal plane 2268 of lens 2218. In the same way, if the central axis of another beam, reflected by facet 2206, were aligned along normal bisector 2234, this beam would be focused by lens 2218 into spot 2270 projected onto point 2270. Point 2270 is the intersection between line 2234 and focal plane 2268 of lens 2218.

Beams 2256 and 2258 are also aligned along different positions of the radii of circle 2272. (Axis 2202 passes through the center of circle 2272.) Beams 2256 and 2258 are shown in different positions, but they actually represent different positions of the same beam relative to polygon 2200 and lenses 2218–2226. The same relative positions still exist in a real scan configuration when polygon 2000 rotates together with all lenses 2216–2226 at the same angular velocity ω1 and beams 2256 and 2258 are a single static beam directed toward axis 2202.

Accordingly, in a real scan configuration, beams such as beam 2256, reflected from sides 2204–2214 of polygon 2000, track the UGP and thus track lenses 2216–2226 that rotate with polygon 2000 at the same rotational speed ω1. The central axes of the beams that track the UGP also track the rotating lenses, which have the UGPs at their centers, without relative translation between these lenses and the central axes of the tracking beams. In this case the focal planes of lenses 2216–2226, such as focal plane 2268 of lens 2218, also rotate at angular velocity ω1. Radiation spots 2264, 2266, and 2270 on focal plane 2268 rotate with this plane at angular velocity ω1. There is an additional movement D on plane 2268 that is related to the rotational angle θ of polygon 2000 and to the focal length f of lens 2218 and is given by:

$$D=\theta f$$

D is measured relative to a reference point on plane 2268. This reference point is indicated by the position of spot 2270 on plane 2268. Reference point 2270 on plane 2268 rotates, with this plane, with radius r around axis 2202. Accordingly the distance R of the scan spots, such as spots 2264 and 2266 from axis 2202, is not constant and it is a function of the scan angle θ. The distance R=R(θ) is given by:

$$R(\theta)=[r^2+D^2]^{1/2}=[r^2+(f\theta)^2]^{1/2}$$

The dependency of θ of the distance R of the scanned spot from axis 2202 makes the configuration illustrated in FIG. 21 unsuitable for use for inner drum scanning, in which R must be constant over the entire scan range.

On the other hand this configuration, unlike the system of FIG. 20, allows the scan to be produced with multiple beams when the scan device (polygon 2000) and lenses 2216–2226 rotate at the same angular velocity ω1. In spite of the fact that the configuration of FIG. 21 is unsuitable for inner drum scanning, it still has two major advantages. The first is the ability to scan when the scan device and the lenses rotate at the same speed. The second is that the scan is conducted when the beams track the lenses without relative translation between them.

These two advantages make this configuration very attractive for use in applications other than inner drum scanning, such as a planar scan. Accordingly the configuration of FIG. 21 is modified to produce a planar scan as explained below and illustrated in the next drawings.

FIG. 22a—Planar Scan Using Scan Device, Rotating Mirror, and Scan Lens Rotating at Same Speed FIG. 22 is a side view of planar scan configuration 2300, including rotating scan device (polygon) 2302, rotating reflector 2304, and rotating scan lens 2306 that all rotate at the same speed. Configuration 2300 is similar to configuration 2200 of FIG. 21, but is modified by adding rotating reflector 2304 to enable a planar scan. Beam 2310 is oriented toward rotational axis 2308. Beam 2310 passes through beam splitter 2304 and hits side 2312 of device 2302. Side 2312 reflects beam 2310 as scan beam 2310 that is directed toward beam splitter 2304. If a lens, such as lens 2314, were placed at a UGP, i.e., at a distance S from side 2312 equal to the distance of side 2312 from axis 2308, the parts of scan beam 2310 that pass back through beam splitter 2304 will produce scan radiation spot 2316.

The configuration that produces scan spot 2316 is identical to configuration 2200. In configuration 2300 splitter 2304 serves as rotating mirror 2304 and the reflected part of beam 2310 reflected by beam splitter 2304 is used for scanning. Rotating splitter 2304 folds beam 2310 downward and images the position of the UGP and lens 2314 as they should be placed (in configuration 2200 of FIG. 21) into another position where lens 2306 is now positioned according to configuration 2300 of FIG. 22a. Lens 2306 with the UGP in its center is located at a distance S1 from beam splitter 2304 and beam splitter 2304 is at a distance S2 from side 2312 when S1 and S2 satisfy the following equation:

$$S1+S2=S$$

Since the center of lens 2306 coincides with the UGP, beam 2310 tracks the center of lens 2306 without translation between them over the entire scan. Beam 2310 that tracks lens 2306 is converted into scan spot 2318 on planar surface 2320. Since device 2302, splitter 2304, and lens 2306 are all rotate together as a rigid body around axis 2308, the distance between lens 2306 and scanned surface 2320 is fixed over the entire scan. The distance between lens 2306 and surface 2320 is adjusted to contain the focal plane of lens 2306 and thus it remains all over the scan. In configuration 2300, rotating lens 2306 causes radiation spot 2318 to move on planar surface 2320 while maintaining optimal focussing conditions over the entire scan.

Accordingly configuration 2300 demonstrates the principle of a planar scan system with the following advantages:

Optimal focus conditions are maintained over the entire scan range.

The scan lens can rotate at the same speed as the scan device.

The scan beam tracks the center of the scan lens without relative translation between them.

Scan device 2302 may suffer from some production tolerances, such as facets that are tilted at different angles and a tilted mounting angle between the symmetry axis of device 2302 and rotational axis 2308. Such tolerances may cause spot 2318 to have a different scan path on scanned surface 2320; this is known as wobble and jitter.

FIG. 22b—Planar Scan with Improved Scan Device

FIG. 22b illustrates a configuration similar to configuration 2300 of FIG. 22a. This embodiment has an improved scan device that does not produce the unwanted wobble and jitter.

FIG. 22b is a side view of planar scan configuration 2400. It has an improved rotating scanned device 2402. Each side, such as sides 2404 and 2406 of device 2402, consists of two facets, such as facets 2408 and 2410 of side 2404 oriented at right angles to each other, or facets 2412 and 2414 of side 2406, oriented at right angles.

Facets 2408 and 2410 intersect along a line that contains point 2416. Similarly, facets 2412 and 2414 intersect along a line that contains point 2418. Facets 2408 and 2410 behave effectively like a mirror with an additional vertical displacement that passes through point 2416. Its plane 2422 is parallel to rotational axis 2420. Facets 2412 and 2414 behave effectively like a mirror with an additional vertical displacement that passes through point 2418; its plane 2424 is parallel to rotational axis 2420.

Effective reflecting planes 2422 and 2424 remain parallel to rotational axis 2420, regardless of the tilt deviations of the facets of device 2402 and its tilted mounting angle. This is true as long as the following conditions are satisfied: The right angle between facets 2408 and 2410 and facets 2412 and 2414 is maintained and impinging radiation beam 2426 is normal to axis 2420.

Accordingly, when the above conditions are satisfied (this can be achieved easily), device 2402 produces a scan that is free of unwanted wobble and jitter.

Beam 2428 hits facet 2408 of side 2404 and is reflected toward facet 2410. Facet 2410 receives beam 2428 and reflects it toward splitter 2430 as scan beam 2428. If the part transmitted by splitter 2430 were used for the scan, a lens such as lens 2432 would be placed at a distance S from effective reflecting plane 2422. Distance S is equal to the distances of reflecting planes. 2422 and 2424 from rotational axis 2420 and thus the center of lens 2428 coincides with the UGP.

If a lens such as lens 2432 were placed at the UGP, the part of scan beam 2428 that passes through beam splitter 2304 would produce scan spot 2434. The configuration that produces spot 2434 is identical to configuration 2200. In configuration 2400 splitter 2430 serves as rotating mirror 2430 and the reflected part of beam 2428 reflected by splitter 2430 is used for the scan.

Splitter 2430 folds scan beam 2428 downward and images the position of UGP and lens 2432 as they should be placed (in configuration 2200 of FIG. 21) into another position where lens 2436 is now positioned according to configuration 2400 of FIG. 22b. In this configuration lens 2436 with the UGP in its center is located at a distance S1 from splitter 2430 and splitter 2430 is at a distance S2 from reflecting plane 2422 when S1 and S2 satisfy the equation:

$$S1 \ne S2 = S$$

Since the center of lens 2436 coincides with the UGP it is clear that beam 2428 tracks the center of lens 2436 without translation between them over the entire scan. Beam 2428 tracks lens 2436 and is converted into scan spot 2438 on surface 2440. Device 2402, splitter 2430, and lens 2436 are all rotate together as a rigid body around axis 2420. Thus the distance between lens 2436 and surface 2440 is fixed over the entire scan. The distance between lens 2436 and surface 2440 is adjusted to contain the focal plane of lens 2436 and thus it remains constant over the entire scan. In configuration 2400, lens 2436 causes spot 2438 to move on planar surface 2440 while maintaining optimal focus conditions over the entire scan.

Accordingly configuration 2400 demonstrates a system for planar scan system with the following advantages:

Optimal focussing conditions are maintained over the entire scan range.

The scan lens rotates at the same speed as the scan device.

The scan beam tracks the center of the scan lens without relative translation between the center of the lens and the center of the scan beams.

The planar scan is free of wobble and jitter even when the scan device suffers from production and mounting tolerances.

Scanning can be done with multiple beams.

Scanning can be done with a scan device having multiple sides.

FIG. 23—Planar Scan With Multiple Beams and Scan Device Rotating with Scan Lenses at Same Rotational Speed FIG. 23 is a side view of planar scan system 2500, including improved scan device 2502 and scan lenses 2504 and 2506, that all rotate at the same angular velocity. Side 2508 of device 2502 includes two facets 2510 and 2512 oriented at right angles. They intersect along a line that contains point 2514.

Side 2516 of device 2502 includes two facets 2518 and 2520 oriented at right angles and intersect along a line that contains point 2522. Points 2514 and 2522 are located on reflecting planes 2524 and 2526, respectively, that are oriented parallel to axis 2528.

Scan system 2500 is designed according to configuration 2400 of FIG. 22b and thus the center of rotating scan lenses 2504 and 2506 coincides with the UGP. This means that the distance of plane 2524 from rotational axis 2528 is equal to the sum of the distances oriented along the path of beams 2534 from plane 2514 to reflector 2530, and from this reflector to lens 2504.

When side 2516 is switched to be the scan side of device 2502, beams 2534 are reflected from this side. The distance of plane 2526 from axis 2528 is equal to the sum of the distances oriented along the optical path of beams 2534 from plane 2526 to reflector 2532 and from this reflector to lens 2506.

Plate 2536 carries all components of scan system 2500 that are attached to it directly or indirectly, except for scanned surface 2538 mounted on translator 2540. Motor 2542, attached to plate 2536, spins axis 2544 together with its wheel 2546. Wheel 2546 is coupled to wheel 2548 and spins it by driving belt 2550. Wheel 2548, attached to axis 2552, causes axis 2548 to spin with it. One edge of axis 2552 is mounted to plate 2536 by ball bearings 2554 which support axis 2552 and allow axis 2552 to spin freely with scan device 2502 attached to axis 2552 on its other edge. Plate 2556 attached to device 2502 carries reflector prisms 2530 and 2532 and lenses 2504 and 2506 and all rotate at the same angular velocity.

Radiation source 2558 emits multiple beams 2534 toward pinhole arrays 2560 that receive beams 2534 and transmit them toward lens 2562. Lens 2562 collects beams 2534 and directs them toward reflector 2564. Reflector 2564 reflects the beams toward rotating facet 2510 of side 2508 of device 2502. Facet 2510 reflects beams 2534 toward facet 2512 and are then reflected from device 2502 as rotating beams 2534 that are directed toward rotating reflector prism 2530. Reflector 2530 receives beams 2534 and reflects them toward the UGP at the center of lens 2504. Beams 2534 track the UGP, at the center of lens 2504, without translation between beams 2534 and the UGP.

Lens 2504 converts beams 2534 into multiple spots 2566 that are actually the image of pinhole array 2560 on surface 2538. Rotating lens 2504 causes each of spots 2566 to move on surface 2538 along scan lines. Each scan line partially overlaps its adjacent scan lines.

During the rotation of scan device 2502, beams 2534 alternatively hit one of its sides 2508 or 2516. Each side, such as sides 2508 and 2516, serves in turn as the active scan side with its corresponding scan lens, such as lenses 2530 and 2532.

When relative movement is introduced between scanned surface 2538 and rotating plate 2556, in the X direction along arrows 2568, the line scan of spots 2566 (produced without this relative movement) is converted into an area scan of surface 2538. This relative movement between surface 2538 and plate 2556 can be produced, either by moving translator 2540 with surface 2538 on top of it, in the direction indicated by arrows 2568, or by moving plate 2536, with all the component attached to it, in direction 2572.

The above description explains how system 2500 operates as a writing, engraving, photolithograpic, or illuminating system.

Radiation source 2558 can be a laser source or a Light Emitting Diode (LED) source whose intensity can be modulated or switched by a controller (not shown) to control the information written on surface 2538. The system can also be operated in a rotating confocal microscope when using pinhole array 2560. It can also be operated as a conventional rotating microscope when array 2560 is removed. Multiple radiation sources can be used (not shown to avoid a dense drawing). When multiple sources are used, they may be distributed around axis 2528 to irradiate at least one side of scan device 2502.

The illumination of surface 2538 by spots 2566 of the image of array 2560 on surface 2538, and the imaging of the scanned area on surface 2538 under spots 2566, can be done in two ways: by collecting scattered light using multiple radiation detectors, such as photomultipliers, or by image acquisition using cameras, including multiple radiation detectors such as line-scan cameras or CCD cameras.

Radiation 2574 reflected and scattered from surface 2538, under scan spots 2566, is collected by detectors 2576 to 2582 attached to plate 2536 by bars 2584 and 2586. Detectors 2576 to 2582 can be photomultiplier detectors that convert radiation 2574 into signals corresponding to the scan position of spots 2566 on surface 2538. These signals are fed to an image processing system (not shown) that reconstructs the image of the scanned area.

To distinguish between the information that each of spots 2566 produces, a different wavelength may be used for each of beams 2534. In addition detectors 2574 to 2582 may include multiple filters where at least one is designed to transmits at least one of the wavelengths of one of beams 1534.

The other imaging mode includes multiple imaging radiation detectors 2588, such as a line scan camera, a Time Delay Integration (TDI) camera, or a CCD (Charge-Coupled Device) camera. The radiation scattered and reflected form surface 2538 under scan spots 2566 is collected by lens 2504 and is converted into reflected beams 2534 directed toward reflector 2530.

Reflected beams 2534 propagate along a path similar to the path of incoming beams 2534 from splitter 2536 to lens 2504, but in the opposite direction. Reflector 2530 receives beams 2534 and reflects them toward facet 2512 of side 2508 of device 2502. Beams 2534 are reflected by facet 2512 to facet 2510 that reflects them out from device 2502 toward splitter 2564 along a fixed orientation while device 2502 is rotating.

Splitter 2564 transmits parts of beams 2534 and directs them toward lens 2590. Lens 2590 converts beams 2534 into spots that form image 2592 on surface 2538. Image 2592 is projected by lens 2590 onto pinhole array 2594 in a way that the spot size of image 2592 and their arrangement matches the size and the arrangement of the holes in array 2594. Accordingly array 2594 transmits beams 2534 without loss and directs them toward detectors 2588.

Detector 2588 collects beams 2534 from image 2594 on array 2594 and converts them into signals corresponding to the scan position of spots 2566 on surface 2538. These signals are fed to an image processing system (not shown) that constructs the image of the scanned area under spots 2566 on surface 2538.

The assembly of detectors 2588 includes an autofocus system which insures that the focus of spots 2566 is optimal, i.e., the sizes of spots 2566 on surface 2538 are minimal over the entire scan range. The autofocus system of assembly 2588 produces signals which are transferred by leads 2597 and 2599 to control either the movement of translator 2540 in a direction along arrows 2598 or the movement of translator 2596 in a direction parallel to arrows 2598 and along arrows 2600.

The controlled movement of translator 2540 adjusts the distance between lens 2504 and surface 2538 to produce the desired focus of spots 2566 on surface 2538. Similarly, controlling the movement of plate 2536 adjusts the distance between lens 2504 and surface 2538 to produce the desired focus of spots 2566 on surface 2538.

The controlled movement of translator 2696 causes lens 2562 to move into a position that adjusts the distance between lens 2562 and array 2560. This produces the desired optimal focus of spots 2566 on surface 2538.

Multiple sources 2604, such as lasers or LEDs, are attached to plate 2536. Beams 2606 emitted from sources 2604 are guided by guides 2608, such as optical fibers, and are coupled by these guides to the holes of array 2610. Beams 2606 pass through array 2610 and propagate to produce a scan path. This path is not shown to avoiding crowding. Sources 1604, guides 2608, and array 2610 are shown mainly to demonstrate the use of optical fibers 2608 for producing an optical coupling between sources 2604 and the holes of array 2610.

In FIG. 23 and in the other figures that illustrate planar scan systems, the scanned regions are illustrated arbitrarily as being located under the scan lenses. This orientation is arbitrary and all these drawings can also represent other orientations. Especially, it can represent and orientation where the scan systems are rotated at 180 degrees with respect to the illustrated. In such situations, the scanned region is positioned above the rotating lenses to avoid its contamination by parts that may fall from the moving parts of the scan systems as may occur when these lenses are above the scanned region. When the scanned regions are above the scan lenses the stages that move the scanned regions for producing area scans may include vacuum chucks or holding clips to hold these regions.

Conclusions, Ramifications, and Scope

Thus it can be seen that we have provided inner and planar scan systems having the following advantages:

The ability to use multiple beams for high speed scans.

The ability to produce a scan with a balanced rotating optical system for producing high scan speed.

The ability to scan with a high resolution that is diffraction limited

The ability to ability to scan over a large scan range while maintaining the high resolution.

The ability to achieve a very accurate scan by reducing the influence of the production tolerances of the scan device.

The ability to produce high scan speed with very low radiation loss in a rotating confocal microscope.

While the invention has been described with respect to several preferred embodiments, it will be appreciated that they are set forth purely for purposes of examples, and that many other variations, modifications and applications of the invention may be made.

For example, while some of the figures show a writing, printing, or engraving system, such a system can be operated as a reading, inspecting, or viewing system. When replacing the radiation sources with radiation sinks, the propagation of the beams is inverted. The rotating lenses collect multiple beams from their fields of view that they form and move on the scan surface and direct them to the spinning device that reflects them at a fixed orientation toward a mirror or a beam splitter. From the splitter the beams propagate toward the radiation sinks and are collected there.

While for clarity some of the drawings show only one radiation source or only one radiation sink, each radiation source and each radiation sink can represent multiple radiation sources and sinks. In addition, for the same reason some of them do not contain an autofocus unit. Such a unit can be integrated in the systems that are illustrated without it. All the radiation sources in the drawings that are part of writing systems are capable of being modulated to control the information being written.

While some of the scan system illustrated and described include pinhole arrays and operate as rotating confocal microscopes, they can be operated without these arrays as rotating conventional microscopes.

While some of the scanned regions are illustrated as being under the scan lenses, they can be positioned above these lenses.

Thus the scope of the invention should be determined by the elements of the appended claims and their legal equivalents, and not by the specifics given.

What is claimed is:

1. A scan system for writing, plotting, engraving, printing, and photolithography, comprising:

(a) at least one radiation source, (b) a rotatable scan device having a rotational axis, (c) a rotatable medium support, (d) a rotatable scan lens system having at least one lens, and (e) a body having a region, (f) said one radiation source being arranged to emit and direct at least one radiation beam, (g) said rotatable scan device having at least one side for receiving said one radiation beam from said one radiation source and for reflecting out said one radiation beam as at least one rotating scan beam, and for causing said one rotating scan beam to rotate at an angular velocity about said rotational axis of said rotatable scan device, (h) said rotatable medium support being arranged to rotate at said angular velocity about said rotational axis of said rotatable scan device for carrying said rotatable scan lens system, (i) said one lens of said rotatable scan lens system being arranged to receive from said one side of said rotatable scan device said one rotating scan beam with substantially no relative translation between them for producing at least one focused beam, for directing said one focused beam onto said region to form at least one focused radiation spot, and for moving said one focused radiation spot over said region so that it will move substantially over a scan range on said region, and (j) said rotatable lens system, said region on said body, and said one radiation source being positioned so that they are spaced from said rotational axis and are spaced from each other.

2. The system of claim 1 wherein said one radiation source includes a lens system having at least one lens for receiving and collecting said one emitted radiation beam and for converting said emitted beam into a directed beam.

3. The system of claim 2 wherein said lens system includes an autofocus system arranged to control the position of said one lens of said lens system for causing the size of said focused radiation spot on said scanned region to be minimal all over said scan range.

4. The system of claim 3 wherein said one radiation source includes a pinhole array being arranged to produce, with said lens system, a confocal-like structure.

5. The system of claim 1, further including a plurality of radiation guides, each of which has an input, and wherein said region of said body includes a plurality of said inputs of said radiation guides.

6. The system of claim 1 wherein said rotatable lens system and said region are arranged to produce relative movement between said rotatable medium support and said region along said rotational axis for producing an area scan.

7. The system of claim 1 wherein said one radiation source is arranged to direct said one radiation beam toward said one side of said scan device.

8. The system of claim 1 wherein said region is a plate for use in the pre-press industry.

9. The system of claim 8 wherein said region is a plate for use in a direct writing system.

10. The system of claim 1 wherein said region is in the form of a portion of a cylinder.

11. The system of claim 10 wherein the ratio between the rotational speed of said scan device and said angular velocity of said medium support is 1:2.

12. The system of claim 1 wherein the ratio between the rotational speed of said scan device and said angular velocity of said medium support is 1:1.

13. The system of claim 1 wherein said one radiation source is a modulatable radiation source.

* * * * *